US009890618B1

(12) United States Patent
Goodman et al.

(10) Patent No.: US 9,890,618 B1
(45) Date of Patent: Feb. 13, 2018

(54) OIL LEAK CONTAINMENT SYSTEM AND METHOD

(71) Applicant: Sequester, LLC, Garden Grove, CA (US)

(72) Inventors: John M Goodman, Garden Grove, CA (US); Herbert M. Shapiro, Laguna Niguel, CA (US)

( * ) Notice: Subject to any disclaimer, the term of this patent is extended or adjusted under 35 U.S.C. 154(b) by 0 days.

(21) Appl. No.: 14/795,743

(22) Filed: Jul. 9, 2015

Related U.S. Application Data

(60) Provisional application No. 62/091,447, filed on Dec. 12, 2014.

(51) Int. Cl.
| E02B 15/04 | (2006.01) |
| E21B 43/01 | (2006.01) |
| E02B 15/06 | (2006.01) |
| E02B 15/08 | (2006.01) |
| E21B 17/01 | (2006.01) |

(52) U.S. Cl.
CPC ......... *E21B 43/0122* (2013.01); *E02B 15/06* (2013.01); *E02B 15/0814* (2013.01); *E02B 15/0857* (2013.01); *E21B 17/01* (2013.01)

(58) Field of Classification Search
CPC ... E21B 43/0122; E02B 15/06; E02B 15/0814
See application file for complete search history.

(56) References Cited

U.S. PATENT DOCUMENTS

| 3,472,033 A * | 10/1969 | Brown | B63B 35/44 220/565 |
| 3,548,605 A * | 12/1970 | Armistead | E02B 15/08 210/918 |
| 3,561,220 A * | 2/1971 | Riester | E02B 15/08 405/60 |
| 3,658,181 A * | 4/1972 | Blair | E21B 43/0122 210/170.05 |
| 3,784,013 A * | 1/1974 | Daniel | E02B 15/10 210/242.3 |
| 3,981,154 A * | 9/1976 | Hix, Jr. | E21B 43/0122 405/210 |
| 4,395,157 A * | 7/1983 | Cunningham | E21B 43/0122 405/195.1 |
| 4,449,850 A * | 5/1984 | Cessou | E21B 41/005 210/923 |
| 8,523,482 B1 * | 9/2013 | Watson, Sr. | E21B 43/0122 405/210 |
| 8,555,980 B1 * | 10/2013 | Powell | E21B 43/0122 166/363 |
| 8,814,470 B2 * | 8/2014 | Belzile | E02B 15/0807 210/922 |

(Continued)

Primary Examiner — Benjamin F Fiorello

(57) ABSTRACT

Apparatus for containing oil and/or gas leakage from a drilling operation (off-shore or on-shore) comprised of an expandable membrane surrounding a central spline, an apparatus adapted to the removal of the captured oil or gas, and a blowout-handling "fuse" capability. The bottom section of the off-shore version includes operator-controlled extension members to expand the membrane to fully surround the drill site. Any further leakage from the well site will further expand the membrane from the spline sections as it moves upward. When the leaked material reaches the top an extraction apparatus included allows it to be extracted safely.

18 Claims, 19 Drawing Sheets

(56) References Cited

U.S. PATENT DOCUMENTS

| | | | | |
|---|---|---|---|---|
| 8,894,325 | B2* | 11/2014 | Varney | B63B 35/32 |
| | | | | 405/60 |
| 8,986,548 | B2* | 3/2015 | Zung | E21B 43/0122 |
| | | | | 166/364 |
| 9,140,104 | B2* | 9/2015 | Zung | E21B 43/0122 |
| 9,328,471 | B2* | 5/2016 | Splittstoesser | E02B 15/0807 |
| 2011/0315393 | A1* | 12/2011 | Wolinsky | E21B 43/0122 |
| | | | | 166/363 |
| 2011/0315396 | A1* | 12/2011 | Wolinsky | E21B 43/0122 |
| | | | | 166/363 |
| 2011/0318107 | A1* | 12/2011 | Dighe | E21B 43/0122 |
| | | | | 405/63 |

* cited by examiner

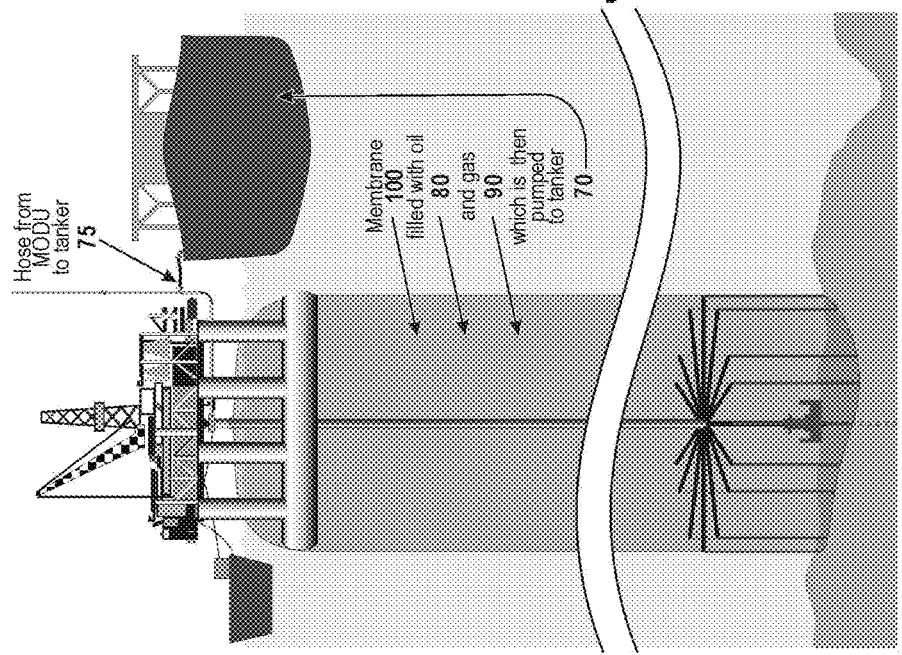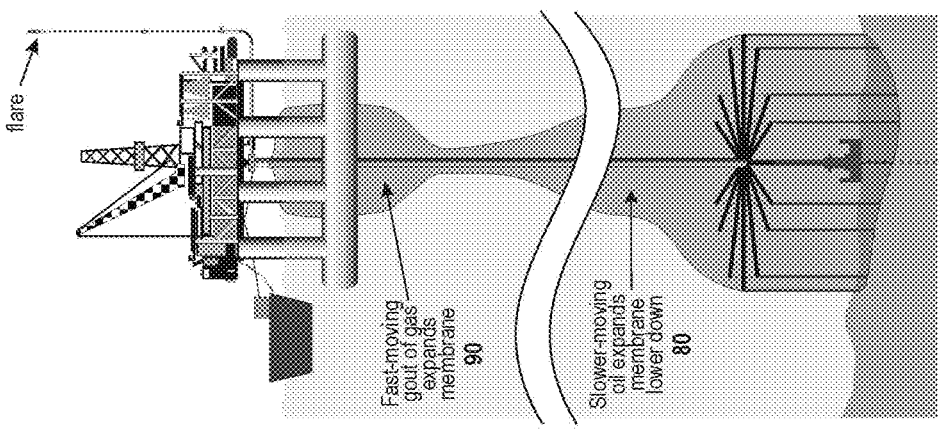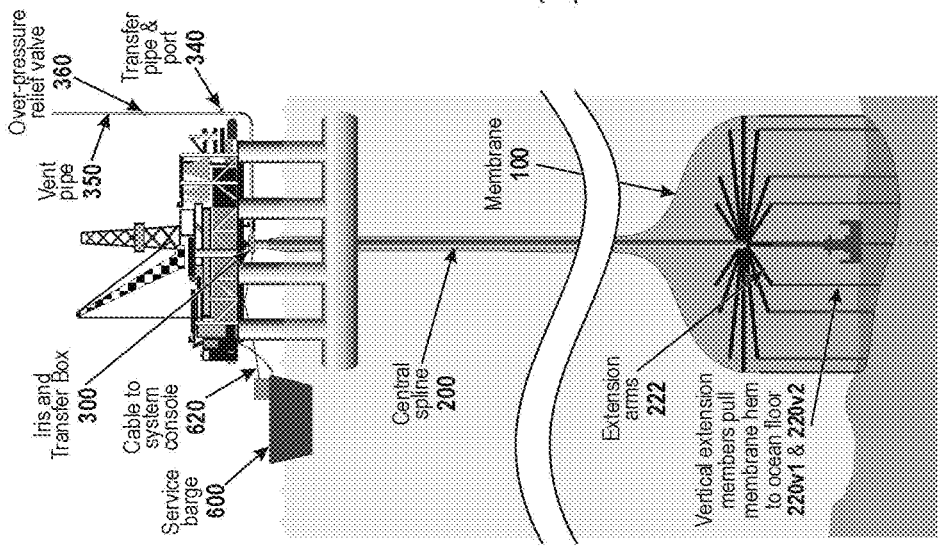

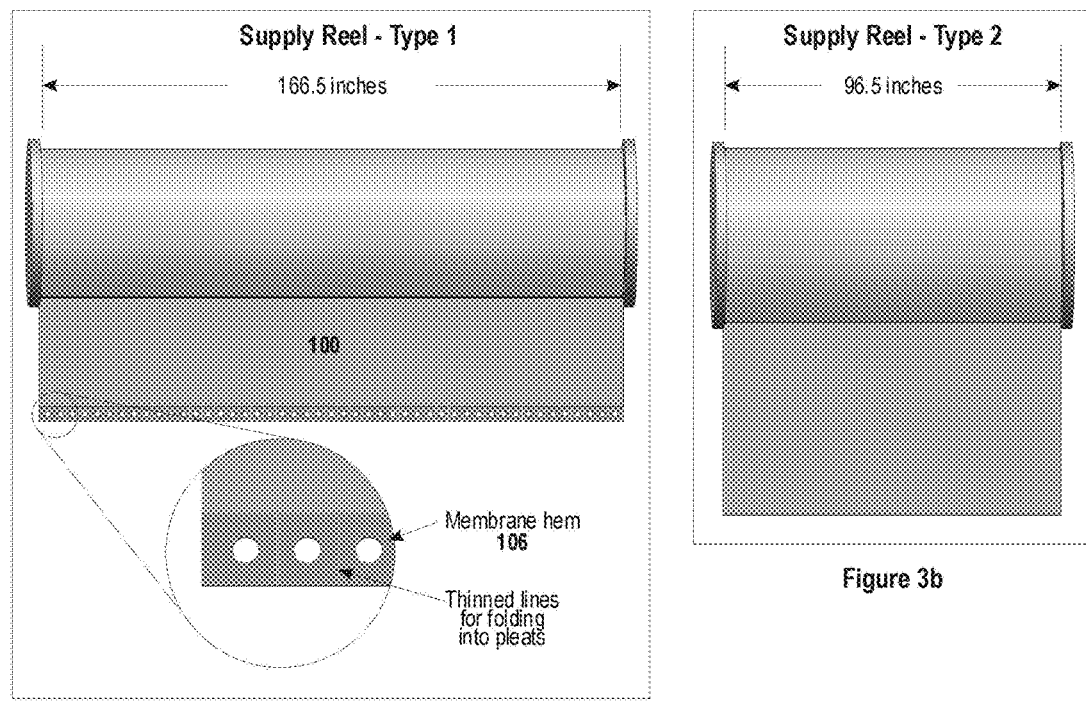
Figure 3a
Figure 3b
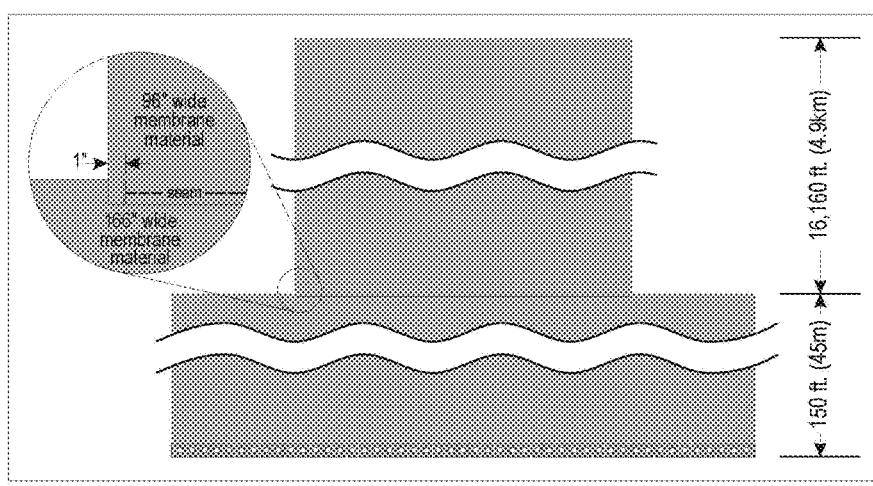
Figure 3c

Oil leak containment system

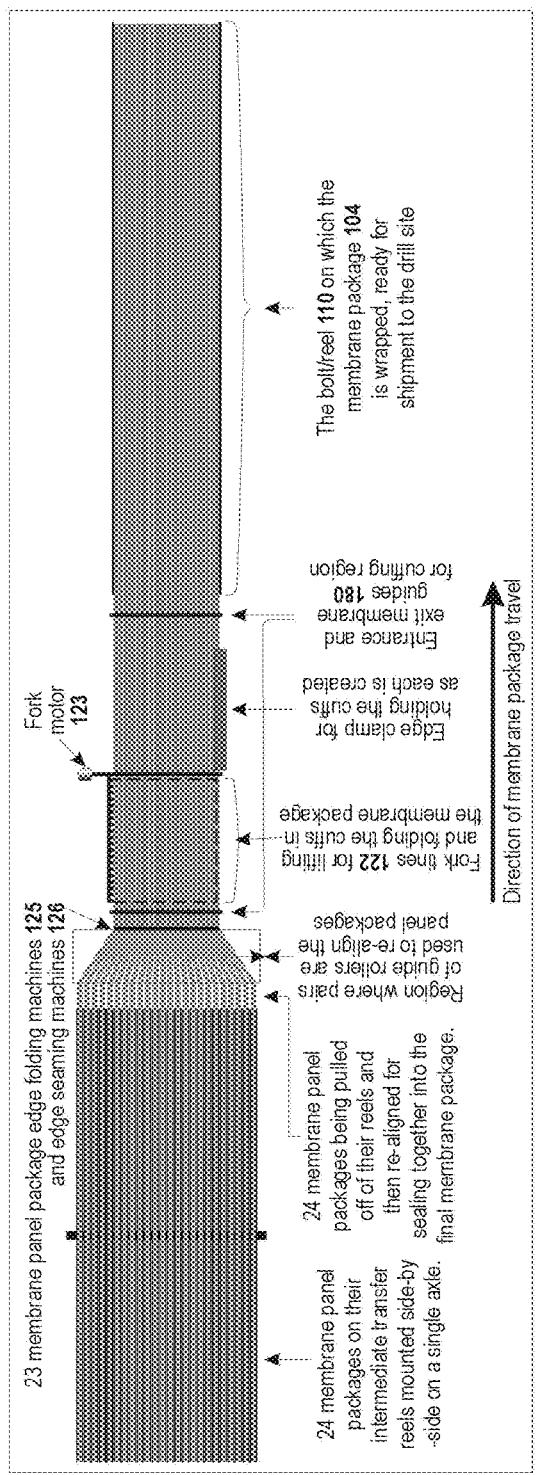
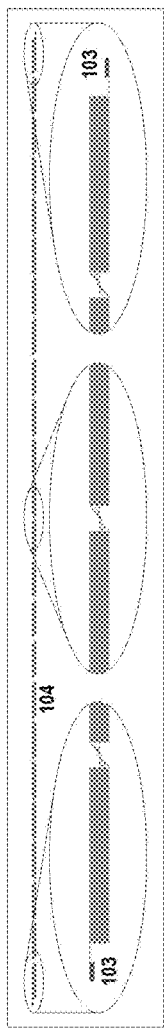
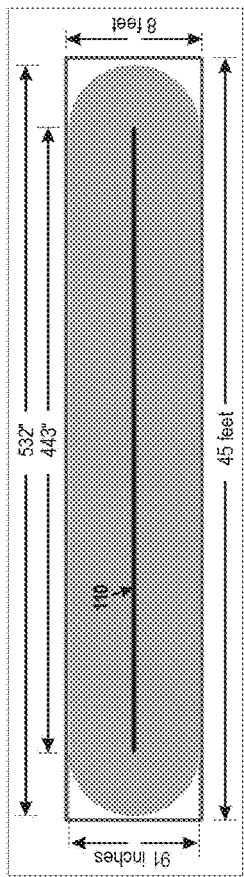
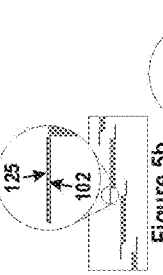
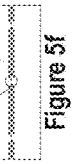
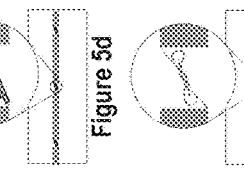
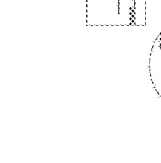
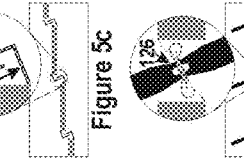

Oil leak containment system

Oil leak containment system

Oil leak containment system

Oil leak containment system
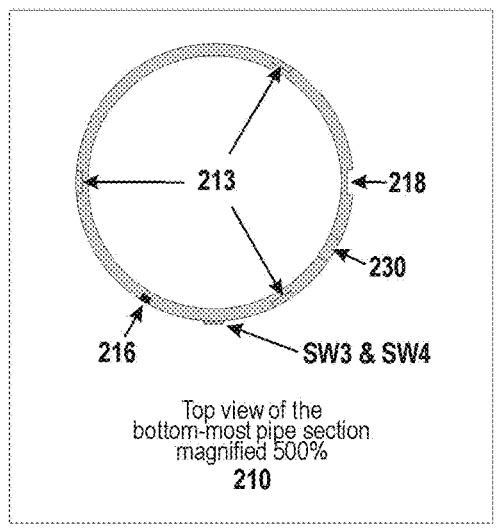
Figure 9a — Top view of the bottom-most pipe section magnified 500% 210
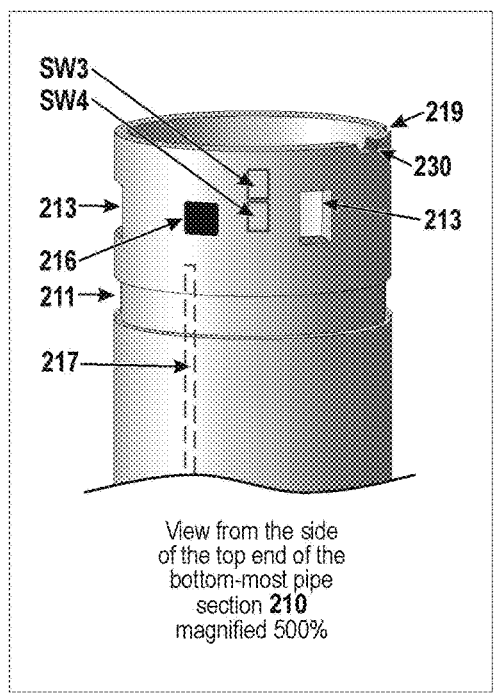
Figure 9b — View from the side of the top end of the bottom-most pipe section 210 magnified 500%
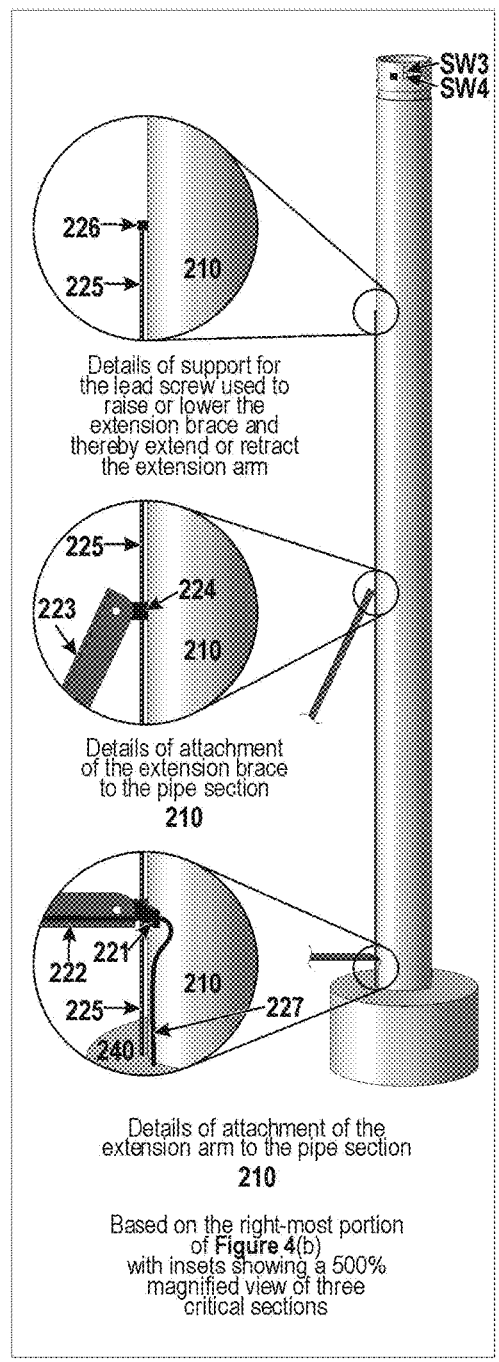
Figure 9c — Details of attachment of the extension arm to the pipe section 210
Based on the right-most portion of Figure 4(b) with insets showing a 500% magnified view of three critical sections

Oil leak containment system

Oil leak containment system

Iris assembly 320

Iris assembly 320

Key 390 (to engage 219, 259, and 415)

Oil leak containment system

Oil leak containment system

Wrapping machine 130 (various views)

Oil leak containment system

Oil leak containment system
Hydraulic Marine Riser Fuse 500
(various views)
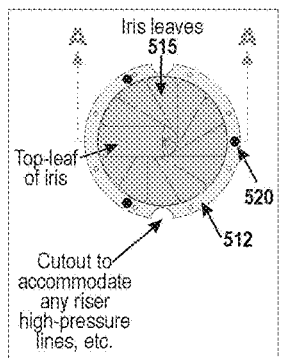
Figure 16a
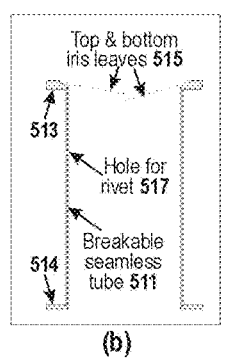
(b)
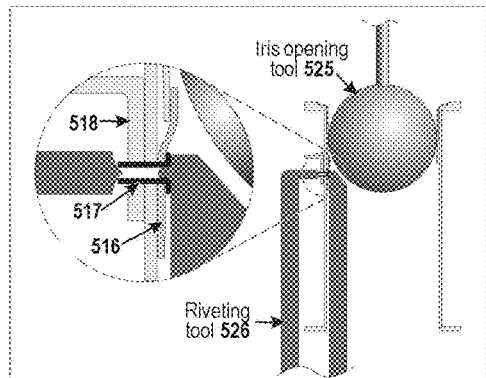
(c)
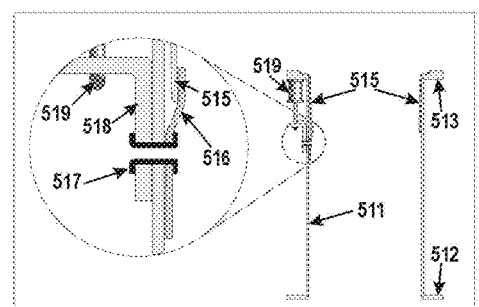
(d)
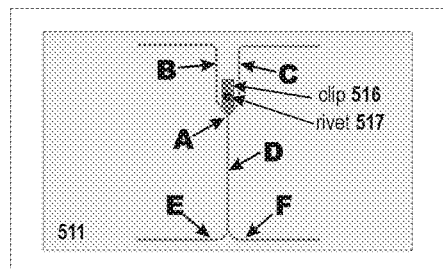
(e)
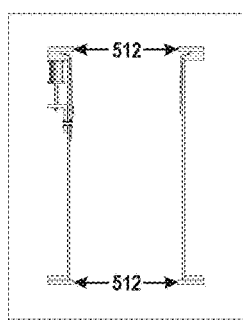
(f)
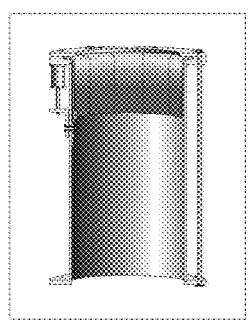
(g)
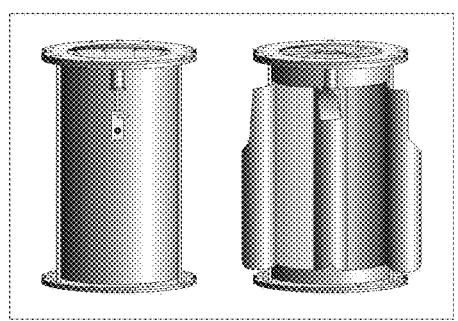
(h)

Oil leak containment system

OIL LEAK CONTAINMENT SYSTEM AND METHOD

CROSS-REFERENCE TO RELATED APPLICATIONS

This application claims the benefit of U.S. Provisional Application No. 62/091,447, filed Dec. 12, 2014 the content of which is incorporated herein.

FIELD OF THE INVENTION

This invention is related to underwater oil leak containment apparatus and more specifically to an apparatus for preventing oil or gas leaking from an oil or natural gas underwater drilling site from escaping capture and subsequently spreading into the environment.

BACKGROUND

There are many thousands of underwater drilling sites. It is incontestable that well blowouts occur and when they do, not only is the oil and/or gas that is released not captured for sale and ultimately for use by a consumer, the escaped petrochemicals contaminate the environment. The companies responsible not only lose revenue, they often incur tremendous expenses for cleanup plus fines plus potentially catastrophic reputational damage.

While it is clearly desirable that underwater oil well leaks be prevented, it seems pretty clear that they cannot be avoided entirely. However, in accordance with the present invention, steps can be taken in advance to insure that any leaks will be contained, and thus the loss of valuable petrochemicals and the consequent environmental damage and all the costs these things imply can be prevented.

BRIEF SUMMARY OF INVENTION

The present invention describes a system and apparatus and method by which any oil and/or natural gas that may leak from an underwater drill site or its immediate neighborhood can be captured and removed from the water, thereby saving that valuable resource for human use and preventing damage to the local environment.

The following description focuses primarily on the offshore application, but the principles of this invention may also be applied to an on-shore drill site. A brief explanation of how it may be applied to an on-shore site is given in the detailed description section below titled, "Use of this Invention for Onshore Drilling."

The first aspect in this oil leak containment system, method, and apparatus provides a containment region surrounding an underwater well site. It comprises an expandable membrane and associated support equipment that can be installed surrounding the marine riser of the well site before an underwater well is drilled and that will enable better control and safer operation during drilling and, in some instances, beyond that during the production phase of operation of the well.

The second aspect in this oil leak containment system, method, and apparatus provides a way to safely extract any petrochemicals that are captured within the membrane-enclosed containment region. All of the oil and/or gas so recovered can be sold or used simply as products of the well, rather than having it enter the ocean as an environmental contaminant (as happens whenever oil floating on the surface is "dispersed") or having it have to be destroyed by burning.

The third aspect in this oil leak containment system, method, and apparatus comprises hydraulic "fuses" to be included in the marine riser of a well whereby dangerous overpressure within the marine riser string can be safely vented into the containment region provided by the rest of this invention, and then that blowout oil and/or natural gas, having been captured, can be removed and thus added to the well's production output.

Each of these aspects may also further include several additional useful, optional features.

This invention's several aspects collectively provide an isolating containment region around a drill site and the drill string and marine riser extending upward from that drill site all the way to the drilling platform whereby the environment outside is protected from contamination by activities within this isolating containment region. Once installed, this containment region will in no way limit the normal activities engaged in during the drilling operation. Instead it will simply offer an unprecedented level of safety in the event of any unexpected leakage that might occur. And the hydraulic fuses will enable safely managing even the worst "blowout" events with unprecedented ease.

With reference to the first aspect, the membrane is initially folded and wrapped around a string of rigid pipe sections descending from a drilling platform, hereinafter called the "sleeve" or "central spline." The membrane is thereby kept from snagging on the central marine riser or drill string. Preferably the membrane and its central spline are installed before the marine riser and drill string are lowered to the ocean floor to begin drilling a new well. In addition to the membrane and the central spline, the oil leak containment system apparatus includes an apparatus at the bottom of the central spline adapted to expand the membrane widely around the well site, thus capturing any leaks from the ocean floor near the well site that drilling might cause, and this apparatus also allows the membrane-enclosed containment region to conform closely to the topography of the sea floor in that vicinity. Optionally, the apparatus by which the membrane is expanded at the bottom may also be used to anchor the central spline firmly to the ocean floor. (This is a feature which is included in the exemplary implementation described below.)

For wells which will ultimately carry the oil or gas produced upward through a marine riser to the drilling platform where it may then be pumped to a waiting tanker or to an onshore storage facility, the oil leak containment system and apparatus should be considered a permanent part of the well infrastructure and left in place during oil or gas production. It will thereby secure the well and its immediate vicinity from any subsequent leaks anywhere in the immediate vicinity of the wellhead or from any submersed part of the marine riser throughout the well's useful lifetime in addition to capturing any leaks that might occur during the initial drilling and start of the production phase.

For wells that are to be capped for later production, or ones that are to carry away the oil and gas produced from the well through piping installed on the ocean floor directly attaching to the well head and traveling away from the well head along the ocean floor, perhaps to an onshore storage facility, or upward toward a platform located some distance away laterally, the oil leak containment system apparatus may be removed once that piping is in place or the well is capped, and then the constituent parts of this oil leak containment system apparatus can be recycled for use on another well. Alternatively, if many wells are to be drilled and capped for later production using a single fixed or moveable drilling platform, and if all of the drill sites are at a comparable ocean depth, it may be possible to reuse the oil leak containment system apparatus while it is still attached to that drilling platform for a each of these wells in turn.

BRIEF DESCRIPTION OF THE DRAWINGS

FIG. 2a shows the same MODU with the present invention installed from a purpose-built service barge, showing how the membrane surrounds the rigid containment pipe string, and how the extension assemblies in their deployed position can open the bottom end of the membrane-enclosed containment region around the drill site.

FIGS. 2b and 2c show the situation after some, and then a lot, of oil or gas has leaked out into the containment region created by the membrane. Each of these figures is approximately to scale, except that for clarity of its structure the spreading of the membrane near the ocean floor is shown more than three times as wide as it will be in the exemplary implementation.

FIGS. 3a, 3b, and 3c shows how a single membrane panel is created;

FIGS. 5a through 5g show how multiple membrane panel packages are combined into one membrane package. FIG. 5h shows how that membrane package can be fit into a standard intermodal shipping container.

FIGS. 9a, 9b, and 9c show many details of the bottom-most pipe section of the central spline itself, plus showing how the extension assembly is connected to and controlled by that bottom-most pipe section.

FIGS. 16a, 16b, 16c, 16d, 16e, 16f, 16g, and 16h include several views showing the method of construction and the principle of operation of one "hydraulic fuse" section for the marine riser.

DEFINITIONS

Figure 1:
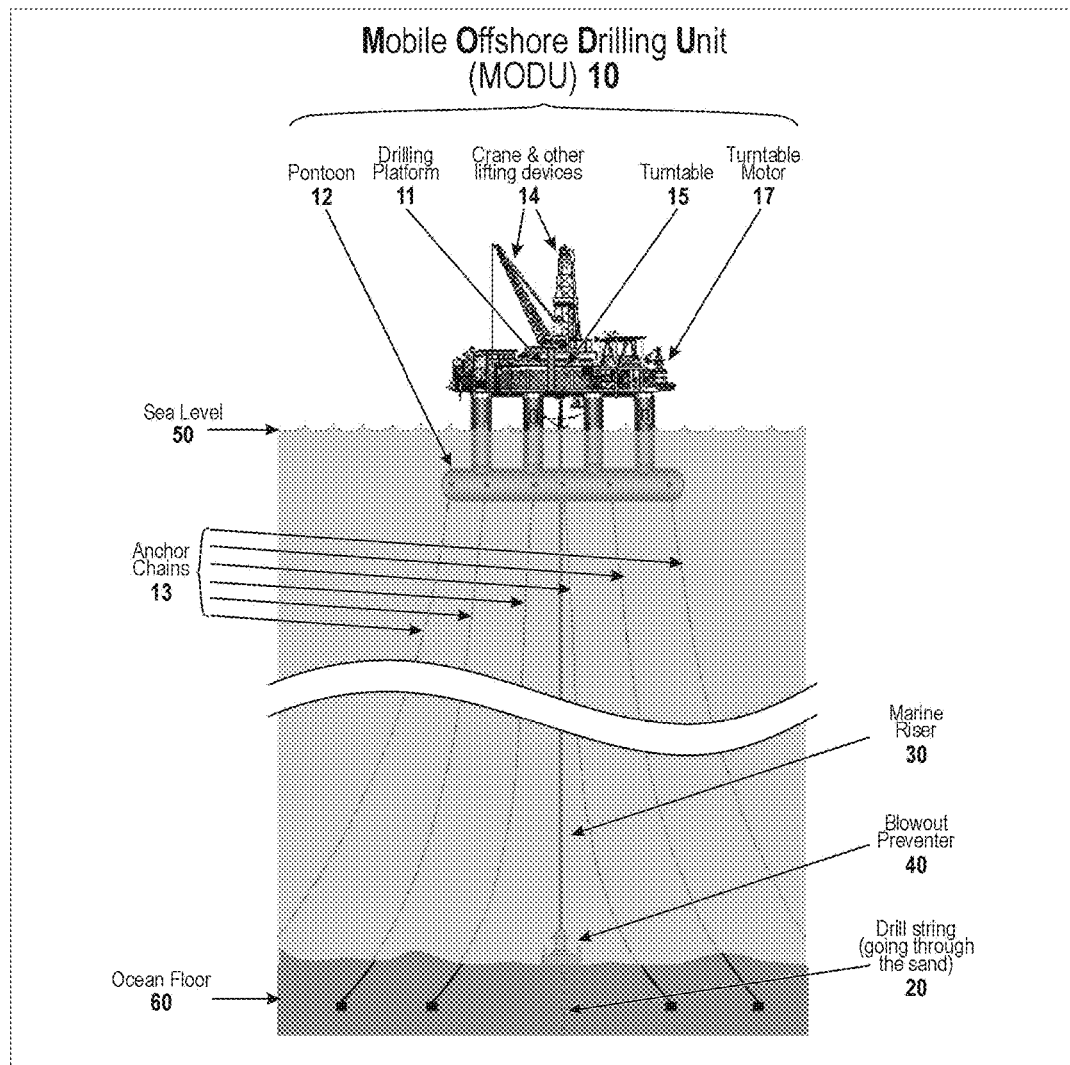
FIG. 1 shows schematically a typical mobile offshore drilling unit (MODU) without the present invention.

Inner and Outer Containment Regions—The region defined by the interior of the central spline (the string of rigid pipe sections) extending from a position above the drill site on the ocean floor a distance less than or approximately equal to the length of one of these rigid pipe sections up into the iris and transfer box located below the drilling platform is herein termed the inner containment region. The region surrounded by the membrane extending from the ocean floor to where the membrane is clamped around the central spline—typically just below or just above the ocean surface—is termed the outer containment region.

Membrane—All references to a "membrane" in this application include any material that meets these specifications: A petroleum and natural gas impermeable, substantially non-stretchable, flexible, rugged, essentially two-dimensional surface, chemically stable in an ocean environment, long-lasting, and able to withstand not only the cold of an arctic ocean or the heat of a tropical ocean, but also at least short-term exposure to whatever weather (extreme heat, cold, rain, snow, wind, etc.) it may be subject to during transportation and before it is installed underwater. Exemplary materials can include polyethylene film bonded to a substantially unstretchable woven or non woven fiber. One exemplary implementation will be a plastic film bonded to a rip-stop woven material such as nylon or a synthetic fiber such as Kevlar™ fabric; another might be a non-woven fabric such as Tyvek™ fabric.

Membrane Panel, Membrane Panel Package, and Membrane Package—The membrane as it will be installed onto the central spline is supplied as a special "membrane package" that, in an exemplary implementation, is 97 inches (2.5 m) wide. It is comprised of some number of individual "membrane panel packages" (24 in the exemplary implementation). Each of these membrane panel packages is a tightly pleated version of a membrane panel having an overall width which is, in the exemplary implementation, only 3.5 inches (89 mm), even though the actual width of the membrane material in that panel may be as much as 166 inches (4.2 m), or in another portion of the membrane panel, about 95 inches (2.4 m). Before the membrane package is shipped to the job site, all of the membrane panel packages will have been seamed together to form the special membrane package. After installation, each membrane panel will span the distance from one extension assembly to an immediately adjacent extension assembly. The membrane package will be seamed into a closed tube during its installation.

Folded—Any reference to the membrane being folded includes any way in which the membrane is made to occupy a smaller extent in space than it would if stretched out to its limits, including pleating, folding, cuffing, or crumpling.

Extension Assembly—Any reference to an extension assembly refers to a horizontal extension arm attached near the distal end of the central spline, which may comprise one or several segments, along with the other structural members such as braces that may be used in the deployment and return of this horizontal extension arm, plus optionally, a vertical extension arm attached at the outer end of the horizontal extension arm which can be extended downward to the ocean floor. This extension assembly includes a motor drive to force the horizontal extension arm outward and optionally downward from the distal end of the central spline toward the sea floor, so as to expand the membrane in that region, and later (using the same motor) the horizontal extension arm can be retracted. The optional vertical extension arm may consist of one or more tube(s) (telescoped inside one another if there is more than one) and thus capable of extending downward to the ocean floor a large and variable amount to accommodate any uneven topography that may be found around the well site. Further, such a vertical extension arm may include an apparatus adapted to attaching itself firmly to the ocean floor whether it is rocky or sandy, and an additional apparatus adapted to raising and lowering the membrane hem independent of the position of this vertical extension arm. Alternatively, if the vertical extension arm is not used, a chain can be attached to the end of the horizontal extension arm of a sufficient length to reach the ocean floor and this chain will then serve the same purposes as the vertical extension arm.

Chain—Any reference to a chain includes any flexible, non-extensible, essentially one-dimensional material or structure. It could be a sufficiently flexible cable or a chain of any link design. The chain placed circumferentially around the bottom end of the membrane tube is preferably heavy enough to hold the membrane down against the ocean floor even in the presence of strong lateral water currents, yet not so heavy as to tear the membrane.

Crane—Any reference to a crane includes any of the lifting devices on the drilling platform or the oil leak containment system service barge including the crane and the derrick winch, and anything else that can lift or carry items as needed.

Pipe and piping—Any reference to a pipe or piece of piping includes both rigid pipes and flexible hoses or be limited to either a rigid pipe or flexible hoses as the context may determine.

Seam and Seaming Machine—The seam, the act of seaming, or a machine for seaming all refer to joining the edges of the membrane material to form what was a sheet of material into a tube in a manner that will be secure and at least semi-permanent enough to persist under the rigors expected in this application. The seam might include such apparatuses as a zipper, a hook and loop fastener such as Velcro™, or such methods as ultrasonic or thermal welding, solvent-based cold welding, or fastening with an single or double-component adhesive between the thickened portions of the outer edges of the membrane package. A "seaming machine" refers to any device(s) that may be used to accomplish this sort of joining of the two edges of the membrane package.

Marine Riser Hydraulic Fuse or Riser Fuse—The concept of a marine riser hydraulic fuse and its on-shore equivalent, called here a riser fuse, is explained in detail in the two sections below titled "Marine Riser Hydraulic Fuse" and "Use of this Invention for Onshore Drilling." Briefly, these are devices that may be inserted in the return path of the drilling mud from the drill bit to intercept a blowout induced surge of oil and/or gas rising rapidly up that channel and potentially leading to serious contamination of the region surrounding the drilling rig and possibly to destruction of that rig and consequent loss of life among the crew working on that rig. These devices are able to be triggered in three ways: By a high pressure surge that occurs within the fuse itself, by a surge in either pressure or flow velocity in the upward flow of mud detected by a sensor located somewhere below the fuse, or by a manual action by a member of the drilling crew. These fuses are also able to trigger other fuses in this same riser to provide greater security against random failure and perhaps also to better catch the start of any blowout event, while at the same time enabling the lowering of the chance of any "false positives."

| | Description of the Referenced Numbers |
|---|---|
| 10 | Mobile Offshore Drilling Unit (MODU) [PRIOR ART] |
| 11 | drilling platform |
| 12 | pontoon |
| 13 | anchors |
| 14 | crane |
| 15 | turntable |
| 17 | turntable motor |
| 20 | drill string |
| 30 | marine riser |
| 40 | blowout preventer |
| 50 | ocean water |
| 60 | ocean floor |
| 70 | tanker ship |
| 75 | hose from MODU to tanker |
| 80 | oil |
| 90 | natural gas |
| 100 | Membrane & Associated tools |
| 101 | open edges of membrane |
| 102 | seamed edges |
| 103 | thickened edges on membrane package |
| 104 | membrane package |
| 105 | "cuffed" portion of membrane package |
| 106 | membrane hem |
| 110 | storage reel ("bolt") |
| 115 | storage reel base |
| 120 | membrane panel pleating machine |
| 121 | cuffing fork |
| 122 | cuffing fork tines |
| 123 | cuffing fork motor |
| 125 | membrane panel edge folding machine |
| 126 | membrane panel edge seaming machine |
| 130 | membrane package wrapping machine |
| 131 | bottom layer |
| 132 | top layer |
| 133 | channels for hooks |
| 134 | hook lozenge and string |
| 135 | hoop segment |
| 136 | hoop expansion members |
| 137 | top plate |
| 138 | clamp mechanism |
| 140 | membrane package seaming machine |
| 141 | membrane package seaming machine body |
| 142 | side panel (A or B) |
| 143 | fixed pressure wheels |
| 144 | spring-loaded pressure wheels |
| 145 | pressure belt |
| 146 | adhesive or solvent tubes and channels |
| 147 | attachment bracket connecting seaming machine to wrapping machine |
| 150 | carabineers to connect 160 to 106 |

-continued

| | Description of the Referenced Numbers |
|---|---|
| 160 | membrane package hem chain |
| 170 | connecting chain from bottom chain to extension member |
| 180 | membrane package guides |
| 185 | membrane package gates |
| 200 | Rigid Containment Pipe String (the Central Spline) |
| 210 | Bottom-most Pipe Section |
| 211 | clamp region |
| 212 | hole pattern |
| 213 | quick disconnect latch point |
| 216 | electrical connection box |
| 217 | electrical cable |
| 219 | keyway |
| 220 | extension assembly |
| 220h | horizontal extension assembly |
| 220v1 | inner vertical extension assembly |
| 220v2 | outer vertical extension assembly |
| 221 | extension member attachment point |
| 222 | horizontal extension arm |
| 223 | deployment brace for 222 |
| 224 | deployment brace attachment point (with captive nut) |
| 225 | deployment lead screw for 223 |
| 226 | top support for lead screw 225 |
| 227 | cable to lights and/or cameras on arm |
| 240 | bottom end package |
| 250 | Other Containment Pipe section |
| 251 | clamp regions |
| 252 | hole pattern |
| 253 | quick disconnect latch point |
| 254 | quick disconnect spring latch |
| 255 | locking band for securing quick connection |
| 256 | electrical connection box |
| 257 | electrical cable |
| 258 | slots for cable between pipe sections |
| 259 | keyway |
| 260 | locking indentation on top surface of pipe section |
| 261 | key on bottom end of pipe section to engage 260 |
| 300 | Iris and Transfer Box |
| 310 | control system |
| 320 | Iris assembly |
| 321 | Iris blade(s) |
| 322 | Iris support ring |
| 323 | Iris rotation ring |
| 324 | Iris motor |
| 325 | Iris support frame |
| 330 | Transfer port |
| 340 | Transfer pipe & flange |
| 350 | vent pipe |
| 360 | over-pressure relief valve |
| 370 | pipe clamp |
| 371 | pipe clamp motor box |
| 372 | pipe clamp lead screw |
| 373 | pipe clamp lead screw pillow block |
| 380 | cable to apparatus operating system |
| 390 | key (to engage 219, 259, & 415) |
| 400 | Special Extraction Tool |
| 410 | Basket |
| 415 | Keyway |
| 420 | Support Band |
| 430 | Arched Hanger |
| 440 | Swivel |
| 450 | Crane Loop |
| 460 | Locking Arm |
| 465 | Locking Arm Axle |
| 470 | Locking Arm Actuator |
| 480 | Locking Arm Bearing |
| 490 | Special Extraction Tool Control Box |
| 500 | Hydraulic Riser Fuse |
| 511 | breakable tube |
| 512 | outer flanges |
| 513 | top inner flange |
| 514 | bottom inner flange |
| 515 | iris leaf (or leaves) |
| 516 | iris retaining clip |
| 517 | rivet |
| 518 | external actuator bar |
| 519 | solenoid and actuator |
| 520 | bolts to stiffen fuse frame |

-continued

| | Description of the Referenced Numbers |
|---|---|
| 525 | iris opening tool |
| 526 | fuse riveting tool |
| 550 | on-shore fuse |
| 551 | primary containment region |
| 552 | secondary containment region entrance port and check valve |
| 553 | expandable membrane bag that defines the secondary containment region |
| 554 | secondary containment region support structure |
| 555 | over-pressure valve and vent pipe with igniter |
| 600 | Service barge |
| 620 | cable to system console |
| 630 | service barge cab & oil leak containment system control room |
| 640 | service barge office, galley, dorms, etc. |
| 650 | test & control cable to special extraction tool |
| 670 | whip mast to hold 650 high above the highest point on the MODU other than its crane |

DETAILED DESCRIPTION OF THE INVENTION

The invention, the implementation of which is described below, arises from the realization that underwater oil and/or gas leaks from drilling operations can be effectively rendered controlled by installing a containment system in the drill system at its initial installation, before the need arises, as a ready-for-use countermeasure. This solution incorporates capture of escaping oil and/or gas with a membrane container which is put in place before the oil and/or gas can first escape. Other features of the invention which are detailed to implement this basic concept or which are ancillary to using it are also described below Offshore drilling is commonly performed from a mobile offshore drilling unit (see FIG. 1), commonly called a MODU. The other common platform for drilling is a drill ship. The rest of this description refers to how the present invention is applied to such a mobile offshore drilling unit. Persons versed in the art of oil drilling will, from this description, be able to see easily how to adapt the present invention to a drill ship as well. A further adaptation of this invention to an on-shore drilling rig is discussed below.

In the subsequent discussion a particular exemplary implementation is described. It has a particular size, but any similar apparatus of any size is covered under this invention. The size chosen for this particular implementation may well serve in many cases, but it could easily be scaled up or down as appropriate for other cases.

In FIG. 1 the mobile offshore drilling unit 10 is shown riding low in the water, with a drilling platform 11 above water, supported by pontoons 12 that are located well below the waves to insure greater platform stability. Still, on a typical MODU, the platform may move vertically at least a little bit as the sea level 50 rises and falls with tide or with wave action, especially during severe weather.

Any such vertical motion could cause a severe problem if it weren't anticipated. Specifically, all modern undersea wells are drilled through a "marine riser" which is a string of pipe sections that runs from the ocean floor up to just under the drilling platform. If that platform were to rise and fall from time to time, and without a special apparatus attached to that platform to permit this motion while all the time supporting the weight of the marine riser string from a position exactly as far above the ocean floor as the length of this string, either the marine riser string would be pulled up out of the ocean floor, or it could fail to be supported and then fall and break under water.

There are some MODUs that have been built in a fashion that completely stabilizes their vertical position above the ocean floor. One version is called a spar platform; another is called a tension-leg platform. These special MODUs can dispense with the specialized apparatus adapted to holding a constant tension upward on the marine riser string that is essential on all the other MODUs and on all drilling ships. This point is noted here mainly to point out that it there will often be a substantial distance between the top of the marine riser and bottom of the drilling platform's turntable to accommodate this specialized riser tensioning apparatus.

The MODU shown in FIG. 1 is anchored by cables 13 to the sea floor. It has a crane 14 normally used to lower, raise, or otherwise manipulate the drill bits, drill pipes, and well casings. The drill string 20 is enclosed in a rigid marine riser 30 extending from the drilling platform to the ocean floor 60 which serves to carry the "drilling mud" that is pumped down inside the drill string and out of the drill bit back up through the marine riser to the platform, thereby lubricating the cutting edge of the drill as well as enabling the carrying away of the chips from the drilling and allowing recovery of the expensive drilling mud. In this illustration one can also see a blowout preventer 40 sitting on the ocean floor surrounding the lower end of the marine riser.

In accordance with the principles of this invention—and as is illustrated in FIGS. 2a, 2b, and 2c—an oil and gas impermeable membrane 100 is installed underneath the drilling platform extending all the way down to the ocean floor. (The membrane is shown here as if it were made of a semi-transparent grey material. That is done in order to let you see the other items that are inside it. The actual membrane need not be transparent, although it could be.) The membrane is supported during installation by being wrapped around a plurality of rigid interconnected pipe sections forming a central spline 200. The bottom-most pipe section 210 (shown in FIGS. 8a-8f and 9a-9c) is of a special design; all the other sections 250 (shown in FIGS. 7a to 7g) will be identical except, perhaps, for their lengths. Here the ocean is shown as very light grey region, the sandy bottom is shown as a somewhat darker grey, and the FSO or tanker hull is shown as a very dark (80%) grey. All the other parts are shown in black. These different shades are merely to help the viewer identify these different constituents of this scene.

The elements in FIG. 2a that are not labeled can be identified by referring to FIG. 1. Similarly, each element in FIGS. 2b and 2c that aren't labeled there can be identified by reference to either FIG. 1 or FIG. 2a.

As each new section of rigid pipe is installed on top of the then-existing extent of the central spline, which installation is done at the level of the drilling platform 11, more membrane is pulled off a storage reel (elsewhere in this document referred to as a bolt/reel, since it resembles a scaled up version of the bolts on which fabric is often sold) on the service barge 600 and wrapped around that pipe section. This continues until the bottom end of the central spline is a distance above the well head location that is comparable to the length of one of these rigid pipe sections, thereby permitting the full distance from drilling platform to ocean floor to be spanned by the membrane. This creates a containment region inside the membrane such that no oil or gas can leak out of it into the surrounding ocean water. The final step in the installation of the membrane is to close off the top of the membrane by clamping it tightly around the central spline, thereby closing the containment region it surrounds, so no oil or gas can escape there. The topmost rigid containment pipe section 250 is connected to a transfer apparatus adapted to pumping out the oil and gas that gets trapped within the containment region for later use. The central spline pipe sections have holes in their sides to permit water, oil, and gas to flow either into or out of the pipe, thus connecting the outer containment region outside the central spline to the inner containment region inside it. Above the point at which the membrane is clamped to the central spline there must be no holes thus preventing any oil or gas that rises up through the containment region, either inside or outside the pipe, from exiting into the surrounding ocean water.

Once the apparatus of the present invention is fully installed, the marine riser 30 can be placed through the central spline and into the ocean floor. Thereafter drilling of the underwater well can proceed in the normal manner.

Preferably, this membrane 100 is made of a material that is able to withstand multiple small punctures without ripping. This will insure that no significant amount of oil or gas will escape through the membrane even if it does get accidentally punctured. The lower end of this membrane is deployed widely around the actual drill site so as to catch leaks from that site or from cracks in the ground that may be caused nearby due to the drilling action. The transfer apparatus that is installed on top of the central spline of rigid containment pipes includes a transfer pipe 340 and some other features not visible in this figure. This permits pumping oil and gas from within the containment region to an external storage facility (e.g., a tanker or FSO 70).

FIG. 2a shows the apparatus of the present invention as it is shortly after installation and after the marine riser 30 is in place. FIGS. 2b and 2c show what happens to the membrane 100 when oil or gas leaks from the ocean floor or the wellhead and flows upward outside the marine riser.

In FIG. 2b you see the situation after some oil and some gas has leaked and partially inflated the membrane. The leaking oil 80 is shown here as a pulse that is rising more slowly than the associated pulse of natural gas 90, which has come up with such pressure that some of it is already venting through the vent pipe 350 (identified in FIG. 2a) and is being flared off.

If the leak is relatively small and brief, as in the case illustrated in FIG. 2b, it may be desirable to pump out the material from within the containment region and route it through the system normally used to recycle the drilling mud, where the oil and/or gas can be separated from the seawater and any other contaminants it may contain. That can be done by having a side pipe from the transfer pipe 340 leading to the top of the drilling platform and into the mud reclamation system located there.

That mud reclamation system is intended to separate the drilling mud, the rock chips that it carries up from the tip of the drill, and any oil, gas, or seawater that may have gotten mixed into the mud. The separated and now-cleansed mud will be stored for reuse during subsequent drilling. The separated oil and/or gas is stored separately as a useful product of the well. The rock chips and other debris are stored in yet another container and may eventually be sold or otherwise safely disposed of. Any seawater removed can, if it is sufficiently cleaned, be discharged back into the ocean. Otherwise it will be treated as waste material to be stored and later shipped to a safe disposal site. This mud reclamation process is not intended to handle blowout levels of flow. Rather, it is designed for flow rates of the return mud in a normal drilling situation. Production wells typically yield flow rates at least ten times smaller than the Deepwater Horizon blowout flow rate, and often even less than that.

In FIG. 2c you see the situation after many days of a very large flow rate leak. Now the membrane is very nearly fully expanded with oil 80 and gas 90 and its contents are being pumped out via the transfer pipe 340 into the waiting FSO or tanker 70 through the tanker's hose (or several parallel hoses) 75. Since this is now an emergency situation, and the captured petrochemicals in the containment region need to be removed as quickly as possible before the containment membrane gets filled beyond its capacity and might therefore break, it will likely not be feasible to route the contents of the containment region through the drilling platform's normal mud reclamation system for processing the drilling mud, seawater, rock chips, oil and gas to separate it into those components. Instead it is likely that all of material pumped from the containment region will simply be transferred to an FSO or tanker for later processing elsewhere. As a consequence, it is unlikely there will be any high-pressure gas escaping through the vent pipe 350 at this time, and thus no flare is shown at the top of that vent pipe in FIG. 2c, although, if the gas pressure is too high, or if the FSO or tanker is unable to compress and store the gas, it could be vented and flared off during the transfer of the rest of the captured material that is being pumped out of the containment region.

FIGS. 2a, 2b, and 2c show only the active components of the oil leak containment system; any necessary braces or clamps can be inferred and will be built in the normal fashion for such construction.

Later on, after the leak slows or stops (or, if the well head was the source of the leak, after the well gets successfully capped), the remaining oil and gas in the containment region will rise toward the surface. The pressure of the surrounding ocean will then push the part of the membrane 100 below that oil and gas back against the central spline. The membrane hem is weighted and also it is actively held down to very near the ocean floor. Indeed, it may well sink into the sand on the ocean floor. In any event, it will prevent any significant amount of seawater from flowing into or out of the containment region. (And if there is a leak of heavy crude that falls to the ocean floor, its migration out of the containment region will be inhibited by this membrane.)

Because the containment membrane is initially folded so many times, even though it is made of a non-stretchable material, it is able to expand as necessary when oil or natural gas leaks from the well from the nearby sea floor, providing a large volume of protected space into which the leaking oil or gas can flow. This large volume provides a substantial time during which the leak can continue before that volume is filled, thus giving the operators of the drill rig ample time to bring a tanker into place and prepare to pump out the contained petrochemicals.

FIGS. 2a, 2b, and 2c show various components of the apparatus and the MODU in their proper relative sizes assuming a typical drilling platform that is a fairly typical 60 meters (200 feet) wide. The one exception to this is that in this instance the membrane is shown as being expanded at the bottom to diameter of also nearly 60 meters. In the exemplary implementation described below, this bottom diameter is specified as only 17 meters. It would be possible to have an implementation that did provide a bottom expansion to 60 meters diameter, by using segmented horizontal extension arms, but that might well be considered overkill, and it would certainly complicate the construction of the expansion assemblies. So one might simply view the exaggerated diameter of the containment region in FIGS. 2a, 2b, and 2c as something done to make more obvious the structure inside the membrane that expands it at the bottom as well as to show more clearly the manner in which the membrane can changes shape as it fills or empties, and to show an example of how the membrane bottom can conform to an uneven sea floor topography.

Making the Membrane Package

The membrane that surrounds the containment region is comprised of a plurality of panels. Each of these panels is pleated to narrow it into a "membrane panel package" and then these membrane panel packages are seamed to one another to form the final "membrane package." The outer edges of this membrane package will ultimately be connected to one another after the membrane package is wrapped around the central spline, thus forming a sealed cylinder around the central spline. Once that is done, and the top end of that cylinder is also sealed shut the containment region will be complete.

Making the membrane package requires many steps. The first step is making the membrane material, which may be done either at a third-party supplier or by the company creating the oil leak containment system contemplated by this invention.

For the exemplary implementation described and discussed below, the membrane material will be supplied to (or created at) the factory on a number of separate reels. This factory is where all the parts of the oil leak containment system will be made and at least some of them assembled. (Some parts will be assembled on the special-purpose oil leak containment system's service barge either at the job site or before that barge gets to the job site.)

The following numerical values are particular to an exemplary design in which the membrane material has a thickness of 0.008 inches (0.20 mm). In this design, the bottom 150 feet (45 m) of each membrane panel is formed out of a membrane material that is 166.5 inches (4.23 m) wide, and above that the membrane material for each panel will be just 96.5 inches (2.45 m) wide all the way to its upper end. And in this particular design there are 24 such panels.

Narrowing the panels above the bottom 150 foot section is optional. Doing that allows one to make a much longer membrane panel for use in a deeper drilling location. For drilling locations that aren't in nearly such deep water, an exemplary design would keep the membrane panel at its full width of 166.5" for all of its length. This could be done with the numerical values cited here for any well at a location where the water depth was less than about 9,900 feet (3,017 m). To show what could be done for ever a deeper drilling site, the rest of this discussion assumes that the membrane panels will be made with a 150 foot long wide section followed by the remainder having the narrower width.

The extra-wide supply of membrane material which is sufficient for creating all of the membrane panels can be delivered to the factory wound onto a single reel. This portion of membrane material will be 166.5 inches (4.23 m) wide by 3600 feet (1,097 m) long. It can be wound onto a reel that has a core 10 inches (0.25 m) in diameter by 166.5 inches long between flanges that are at least 42 inches (1.07 m) in diameter. A convenient size for these flanges might be 48 inches (4 feet or 1.22 m) in diameter and that is what is shown in FIG. 3a.

The other supply reels will each contain enough membrane material to extend almost all the way from the ocean floor to surface at the drilling site where the oil leak containment system is to be installed. (Or enough for the deepest such location if this system is intended to be used for multiple wells in succession.)

One useful consideration in deciding what the maximum length for a membrane package might be would be to figure out the maximum length that could be transported in a standard intermodal shipping container. The following numbers assume the use of an ISO standard 45-foot long intermodal shipping container (the largest of the industry-standard sizes, apart from a few sizes mainly limited to use in North America). This container size is approximately 8 feet wide, 9 feet high, and 45 feet long (outside dimensions). The industry standard inside dimensions vary slightly by supplier, but a safe size that will fit into almost any supplier's 45-foot container would be anything up to 91 inches wide by 106 inches high by 532 inches long.

Without showing all the steps just yet (they are shown later in connection with the discussion of FIG. 6a) it is easy to show that the longest membrane package in of the exemplary design will be approximately 17,018 feet (5,187 m or 3.22 miles) long by 97 inches wide. Taking off the first 150 feet, the 24 supply reels for the remainder of the membrane material for one panel will need to be 96.5 inches (2.45 m) wide between the flanges, and with a 10 inch (0.25 m) core diameter, the flange diameter will need to be at least 52 inches (1.32 m) in diameter.

FIG. 3a shows the first supply reel with a small portion of the 166.5" wide membrane panel material unwound from it. As you see here, a special extra-thick membrane panel hem section 106 is attached to the end of this extra-wide membrane panel material. This membrane hem section is 4 inch (0.1 m) wide in the direction from top to bottom in this figure, and it has 47 holes, each 1.5" diameter equally spaced 3.5" (88.9 mm) apart and with this overall array of holes centered on the hem material.

The hem material may be fairly stiff. For this reason it also has lines across it midway between each of the holes where it is somewhat thinner, thus making it easier to fold the hem at those locations. This leaves a region on either end of the membrane panel hem that is 1" (25 mm) wider than the space between the holes. This will end up as a flap that will be used to connect this panel to the adjacent panel in the overall membrane package. In the inset (which shows a 500% magnified view of the very left end of the hem) there is indicated a thickened portion of the outer edge of the hem. This is only present on the left side of the first panel and on the right side of the last panel of the 24 panels that will be assembled into the overall membrane package. Further, the left-most flap shown on this panel is unlike that left flap on all the other panels but this one (and the same as the right flap on all but the last panel) in that it is only 0.75" (19 mm) wide and the extra thickness is an attached strip of material just 0.375" (9.5 mm) wide that will be attached not only to the membrane hem, but all the way along the edge of the membrane panel at those edges and which thickened edge will ultimately be on the outer ends of the overall membrane package and will be used when that package is installed around the central spline both as a way of gripping and guiding those edges into alignment and then for bonding those edges together securely to complete the installation of the membrane package around the central spline. This added thickness might consist of a Velcro™-type hook and loop material (hook-material on one side of the membrane package and loop-material on the other), or it could be one side of a plastic zipper, or just a strip of material that can be welded or cemented or otherwise secured to the similar strip on the other side of the membrane package. This added thickness might best be added just after the membrane panel material has been pulled through the pleating machine shown in FIG. 4, but before it is sent through the pinch rollers, also shown in that Figure.

An alternative to this might be to have these side flaps be not just 1" wider than the space between the holes, but instead some integer multiple N (equal to or greater than 3) times 0.375" wider than the space between the holes, and then the fat portion could be achieved by folding the outer edge of this flap over itself N–2 times. This would make the flap of the same material as the rest of panel but N–1 times as thick as the rest of the panel. That folding could be done just after the membrane panel material has been pulled through the pleating machine shown in FIG. 4, but before it is sent through the pinch rollers, also shown in that Figure (the same time as suggested above for adding a thicker strip to the membrane panel). This approach might be most useful if solvent-based bonding were to be used when sealing the panels together, in which case, the layers that are to be folded together to form the fat edge could also be solvent bonded to one another.

The purpose of this hem is to provide places (the hem holes) where a heavy chain can be attached to the membrane without damaging the thin membrane. The hem itself may also be weighted, perhaps by making it out of 47 metal plates with holes in each one all of which are wrapped in the membrane material to hold them adjacent to one another (with a small gap to serve as the thinner regions where the hem can fold easily). The heavy hem will pull the very bottom of the membrane down to the ocean floor, and if that is sandy, some distance into it. The holes serve as connection points from the hem to a heavy chain that helps hold the hem down, and that is in turn connected to the extension arms attached to the central spline in a manner that permits raising and lowering the hem as desired. As the hem is thus held down to (or into) the ocean floor, it will serve to hold the membrane in position against any water currents that might otherwise disturb it, and it will prevent the migration of any heavy crude oil components that might otherwise flow across the ocean floor.

It is of some importance that the extra-wide membrane panel material be cut off of this reel at exactly the same length for each of the panels. As long as the reel holds slightly more than 24 times the amount needed for one panel, this can be done with only a small amount left on the reel at the end of the process. The reason for this requirement will become evident during the discussion of FIGS. 5a to 5h.

FIG. 3b shows a typical one of the 24 supply reels holding the narrower membrane material, with each one holding enough for one panel of the final membrane package. The length of this regular-width membrane material must be identical on each such reel, so that the total length of each membrane panel will be precisely the same. If the supplier of these reels of 96" wide membrane panel material can only guarantee an approximate amount on each reel, it may be necessary to cut each panel's membrane material off at the desired length as one step in the membrane panel package preparation to insure the equality of each membrane panel package's length. Again, the reason for this requirement will become evident from the discussion of FIGS. 5a to 5h.

FIG. 3c shows how, in this particular design, the extra-wide section of membrane panel is joined to the narrower one, and it indicates the overall length of each portion. The left and right edges of both portions of the membrane panel material shown on this diagram are where the added thickness strips are added as each membrane panel package is formed.

It will be useful to make sure that there is an equal amount of overlap between the two widths of material on each membrane panel. Just a few millimeters should suffice, just enough for an adequate seam to be formed. Further, that seam should connect the two materials all along that overlap except for the outermost 1" (25 mm) on each side (see the 500% magnified inset in FIG. 3c). In this figure the narrower material is shown as having been laid on top of the wider material before they were seamed together. This inset also shows a small slit in the 96.5" wide membrane material at the point where the seam ends on the left side. This slit is only needed on that side, but the gap between end of seam and edge of membrane material is needed on both sides. The slit is there to allow tucking that edge flap of the narrower material behind the wider material. The need for this is explained in connection with FIG. 4.

Figure 4A:
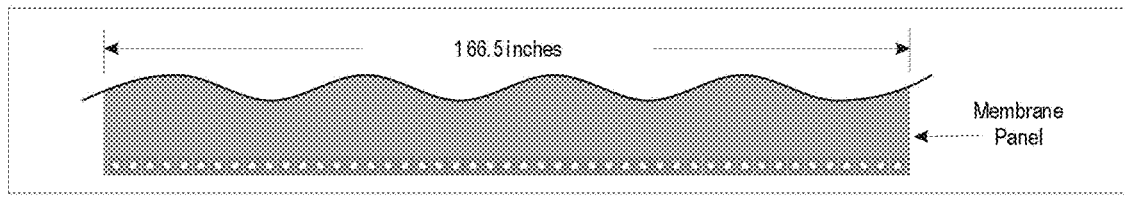
FIG. 4a through 4e shows how each membrane panel is pleated to form a membrane panel package.
Figure 4B:
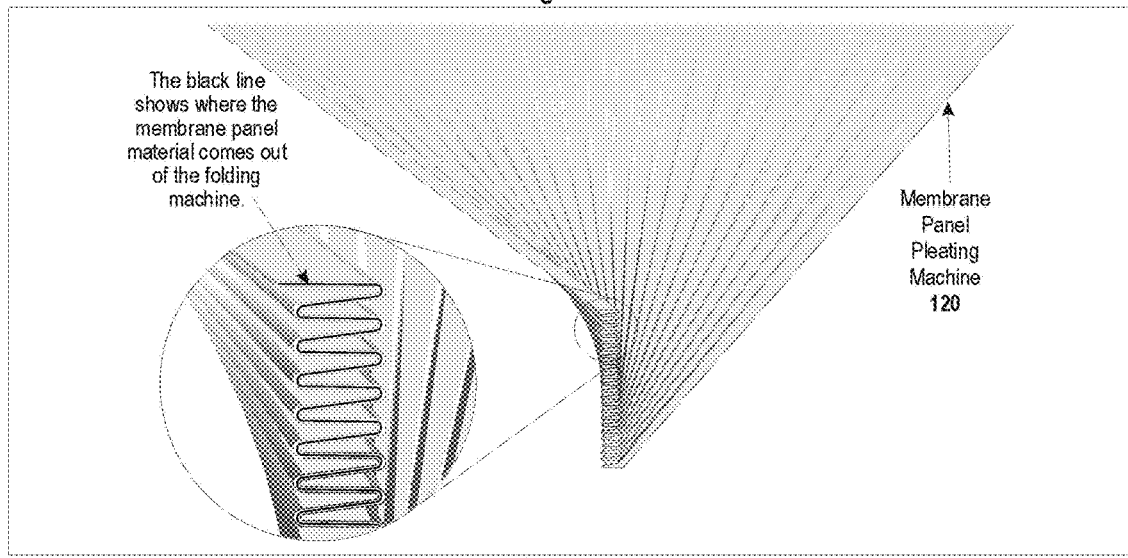

FIG. 4 shows how this membrane panel material is manufactured into a membrane panel package. Again there are several steps. At the top in FIG. 4a you see the lower end of the panel with its hem. This will be directed into the upper end of a uniquely designed device shown in FIG. 4b. This is the membrane panel pleating machine 120 and it is formed from two sheets of smooth and stiff material across the surface of which the membrane panel material can easily slide. These two sheets are parallel to one another. At the upper edge they are straight, flat sheets, shown here as being connected to one-another at their outer edges to establish their spacing (and making the whole appear from this edge as a flattened tube). But as one progresses downward in this drawing of this pleating machine you see that these sheets have been severely folded. In fact, each 3.5"-wide section continues to be a pair of parallel flat sheets, but each such section is folded and/or pulled to the side in a different manner. Adjacent sections are folded back and forth so that at the bottom, the overall machine, which starts out just over 166.5" wide ends up just 3.5" (89 mm) wide, except for the upper-most and bottom-most sections which stick out to the left and right, respectively, by an additional inch (25 mm). [The only exception to this is the left side of the first panel and right side of the last panel where this flap sticks out only 0.75" (19 mm)—or possibly more if it is to be multiply-folded to fatten the outer half of it, as discussed above.]

As the membrane panel material travels through this machine it becomes pleated as is shown where it emerges at the bottom end of the folding machine. The inset (500% magnified) shows the details of one end of the exit orifice of the folding machine. The form of the membrane panel material as it exits the folding machine is indicated here with a black curving line. The edges of the folding machine material are indicated as either a pair of lighter or darker grey lines representing the top and bottom layers of the folding machine. The significance of the lighter versus the darker portions will be made clear in the next paragraph.

Once all of the wider portion of the membrane panel material has exited from the membrane panel pleating machine the process must be stopped briefly to enable an important additional step to be taken. At this time the narrower material is coming out of only the central 27 of the 47 spaces at the end of the pleating machine. (These are the spaces whose edges are shown in the darker grey in the left-hand inset in FIG. 4b.) As it does so, the side flaps on the top and bottom layers will unfold outward and in so doing they will align exactly with the side flaps of the now 47-layer wider section. (In order for this to happen, those outer edges must not be captured by the wider layer to which this narrower layer is seamed. This is why the seam between the two widths of membrane panel material must not connect the outside 1" of the narrower material to the wider material, and why the left edge, and only the left edge, of the narrower material has a slit to permit tucking the narrower membrane material behind the wider membrane material. That makes both edges of the narrower material lie outside the pleats formed in the wider material.)

Now the top eleven layers of the wider material can be seamed together, thus closing off the top of these pleats so that none of the hydrocarbon material captured within the containment region can leak out there, and this also closes down the top of the containment region surrounded by that wider material to a diameter that matches that provided by the narrower membrane material. Also this is a good point in the process to attach the extra thickness strips 103 to those outer edges of the side flaps. This can be done at this point by having an apparatus (not shown in FIG. 4) adapted to force the outer flaps on each side of the two widths of membrane panel material to line up and be seamed to one another, as well as to the extra thickness strip for that side—and the integrity of that extra thickness strip would add to the security provided by the seaming action between the two sections of membrane material.

Optionally, one may also at this time remove the top ten layers and the bottom ten layers of the pleating machine. These are the portions whose output edges are shown in a lighter grey in FIG. 4b. If this is not done the outer flaps of the 27-layer membrane panel package will be curled as they go through the pleating machine but they can be unfolded again (perhaps by the method and apparatus just discussed that attaches the extra thickness strip to those outer flaps) before passing the package through the pinch rollers that form the final membrane panel package.

An Alternative Way to Vary the Membrane Panel Width

In the exemplary implementation described here there are only two widths to the membrane material used to make each membrane panel package: a wider one for the bottom end and a narrower one above that. Alternatively, one could start with a supply spool holding enough length of the widest material to go the entire distance from ocean floor to the surface, and then have slitting knives mounted where the material comes off of the supply roll to narrow it to whatever width was desired for that particular distance above the ocean floor. This approach would allow the width to be varied virtually continuously. Alternatively, the width would be varied in a step-wise manner, narrowing it just enough to eliminate one pleat on one or both sides at each step. If it were always changing from wider toward narrower then the only modification of the procedure described above would be that one would have to stop the process and seal off the top of the outer-most pleat on whichever side of the membrane panel package was being narrowed at that step. This would keep from making any holes in the membrane package where oil or gas could leak out and it would continue to make the outer edge flaps continue to line up so they could have the added thickness strip for the final seal added to them. When the membrane package is complete and installed around the central spline, as it is filled with captured oil and/or gas it could unfold thus expanding outward with a more nearly smoothly varying diameter, instead of the single large step change in maximum diameter that happens with the exemplary implementation presented here. The major downside to this approach is the need to prepare far more membrane material than will be used. Also with this approach one could, optionally, at each step remove a layer from the pleating machine for each pleat that was eliminated.

Completing the Membrane Panel Packages

Figures 4C, 4D, 4E:
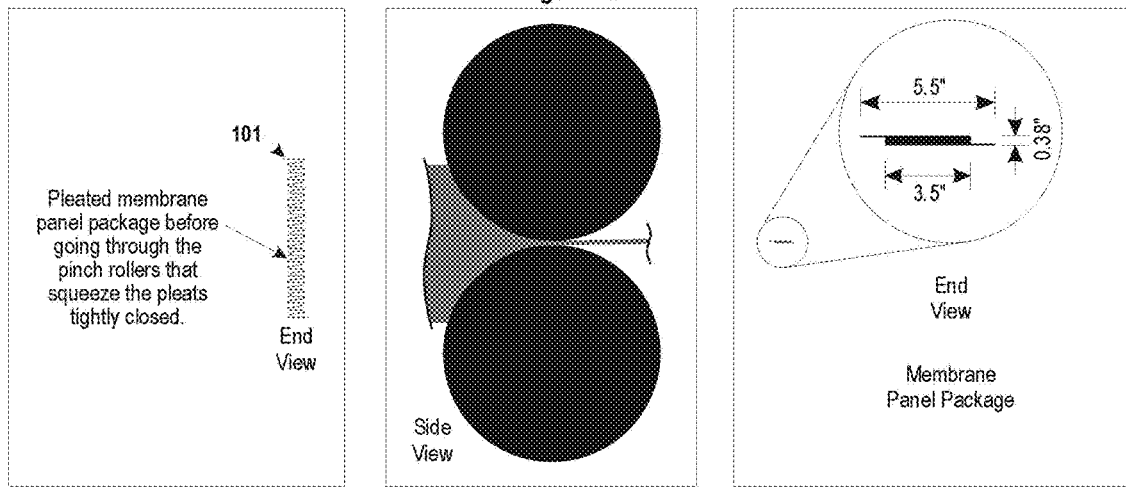

In FIG. 4c you see an end view of this now-loosely-pleated, 47-layer membrane panel material. Indicated here also is one of the open edges 101 of the membrane. To the right of that, in FIG. 4d, you see a side-view of just a portion of that membrane panel material after it exits the pleating machine and as it is directed through a pair of pinch rollers. These rollers, shown here as having roughly a 5 foot (1.5 m) diameter, tightly compress the pleated membrane panel material into the final form of the membrane panel package shown in end view in FIG. 4e with a 500% magnified inset drawing at the top of that figure.

The last step in creating the membrane panel package is rolling this package up on an intermediate transfer reel. This reel will have a core length between its flanges of 5.5" (to accommodate not only the 47-layer and later the 27-layer portion, but also the flaps extending off each side), but since most of the membrane package is only 3.5" wide, the membrane panel package should be guided onto this reel carefully so that it stays centered on the reel and doesn't fold the flaps on either side. This could be accomplished by a pair of spring straps (not shown here) that lightly bear on the sides of the thickest part of the membrane package as it is wound onto the intermediate transfer reel and that can flex away from the center line of the take-up reel as more and more of the membrane panel package is wound on that reel. (One of these strips will follow along on the under side of the flap of membrane material extending off to the left, and the other will follow along on the top side of the flap extending off to the right.)

If the core diameter of each of these intermediate transfer reels' flanges is 10" (0.25 m) then the flanges must be at least 35.5 feet (10.8 m) in diameter in order to hold the entire length of that membrane panel package.

In FIG. 5a you see a top view of all 24 of these intermediate membrane panel package transfer reels lined up beside one another and mounted on a common axle. (These reels must be able to rotate individually, rather than being locked to that axle and forced to rotate as one, because the paths to be followed by the separate membrane panels in joining with one another differ in their length, with the central panel traveling the least far and the outermost panels traveling the greatest distance.) In all parts of FIG. 5 the membrane package is shown in medium (40%) grey and the membrane guides 180 and other hardware items are shown in black. The one exception to this shading scheme is in FIG. 5g where not only are the membrane portions shown in medium grey, the extra thickness edge pieces are shown in dark (70%) grey. The purpose of these different shades is to make clear what parts of the figure show hardware that contains, guides, or supports the membrane panels and the final membrane package, and what portions are specially added parts (the thickened edge pieces) of that membrane package.

As the membrane panel packages are pulled off of those reels they travel over pairs of parallel rollers set at an angle so the membrane panel doesn't arrive at them at right angles to their length. The angle of tilt for the pairs varies from membrane panel to membrane panel in a regular progression from the top to the bottom of this figure, so that the individual membrane panel pieces come closer together as is suggested by FIG. 5a. In addition, these roller pairs can lift or lower each membrane panel as necessary to accomplish the alignment described in the next paragraph. One of each pair of rollers is located at the left side and the other at the right side of the indicated region in FIG. 5a.

This roller pair arrangement displaces the individual membrane packages both horizontally and vertically in a manner chosen so as to bring them into an alignment in which the adjoining membrane panel packages have their multi-layer pleated sections separated by 0.5" (13 mm) horizontally and approximately 0.75" vertically (forming an ascending staircase going from the left-most to the right-most panel, as viewed from a point on the right in this figure looking back to the left at the intermediate transfer reels. Immediately after this alignment region is a row of 23 seaming machines which capture and guide the side flaps of each pair of adjacent membrane panel packages together, folds them over one another into a four-layer arrangement, and then seals these now-folded together flaps to one another, perhaps by welding (ultrasonically or thermally) or by adding an adhesive material between them, or by softening the surfaces to be joined with a solvent and then cold-welding them together by pressing them together.

In the exemplary implementation the resulting seam connects the panel packages with a 0.5" (13 mm) inch space between the 3.5" wide pleated sections. This implies that the overall membrane package (the collection of 24 now-connected membrane panel packages) is just 97" inches (2.46 m) wide including the two unconnected 0.75" (19 mm) wide flaps extending off of either side of the package. (These presently unconnected flaps have the outer-most half of each flap's width thickened by the added strips that will be used to create the final seal around the central spline.)

This figure also shows the location of a "fork" used to create a cuffed portion 105 of the overall membrane package as well as entrance and exit guides on either side of the region where that cuffing takes place. And at the right-hand end of this figure is a region labeled as the bolt/reel on which the membrane package is wrapped ready for shipment to the drill site. All of these features are explained more fully in connection with FIG. 6.

FIG. 5b shows an end view of several adjacent membrane panel packages (in their staircase alignment described above) as they are when they arrive at the 23 membrane panel edge folding machines 125 and membrane panel edge seaming machines 126 used to join all of the membrane panels into one membrane package. The medium grey rectangles in this figure are the 47-layer (or later in the process, the 27-layer) pleated membrane material stacks that comprise each of the 24 membrane panels. The medium grey lines extending off either side of these rectangles are the edge flaps on either side of each of those membrane panels. The black lines that surround each of those edge flaps are a cross-section of the top and bottom surfaces of the individual panel-to-panel edge folding machines 125 that guides these edge flaps into the configuration they will have when they are to be sealed to one another. The portion of each figure that is surrounded by a small circle is shown magnified 600% in the attached larger circle. Inside this magnified view in FIG. 5b the number 102 refers to one of the two open edges 101 of the membrane panel packages which will be joined to another such edge in this seaming machine. The number 125 indicates the end view of this portion of this seaming machine. The outside open edges on the outermost panels on either end of this line of seaming machines which will not get joined to another such open edge are the edges that have the thickened edge pieces 103 attached to them as can be seen in FIG. 5g. Each of these membrane panel edge folding machines is similar to the membrane panel pleating machine 120 in that it consists primarily of a pair of rigid sheets of slick plastic that are formed to guide the flap edges together and around one another in a manner that creates the folded arrangement that will be sealed by the seaming machine. That seaming machine (details not shown here) might be simply a pair of wheels that compress the now-folded together flaps while applying pressure, heat, and/or ultrasonic energy, or just pressure after an adhesive or solvent has been squirted between the flap layers to effect the seam's seal. One possible design might be modeled after that discussed in detail in the section on the "Seaming Machine," below.

FIG. 5c shows how these edge flaps are first bent and tilted toward one another (in this case by 22.5 degrees), and the adjacent panel packages are moved a bit closer to same vertical position. Again, the portion shown in the small circle surrounding the region between adjacent panel packages is shown magnified 600% in the attached larger circle.

FIG. 5d shows the next step in which the each end flap is bent yet again and the adjacent panel package are moved vertically to align with one another. Here the inset shows the now-smaller region where the edges are now fully wrapped around one another with a 600% magnified view in the larger circle.

FIG. 5e shows how as the panel packages emerge from the aligning and folding guides the welding tips come in from both sides to push the folded edge flaps into contact and then weld (or cement) them securely together (in this illustration with two parallel welds). In this figure, unlike in the others, the inset shows a view that is magnified almost 900% over the size in the smaller circle. This is done so you can see more clearly how the edge flaps are folded together and then welded to one another.

FIG. 5f shows how the membrane panel packages are finally hooked together into the full width membrane package. Again the inset is magnified almost 900% the better to reveal the details.

FIG. 5g shows an end view of the entire membrane package 104 with the special 0.75" (19 mm) wide edge flaps with special thickened outer edge pieces 103 applied on both the left and right ends of the package and with identical joints where the open edges 102 of the adjacent panel packages have been seamed together. Here the left and right ends and a region in the middle are surrounded by ellipses and a 500% magnified view of the content of those ellipses is shown in the corresponding larger ellipses. The thickened portions of the end flaps are shown in dark grey, whereas the rest of the membrane package is shown in medium grey. This is both because the thickened edges may be make up of a different material and also to make more evident where these pieces are in this drawing.

Packaging the Membrane Package for Shipment

The last step in preparing the membrane package for shipping is to roll the membrane package onto a special sort of reel with a core that is three inches (76 mm) thick by 443" (11.25 m) long, with rounded ends, and which is 97" (2.46 m) tall between its end flanges. This is something that in many ways resembles the bolts on which fabric is customarily wrapped for sale in retail stores, just on a rather larger scale and with end flanges that are wide enough to contain all of the material wound on the bolt. Alternatively, it can be thought of as a reel with a core that has been squashed flat.

FIG. 5h shows an edge-on view of the full membrane package after it has been wrapped on this bolt/reel 110 and how that bolt/reel fits within an ISO standard 45-foot shipping container. The dimensions at the top and on the left refer to the membrane package and the bolt/reel on which it is wound; those on the right and bottom are the outside dimensions of the shipping container.

When the membrane package is viewed from its edge as it is wound on this bolt/reel one can easily see a way to calculate the maximum cross-sectional area of that package. The complete membrane package can be thought of as having three sections. The bolt core is 3" thick and the overall membrane package, viewed in this figure, is 91" from top to bottom and, ignoring for the moment the semicircular ends of the core, its length is 440". So the cross-sectional area for this central section is simply (91"–3")×440"=38,720 square inches. The two end regions are halves of a circle with an outside diameter of 91" and an inside diameter of 3" so its area is simply pi*$D^2$/4=3.14159× ($91^2$–$3^2$)/4=6,497 square inches. The total area is thus 45,216 square inches. But we also know that the membrane package is 0.38" thick for the first 150 feet (1800") which accounts for 684 square inches. Subtracting that and dividing by the thickness of the rest of the membrane package (0.22") yields 202,421" (16,868 feet or 5,142 m) as the maximum length for that thinner portion. Adding back the thicker portion's 150 foot length gives us the maximum total membrane package that will fit on this reel and thus into an ISO standard 45-foot intermodal shipping container as 17,018 feet, 3.22 miles, or 5,187 m.

This maximum membrane package length is more than the ocean depth in all but the very deepest locations, and it is certainly enough for most, if not all, of the locations where oil drilling has been proposed in the past. For comparison, the Deepwater Horizon well was drilled in water that was only 1.6 km (5,100 feet—not even one mile) deep.

In particular, this length is far greater than the depth of the ocean on the continental shelf surrounding most of the continents on the Earth, which is where one might wish to drill, but where regulators (and others) fearing an oil spill often don't permit oil drilling. One of the most significant advantages of installing the present oil leak containment apparatus on an underwater drill rig may be that it makes drilling so safe that such fears can be allayed, and therefore drilling may be permitted where it now is not.

If one wished to drill an underwater well at a location that was even deeper than the maximum length membrane package cited above, it would be possible to make an even longer membrane package. This could be done by using a thinner membrane material. Alternatively, one could make the narrow portion of the panels even narrower than has been described here. That would let the bottom end balloon out as much as the design shown here and yet extend the maximum depth to which protection could be offered by trading off containment region width for its height, thus still allowing a truly huge amount of blowout oil and/or gas to be contained, and still be able to fit the entire membrane package, on its bolt/reel, into a standard intermodal shipping container.

The end flanges of this bolt/reel 110 are 532" (13.5 m) long by 91" (2.31 m) wide with semicircular ends so that the entire reel fully loaded with the membrane package 104 can be loaded into a 45-foot shipping container. In the exemplary implementation those end flanges are 1.5" (38 mm) thick and the top flange includes attachment points recessed within it to permit lifting the loaded reel using a crane. The bottom flange is connected to a base plate with the same outside dimensions. The connection between the base plate and the bottom flange is by both a large circular bearing, to insure smooth low-friction turning, and a very-low profile motor mounted within that bearing that can force the reel to turn. (This turning action is the principal method by which the membrane panel package material is pulled off each of the intermediate transfer reels, over the alignment rollers, through the seaming machines and then onto the reel, shown in edge view at the right in FIG. 5a.) If this base plate, including the bearing and motor, is no more than 5" (127 mm) thick and the space between the base and the bottom of the bolt/reel is no more than half an inch, the total height of the reel plus base will be 106" which is the maximum size that can safely fit into the standard 45-foot shipping container.

Before the membrane package is entirely rolled onto the bolt, preparatory to putting it into the shipping container, there a couple of more steps that must be done at the factory. Specifically, in these steps, the end of the membrane package that is next to its hem—the portion that will end up nearest to the ocean floor—must be "cuffed," which is to say it must be folded back upon itself several times and then securely clipped to keep it folded in this fashion until it is installed onto the bottom-most pipe section of the central spline. Once the membrane package is wrapped around that bottom-most pipe section and sealed into a tube this folded back multi-layer section will become a multi-layer cuff on the bottom end of the membrane package which will allow it to expand horizontally when the expansion members attached to the bottom-most section of the central spline expand outward.

Figure 6A:
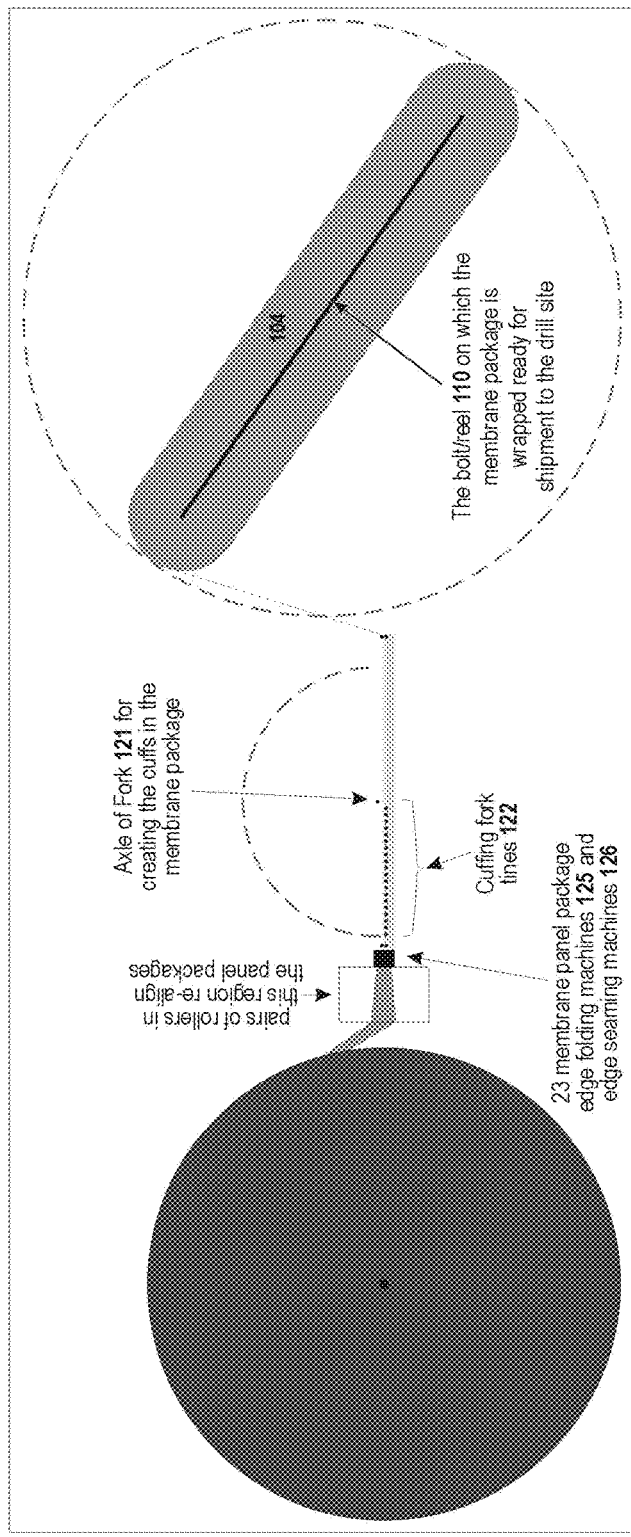
FIGS. 6a and 6b show an alternate view of the process shown in FIGS. 5a-5g, showing more details on how the final membrane package is cuffed near one end as it is being rolled onto the bolt/reel on which it will be transported to the drilling site for installation around the central spline.
Figure 6B:
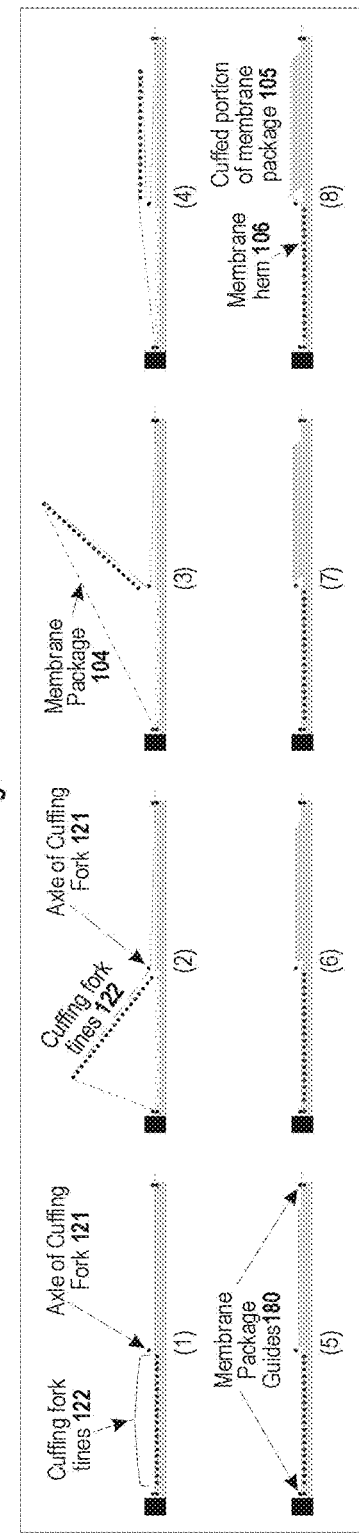

To facilitate these steps the seaming stations should be at least 25 feet (7.6 m) away from the bolt. At both the beginning and the end of this section, just before the membrane is pulled onto the bolt, it is passed between a pair of closely spaced guide bars. Between these pairs of guide bars the membrane package passes over a long table. In FIG. 6 this table is shown in very light (15%) grey, the membrane material in medium (40%) grey, and all of the other pieces (specifically, the reel ends for the supply reels, the bolt/reel core 110, the guide bars 180 and the fork 121) are shown in black. The first half of that table has a number of slots in its surface at right angles to the direction the membrane package is traveling. Lying in these slots are long rods or tubes that serve as tines 122 on a large fork 121. This fork can be rotated around another such rod or tube we can call the fork's axle which is displaced upward from the plane of the tines by a short distance as well as being displaced sideways about as far as the inter-tine spacing from the right-most one of the tines. This is the fork shown from above in FIG. 5a and looking down its axle in FIGS. 6a and 6b.

In FIG. 6a this axle is shown as being a substantial distance above the table on which the membrane package slides. This was done for the purposes of this figure only. In practice the axel would normally be down quite close to that table surface, just barely enough to let the membrane package pass underneath it. (In the figure the membrane package is shown as a line that, to scale, would be almost three inches thick, and thus is 8 to 13 times thicker than the actual membrane package. Furthermore, in FIG. 6b the same line is used and here the membrane package is folded back on itself and for visual clarity there is a space left between those layers of membrane package that, to scale, would be another inch or more. So these exaggerations are used here only for clarity in seeing where the membrane goes and how it is folded into cuffs.)

FIG. 5a shows a top view of the steps in creating the final membrane package and winding it onto the bolt/reel at the right-hand end of that figure, assuming that the rotation axis of the bolt/reel is horizontal at that time. Likewise, FIG. 6a shows a side view of the same things. But when discussing FIG. 5h and in the paragraphs just above, the bolt/reel was described as having a vertical rotation axis. The explanation for this difference is that this bolt/reel must be able to stand on its base (with its rotation axis therefore vertical) during shipment and during its use on the service barge from which this oil leak containment apparatus is installed. And yet that base must also be able to be attached at the factory to a mechanism that can lift and rotate the bolt/reel to a position where its rotation axis is horizontal and approximately 25 feet above the factory floor in order to have the membrane package wound onto it. One reason for having this step done with the bolt/reel axis horizontal (and also the axle for the intermediate transfer reels horizontal) is that then there will be no tendency for the membrane panels to sag under gravity and therefore tend to move out of line as they pass from the intermediate reels to the final reel.

The membrane package's top end (which will end up near the ocean surface) is the first part to come off of the intermediate transfer reels. It is pulled through the seaming stations and then onto the bolt where it must be securely fastened to the core. The precise position at which it is fastened to the core is a matter of some importance for a reason that will be explained below.

Thereafter the membrane package is pulled through the seaming machines and onto the bolt/reel by the turning of the bolt/reel. But when all but the last 93 feet of the membrane package has been pulled through the last guide bars before the bolt/reel, the turning of the bolt/reel must be stopped. For the rest of the way the membrane package will be pulled through the seaming machines solely by the actions of the cuffing fork.

FIG. 6b shows eight successive views of this action. In all cases you see the seaming stations at the left end, the table with the fork in the middle, and the last pair of guide bars at the right end. Unlike what you see in FIG. 6a, in each part of FIG. 6b the membrane package goes off out of the picture to the right at only a very slight upward slant. This is because, for a reason to be explained next, we want the cuffed portion and the end bit of the membrane package to wrapped around the end of the bolt, rather than down along the side. To make sure this happens, the top end of the package must be secured to the bolt at just the right place, depending on the exact length of the membrane package and the bolt will at this time be turned almost exactly horizontally.

The first part of FIG. 6b, labeled (1), shows the situation as in FIG. 6a at the moment that the bolt/reel has stopped turning. Here the fork tines are all lying the slots in the table. In part (2) you see that the fork has started to turn slowly and as it does so it its tines lift up the membrane package, bending it around the fork axle, and pulling it through the seaming station. In parts (3) and (4) you see this action continue until the fork has turned a full 180 degrees from its starting position. At this point the membrane package to the right of the fork axle is folded back on itself into three layers. Next the edge clamp indicated in FIG. 5a closes over those three layers and clamps them firmly. Once that has been done, the fork is pulled to the side (upward in FIG. 5a, or into the page in FIGS. 6a and 6b) until it comes completely out of the membrane package. At that point two things happen. First, the portion of the membrane package that was on top of the fork falls down to the table on top of the other two layers, and simultaneously the bolt/reel turns just slightly so the membrane package and the edge clamp fastened on it moves about four inches (0.1 m) to the right, pulling that much more membrane package through the seaming machine. While that happens, the fork 121 turns back 180 degrees to its original orientation, and once both of these things have happened, the fork's tines 122 are slid back under the membrane panel (and its axle back over the top of the membrane package). The situation is now as is shown in part (5) of FIG. 6b.

That same operation can be repeated to create additional layers to the cuff. In part (6) you see the situation after one more complete cycle of the fork, after which there are now five layers to the cuff. In part (7) you see it with seven layers in the cuff, and finally in part (8) you see it with nine layers in the cuff. If you look at this last figure carefully you'll also see that the hem end of the membrane package 106 has been pulled off of the intermediate transfer reels, through the first membrane gate, and now it has ended up about three feet to the left of the fork axle. (In this figure that hem portion is shown as a portion of the medium grey line representing the membrane package 104 that has been made twice as thick as usual for the last four inches representing the hem piece 106 that was attached to the membrane panel pieces at the very outset of creating each of the 24 membrane panels.)

After all this has been done, the edge clamp is disengaged completely and some other small clamps are placed on both edges of the cuff region to keep it held tightly to its minimum thickness. (These clamps will be removed at a late stage in the process of mating the membrane package to the bottom-most pipe section of the central spline at the job site, as will be explained below.)

The last step in winding the membrane package onto the bolt/reel can now be done. Although the nine-layer cuff appears quite thick in FIG. 6b, in actuality it will be only about 3.4" (87 mm) thick. Still, that is much thicker than any other portion of the membrane package. Therefore, it is essential that the space between the final guide bars at the right-hand end of the table be opened by lifting the upper guide rod at least a few inches, then turning the bolt/reel until the last bit of membrane package is wound around it. If the top end of the membrane package was properly placed on the bolt/reel then this last portion of the membrane package will end up wrapping around the end of the bolt, rather than running down one side of it. This is where there is extra room in the shipping container so it should be easy there to accommodate any slight bulges that may happen in the cuff region. The curve around the end of the bolt is approximately 12 feet long. The cuff region is about 10 feet long and, if it is started when there are still just 93 feet of membrane package yet to wind onto the bolt/reel, then the portion with the hem will extend out about three feet past the cuff. Thus all of the cuff and most of the remaining hem portion will fit around the end of the bolt/reel.

The very last step before winding the bottom end of the membrane package onto the bolt/reel is to fasten a special stiff support tool to all of the holes in the hem. In the pleating process all of the holes in each membrane panel package are lined up on top of one another which is what enables putting a hook or clip on a special tool through all 24 of these membrane panel's hem-hole stacks. This stiff support tool resembles the spine of a common ring binder in that the 24 openable ring hooks that go through all of these holes are mounted to a common spine, but unlike those binders, these hooks can be opened or closed one at a time, in addition to being able to be opened all at once. Once all of them have been inserted in the hem holes and closed, the common spine will serve as a handle and will keep the end of the membrane package flat. This common spine will end up also being 97" (2.48 m) long. It can, therefore, fit between the end flanges of the bolt/reel. Perhaps the best location for it would pulling it (and the hem it holds) curled back and standing in the corner of the shipping container, rather than pressed flat on top of the other layers down the side of the bolt.

Preparing the Central Spline (Also Called the "Sleeve")

The oil leak containment system that is the subject of the present invention comprises a membrane that surrounds an outer containment region and which is first wrapped around a central spline attached to an iris and transfer box, plus various other support facilities. The central spline and the iris and transfer box make up an inner containment region.

The preceding section detailed how the membrane is constructed. This section describes in similar detail the construction of the central spline. Later sections will describe the iris and transfer box, the ancillary equipment, and the steps involved in installing the entire system.

The central spline consists of many pipe sections. All but the bottom-most one can be identical except perhaps in their length. Optionally, there may be one or two special sections at the top of the central spline. This point will be further explained at the end of this section.

These pipe sections clip together (rather than screwing together like the sections of a drill string) to facilitate connecting communications and power cabling from section to section. FIGS. 7a to 7g show several views of a typical one of these pipe sections, showing the special details that are included in each of them.

Each of the central spline's pipe sections 250 begins as a simple cylindrical pipe with an inside diameter, in the exemplary implementation, of 30" (0.762 m) and an outside diameter of 34" (0.864 m). These pipes are preferably made of a composite material with the requisite strength and yet with a density that renders them nearly neutral buoyant in seawater.

This doesn't mean that they will be light weight pipe sections when they are out of the water. Indeed, the volume of material in such a pipe section if it is 532 inches (44.33 feet or 13.5 m) long is almost 107 thousand cubic inches (which is 61.9 cubic feet or 1.75 m$^3$), so to be neutrally buoyant in seawater with a density of 1028 kg/m$^3$ each such pipe section will weigh nearly two tons (1.8 metric tons, or 1.98 tons avoirdupois). This is the length of the bottom-most pipe section 210 described below (and with many details shown in FIGS. 8a to 8f and 9a to 9c). It also could be the length of all of the other pipe sections, or those other pipe sections could be somewhat shorter. The pipe sections 250 shown in FIGS. 7 and 8 are approximately 40 feet (12 m) long, which is a size that would fit in one of the most common sizes of intermodal shipping container, whereas the longer bottom-most pipe section (in this exemplary implementation) fits into an only slightly less common 45 foot (13.5 m) intermodal shipping container.

Near the top of the pipe section, in the exemplary implementation, there are three equally-spaced rectangular holes 253 about 4" (0.1 m) wide by 6" (0.15 m) tall with the tops of these holes located 6" (0.15 m) below the upper end of the pipe. Also in this implementation, centered between these holes, is an electrical connection box 256 set into the wall of the pipe and which is covered by a waterproof cover on the outside and which is closed on the inside, but which communicates with either a conduit embedded in the wall of the pipe section, or an open channel running down the inner surface of the pipe section to nearly the bottom. There is a vertical open channel 258 cut into the outside of the pipe section from the top end down into this electrical connection box. A cable 257 carrying both electrical power and various data signals runs from within this connection box, down inside the channel, and then out through the outer wall of the pipe section near its bottom end into another vertical open channel 258 that goes down the end of this pipe section. The cable 257 that comes out of conduit or inner channel at this point extends just over 10 inches beyond the end of the pipe section where it terminates with a multi-pin plug. This cable is temporarily folded back and clipped for safe keeping to the top of a metal band 255 which comes from the factory in a position about 6 inches above the bottom of the pipe section.

The upper end of that cable 257, inside the connection box, is terminated with a multi-pin connector that will mate with plug on the bottom end of the like cable coming down from the pipe section above this one when they are joined as a part of the central spline.

Figure 7A:
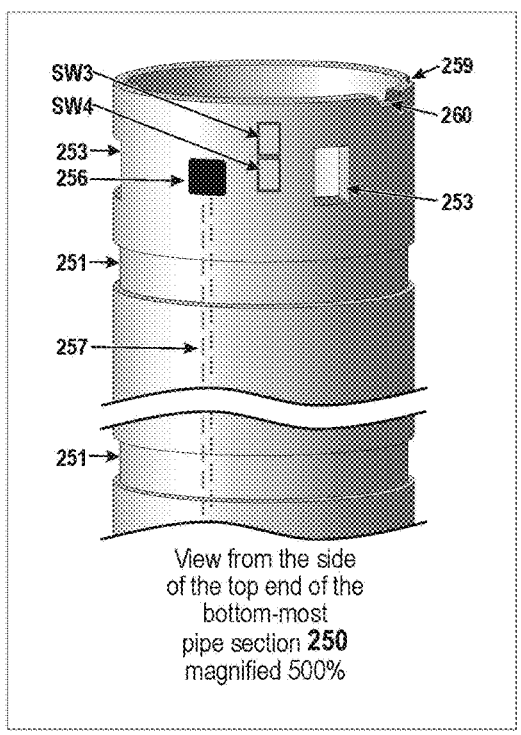
FIGS. 7a through 7g show many of the detailed features in each of the pipe sections comprising the central spline, other than the bottom-most pipe section.
Figure 7C:
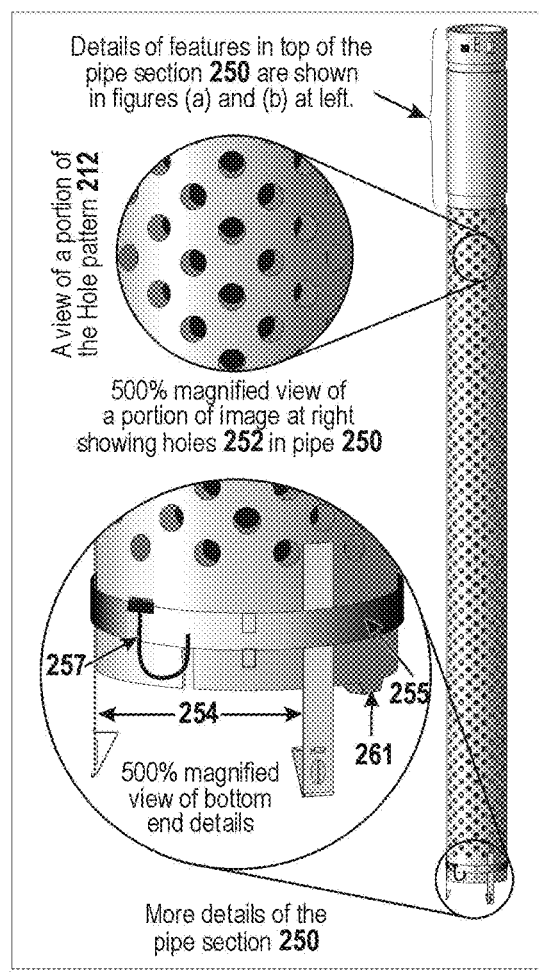
Figure 7B:
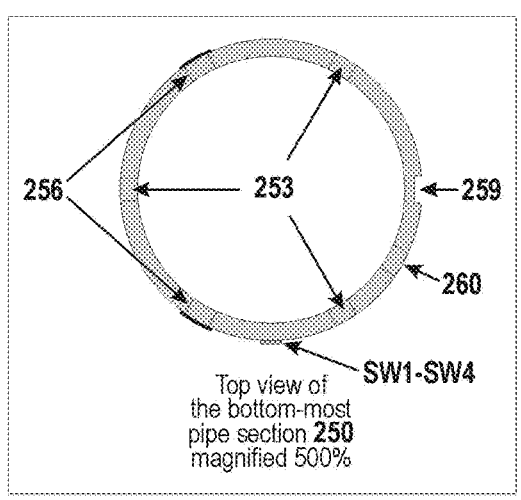
Figure 7D:
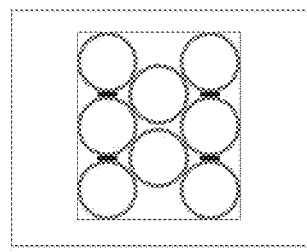
Figure 7E:
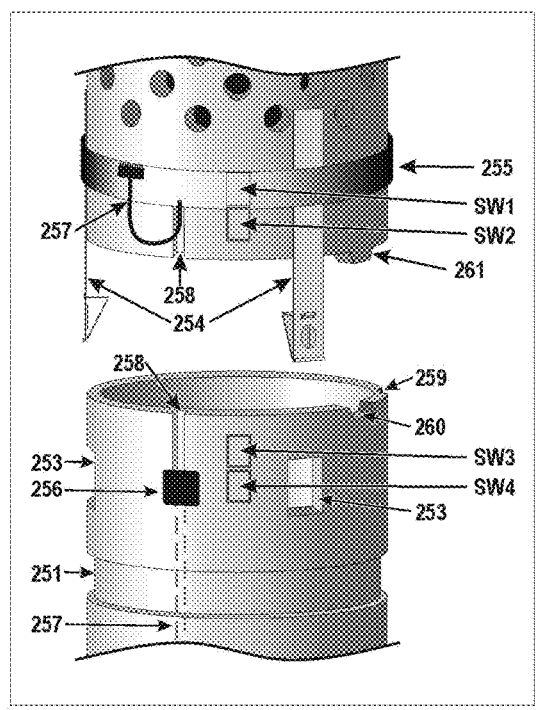

These channels 258 are shown most clearly in FIG. 7e which shows both the top of one pipe section and the bottom of another about to be mated to that first one. Then, in FIG. 7f, you see how the two pipe sections look just after they have been snapped together and after the cable 257 has been unclipped from the locking band 255 and instead has been straightened out down through the channels 258 and into the electrical connection box 256 where it is about to be plugged into its mating connector.

For redundancy it might be desirable to have two cables running down the central spline at each of the two locations indicated in FIG. 7b. There would, then, be two electrical boxes and two pairs of open channels on the outside plus two conduits or channels in the interior of each pipe section in order to accommodate the two redundant cables. This arrangement, combined with suitable circuitry in the bottom end control package, would enable the oil leak containment system to continue to operate normally even if some accident crushed or severed one of these cables at some point along the central spline.

A further elaboration of this would be to put in switchable cross-connections between the two cables in each pipe section, so that if one cable were compromised in one pipe section and the other in a different pipe section, a suitable switching of these cross-connections could allow a working path from the drilling platform to the very bottom end of the central spline, by bypassing all of the compromised locations, so long as there weren't faults in both cables in a single pipe section.

Another implementation—probably more costly, but in many cases preferable, as it would certainly save time during installation, and it might be more reliable in the long run—is one that replaces these connection boxes and the cables that plug into them with wireless connections between the pipe sections of the central spline for both power and data signals. For example, each of the three spring clips that hold the sections together are shown here as simple triangular structures formed from heavy sheet metal. Instead they each could contain within that triangular prism space a hermitically-sealed, high-pressure-resistant wireless near-field power and data transfer unit with a matching unit built into the pipe section wall adjacent to each of the holes into which these spring clips fasten. This would give a triply-redundant connection between the pipe sections which would serve to supply power to all the parts of the central spline (and to everything else attached thereto), plus provide a triply-redundant bi-directional data connection to carry commands down to the bottom-end section and up from the various sensors installed there and throughout the central spline.

Directly below the electrical connection box there is a short section 251, shown here as about 5" (0.13 m) long, where the outer diameter of the pipe has been somewhat reduced. This region is provided to permit securely holding the pipe section in a clamp built into the bottom end of the iris and transfer box.

Approximately six feet (1.8 m) below that is another such region. This is where, on one of the top-most pipe sections, the upper end of the membrane can be securely clamped to close off the top end of the outer containment region. This region is included on all the pipe sections other than the special bottom-most section for simplicity in handling those pipe sections. With every (except the bottom-most, already special for other reasons) pipe section having this reduced diameter region, the crew installing the central spline need not worry about picking up a special section for the one where the membrane will be clamped.

Near the bottom end of each pipe section 250 are three equally spaced large spring clips 254 that extend down below the end of the pipe section just far enough to engage the corresponding holes 253 in the pipe section below it. Around the top of these spring clips is a band 255 that can be lowered down to surround the bottom end of those spring clips once they have engaged with the three square holes in the pipe section below. This is a locking mechanism to insure that the pipe sections of the central spline cannot come apart accidentally.

In the exemplary implementation there are, additionally, four switches with beveled actuators installed which will both sense the position of the locking ring and hold it up in its stored position and down in its locked position—thus requiring an intentional action by a technician during the process of connecting pipe sections together or detaching them from one another to enable moving of the locking ring down or up.

FIG. 7e shows the bottom end of one pipe section and the top of another just before they are linked together. Here you can see three of the four switches, labeled SW2 through SW4 plus an indication of where SW1 is located. The actuators for these switches are beveled so the locking band 255 can press down SW3 and SW4 as it descends onto the lower pipe section, and so it also can depress SW1 and SW2 on its way up as it is moved back to the stored position. Once the locking band is in the stored position, SW2 will pop out and its actuator's top will serve to hold the locking band 255 in that upward, stored position.

Figure 7F:
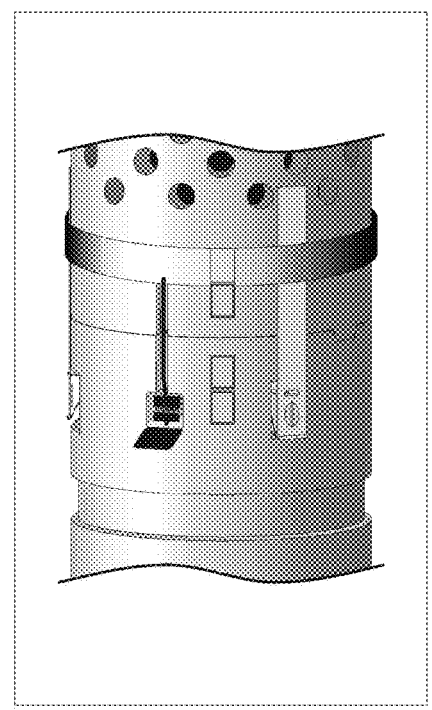

FIG. 7f shows these two pipe sections after they have been snapped together. That is, the top pipe section has been lowered onto the lower pipe section sufficiently that the spring clips 254 have snapped into the holes 253, and the key 261 has mated with the keyway 260. In addition, the electrical box 256 on the lower pipe section has been opened (the face plate has been flipped down) to reveal the upper end of the cable 257 in the lower pipe section and its multi-pin connector ready to receive the mating connector on the end of the cable 257 from the upper pipe section. That cable has been unclipped from the locking band 255 and the cable has then been straightened out and guided down the channels 258 and the two connectors are about to be plugged together. At this point the locking band 255 is still in its stored (up) position.

The next step after plugging the two cables together will be doing a check to assure the oil containment system's operator that the connection is secure and reliable. Then the electrical box can be filled with an incompressible, hydrophobic grease that will keep seawater from getting at the cable connectors. After that is done, the electrical box cover can be snapped back to its closed position.

Now, when a technician pushes SW2 in, that will release the locking band 255 so it can move downward all the way to the bottom-most position where it surrounds the tips of the spring clips 254. Similarly, the actuator on SW3, which will pop out once the locking band 255 has reached its lowest position and thereafter will hold it down until SW3 is depressed manually. These four switches on each pipe section are provided with unique digital addresses by which their individual state (closed or open) may be interrogated over the control cable(s) running down the central spline.

An optional addition to the implementation could be the inclusion of a second set of these switches located directly opposite the first set. That way the locking band could be held up or held down at two diametrically opposite points by the switch actuators for the two SW2s and SW3s, and the second set of switches would give a redundant indication of the locking band's position.

Figure 7G:
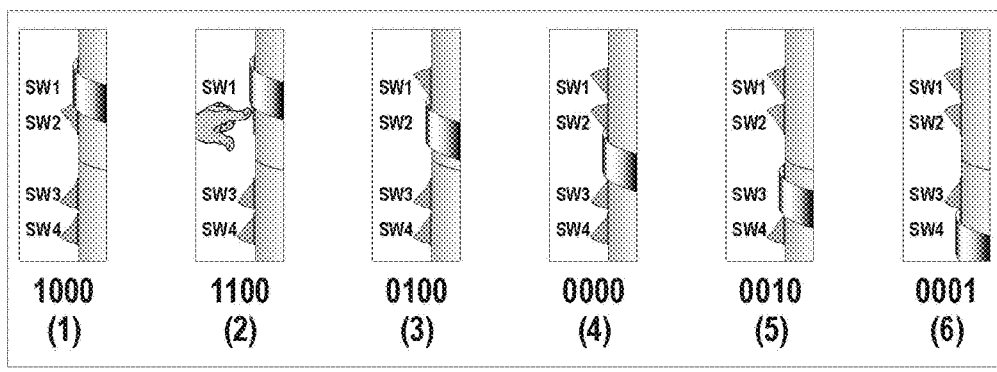

FIG. 7g shows how the locking band 255 interacts with the four switches, and how the state of those four switches will reveal to the oil leak containment system operator where the locking band is at all times. These figures just show a side view of the switches and the bit of locking band that passes by them. The four digit number in purple below each panel indicates the positions of the four switches, with a 1 indicating a closed (depressed) switch and a 0 indicating an open (released) switch. The first panel shows the same situation as is shown in FIG. 7f. The next panel shows the technician's finger depressing SW2, which releases the locking band 255. The third panel shows the situation after the locking band has slipped down just enough to hold SW2 in its depressed (closed) position. The four panel shows the locking band in the middle of its travel, at which point all four switches are in their open position. The fifth panel shows how the locking band will next depress SW3. Finally, the last panel shows the locking band in its lowest position, resting on the tab at the bottom of the spring clips 254. Here, SW3 has popped out and it will prevent the locking band from being lifted by anything until a technician depresses SW3.

As a less-preferred alternative to these switches, the spring clips 254 could be formed with a slight bulge just above the upper edge of the locking ring in its lowest, locked position and another slight bulge just below the lower edge of the locking ring when it is in its upper, storage position. These bulges will serve as detents to keep the locking ring in its proper place before and after the pipe sections are connected together. In either case, the spring clips 254 should also have a outward-extending tab near the bottom of the clip to keep the locking ring from going any lower than that.

In FIGS. 7c and 7e these spring clips 254 are shown as being bent from sheet metal with the end of the metal strip having a narrow section that protrudes a short distance through the strip and is then bent over, thus giving the clip rigidity. Also shown is an oval hole in the strip crossed by a short length of round rod welded to the strip (or, alternatively, the hole could be cut only on the two sides of the hole with the material in the center then being rolled inward into a tube) to provide a place where a workman can grab the clip to pull it out of the hole in the pipe section below, when the central spline is being disassembled. And welded to the bottom of the clip is a smaller clip that serves to catch the locking band 255 and keep it from falling past these clips.

Directly opposite the electrical connection box, on the outside of the pipe section and running the entire length of the pipe section, is a keyway 259. This is engaged by a key in the bottom of the iris and transfer box, described below, which thereby prevents the central spline from rotating.

On the top surface of the pipe section is a deeply indented region 260 with a matching vertical key region 261 which extends outward from the bottom of this pipe section to engage a similar indented region in the top of the pipe section below this one. This keying feature fixes the orientation of each pipe section to the one below it in terms of rotation around its vertical axis so that the spring clips near the bottom of one pipe section will properly engage the holes near the top of the next pipe section below it. It also ensures that the keyways 259 along the sides of the pipe sections also match up so the central spline can move freely vertically past the key in the bottom of the iris and transfer box. And, finally, it insures that the open channels 258 will line up so the cable 257 can pass freely from the upper pipe section to the lower pipe section.

Between the lower reduced outer diameter region near the top end of the pipe section and the lower end of the pipe section, the pipe wall will be penetrated by a pattern of holes 212 shown in FIG. 7c. These holes are large enough and numerous enough that any oil or gas that may be inside the pipe can freely exit through them into the outer containment region. And any oil or gas in that outer containment region can equally easily come into the inner containment region. The only other consideration as to the size of these holes is that they shall be small enough that the membrane cannot easily be pushed in through one of those holes far enough to get snagged on the marine riser, the drill string, or any other apparatus that may be put down through the central spline.

If the top of the marine riser is quite far above the ocean surface, and if one wishes to make the top of the outer containment region (where the membrane is clamped to the central spline) at or below the ocean surface, then one would need to have one or two extra pipe sections that are almost identical to the ones just described. These special top-most pipe sections are just like the other pipe sections 250 with two omissions: These top-most pipe sections would not have any of the holes to allow oil, gas, or water to flow from within the pipe to outside it, and they need not have the lower reduced diameter portion. The purpose of these pipe sections would be to connect from the pipe section that holds the top of the membrane in its lower reduced diameter portion and the iris and transfer box that is connected to the support for the marine riser.

Since the outer containment region ends on the pipe section below this (or these) special "naked" pipe sections, they must not have any holes in the side, as their job is both to hold up the central spline and to convey anything that comes up inside that central spline upward into the iris and transfer box with nothing leaking in or out through their side walls. Whether one needs one, two, or no such pipes on the top of the central spline will depend on just how large the distance is from the bottom of the iris and transfer box to the ocean surface.

Finally, there will need to be a large number of the pipe sections described above (the ones with all the holes, etc.) to make up the central spline for any moderately deep drill site. For example, if each pipe section is 532" (about 45 feet or 13.5 m) long, then for a well at the location where the ocean depth was that of the Deep Water Horizon well (about 5,100 feet [1,554 m]), one would need to have about 113 pipe lengths in order to make up the entire central spline (allowing 75 feet for the bottom-most pipe section plus the vertical extension members' reach below the lower end of the central spline to the ocean floor). If these other pipe sections were only 40 feet (12 m) long, approximately 126 of these 40-foot pipe sections.

These pipe sections may also be shipped in standard intermodal shipping containers. If one chooses the container supplier carefully it is possible to get ones that are capable of holding a load that is 92" (2.34 m) wide by 106" (2.69 m) tall by up to 532" (13.51 m) long. One could fit eight of these pipes in each such intermodal shipping container, as is shown in FIG. 7d. (Here the two side columns of pipe sections (here rendered in medium grey) are separated by 2" (51 mm) thick black blocks [for visibility in this figure] which makes each of those columns exactly 106" tall and permits the center two pipe sections to fit in between those columns to just allow the three columns to fit within a 92" wide container. It would take 15 such containers full of these pipes for an oil leak containment system capable of protecting a well at the ocean depth used for the Deep Water Horizon well.

Preparing the Special Bottom-Most Pipe Section

There is one pipe section of the central spline that is very different from all the others. It is the bottom-most one. This pipe section 210 has a number of functions to perform which requires several alterations from the design of the other central spline pipe sections.

In the exemplary implementation described here, surrounding the bottom four feet (48" or 1.22 m) of this pipe section is a chamber that has an outer diameter of 91" (2.31 m) and whose inner diameter fits snugly around the 34" (0.864 m) outside diameter of the pipe section. This chamber is securely fastened to that pipe section with their bottom surfaces flush with one another. This chamber is what is elsewhere in this document referred to as the bottom-end package 240. It may contain numerous diverse useful items, including 24 motors to operate the 24 extension assemblies, a control computer, a bi-directional air pump, a thick-walled toroidal pressure vessel, and a variety of sensors, cameras and lights, etc.

It is convenient, but not strictly necessary, to omit completely the hole pattern in the wall of this pipe section. This is appropriate as much of the outer surface of this pipe section will be covered by the extension assemblies, and in particular, where the horizontal extension arms and their braces attach there must be no holes, nor where the upper ends of the lead screws attach, and, because there are plenty of other opportunities for any leaked oil or gas inside the pipe to migrate to the exterior containment region—or vice versa—through the holes in the other pipe sections higher up the central spline, there is no need for holes in this section.

Each of the extension assemblies—24 in the exemplary implementation—includes one or more horizontal extension arms with their associated braces, and (optionally) a vertical extension arm attached at the outer end of the horizontal extension arm. In the exemplary implementation each of these assemblies includes one horizontal extension arm, one brace, and one vertical extension arm. This vertical extension arm could consist of any number of concentric (in this implementation, just two such) similarly shaped tubes nested inside one another plus various other pieces inside it to control the telescoping action of these tubes, to raise and lower the membrane hem, and to attach the lower end of this vertical extension member securely to the ocean floor. The outer one of the two concentric tubes comprising the vertical extension arm is referred to below as the outer sleeve, and the inner tube as the inner sleeve of the vertical extension arm.

Figure 8A:
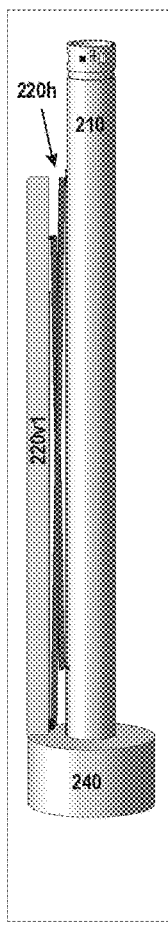
FIGS. 8a, 8b, 8c, 8e, and 8f show several views of the bottom-most pipe section of the central spline and the 24 (in this exemplary implementation) identical extension assemblies. These views include a side view (with just one extension assembly), a top view (with all 24 extension assemblies), a detailed top view of just one of these extension assemblies, a side view of that extension assembly in its fully extended position, a side view of showing how one extension assembly can extend out and down, and finally, a view of the bottom-most pipe section with all of its extension members tightly surrounding it, as it is when shipped from the factory.
Figure 8B:
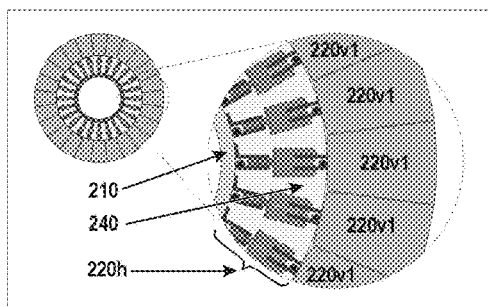
Figure 8C:
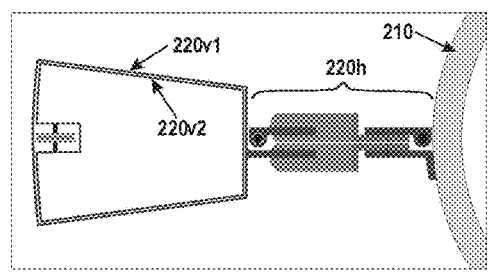
Figure 8D:
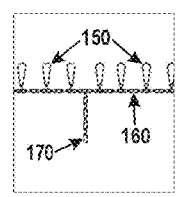
FIG. 8d shows a close-up of a portion of the membrane hem chain.
Figure 8E:
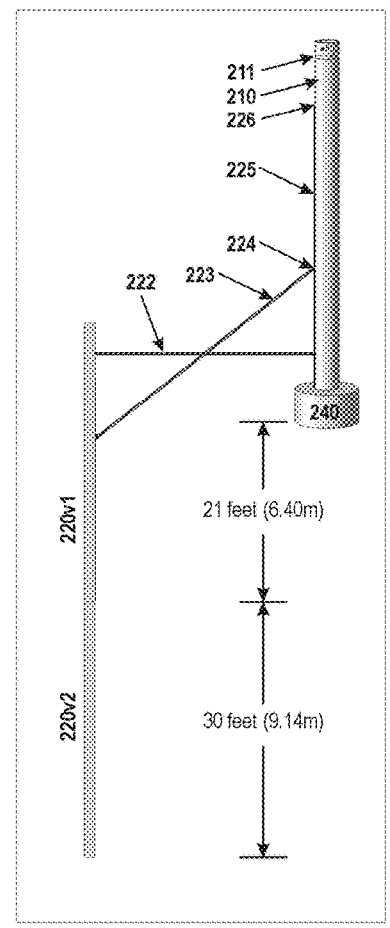

FIG. 8a shows this bottom-most pipe section with just one of the 24 extension arm assemblies 220 (which in the exemplary implementation is comprised of seven parts, 220v1, 220v2, 221, 222, 223, 224, and 225 all of which are identified in FIG. 8e except for 221 which is identified in FIG. 9c) attached to it in its most folded-inward position. Immediately next to the left side of the pipe section is a narrow black line (easily missed, but definitely present in that figure) which represents a half-inch (13 mm) diameter lead screw coming up through the top surface of the bottom end package. This lead screw 225 and the other details described in the rest of this paragraph are more easily seen in FIG. 8e and in the several inset portions of FIG. 9c. This lead screw is driven by a motor inside that bottom end package. The upper end of the brace is attached to a captive nut 224 that travels on this lead screw. Somewhere above the highest location for that captive nut, the lead screw's upper end is held by a bracket 226 secured to the wall of the pipe section. The lower end of the horizontal extension arm 222 is attached to a pivot point on a bracket 221 which is directly attached to the pipe section about eight feet (2.44 m) above its bottom end (and thus four feet above the bottom end package). In this implementation the overall pipe section is 532 inches (about 44.3 feet or 13.4 m) long.

The horizontal extension arm 222 shown is a piece of 2" by 4" angle stock (in this implementation these pieces are made of half-inch thick 6061 aluminum) just over 25 feet (about 7.7 m) long. It has three holes symmetrically placed in its 4"-wide section, two near the ends and one in the center. The distance between the two end holes is exactly 25 feet (7.62 m).

The brace 223 is just over 32 feet (9.7 m) long piece of the same material, again with three holes in it similarly located with the outer holes exactly 32 feet apart. The horizontal extension arm and its brace are bolted together at their centers. This connection forms a pivot point so they can rotate freely relative to one another around that connection point. One of the end holes in the horizontal extension arm is bolted to the hole in the bracket attached to the pipe section a short distance above the bottom end package. Similarly one of the end holes in the brace is attached to the bracket connecting it to the captive nut riding on the lead screw.

The large rectangular portion at the left of this figure is the vertical extension arm, which is, in this case, 32.5 feet (9.91 m) long by about 15 inches (0.39 m) wide in the radial direction. Its bottom end is four feet (1.22 m) above the bottom of the pipe section and the upper end of the horizontal extension arm attaches to a bracket that is attached to the outer sleeve 220v1 of this vertical extension arm approximately 42" (1.07 m) below its upper end. The lower end of the brace is attached to a slide that can move freely up or down a 0.375" (9.5 mm) guide rod attached to the inner side of the outer sleeve of the vertical extension arm. (This arrangement insures that the horizontal arm 222 and its brace 223 are attached to the outer vertical extension arm 220v1 in almost exactly the same way that those items 222 and 223 are attached to the bottom-most pipe section 210. The only difference is that the lead screw and captive nut on 210 are replaced by a ring sliding on a smooth rod attached to the inner wall of 220v1.) This arrangement guarantees that the vertical extension arm will be parallel to the pipe section at all times as it is moved inward or outward (and in that process upward or downward) relative to that pipe section by the action of the horizontal extension arm and brace.

FIG. 8b shows a top view of this bottom-most pipe section with all 24 of the extension arms in their most folded-inward position at the same scale as FIG. 8a. The inset in this figure shows a 500% magnified view of a small portion of the complete figure at the left. (The dashed grey circle on the left is the region shown in magnified view in the large dashed grey circle to the right, with the two dashed grey straight lines connecting those two circles. The use of these dashed lines is because without them, a viewer might have some trouble distinguishing the small circle from the parts of the drawing on the left that fall within that small circle and which are then shown magnified within the larger circle to the right.)

Here you see the central spline pipe section 210 in cross section (shown in a dark 70% grey shading) and, in the background, the top of the bottom-end chamber 240 (shown with a very light 10% shading) surrounding the pipe section. (Note that there is nothing inside the pipe section; the bottom end section has a hole in it that just fits around the outside of the central pipe section, so that anything that will fit inside that pipe section can continue on down out of the bottom of this bottom-most pipe section.) On top of the bottom end package (in front of it in this view) are the 24 extension arm assemblies including the brackets holding the horizontal extension arm 220h and the brace to the central pipe section, and the brackets holding the guide rod and the top end of the horizontal extension arm to the inner surface of the vertical extension arm. The vertical extension arm's outer sleeves 220v1 are shown in a solid 30% grey, indicating that it is closed on top.

FIG. 8c shows a 10-fold magnified top view of a cross-section of just one of these extension arm assemblies. Most of the additional objects that will be included within the vertical extension arm are not shown here. The vertical extension arm, in this implementation, consists of two roughly trapezoidal cross-section tubes slipped inside one another (220v2 inside of 220v1). The outer surface of each of these tubes is approximately ½₄-th of a circle with a radius, for the outer sleeve, of 45" (1.14 m). The top of the outer sleeve of the vertical extension arm must be closed, for reasons to be explained below. The inner sleeve is open at both ends.

The inner sleeve has a region on the left side in this figure (farthest from the central spline) that is indented the full height of the inner sleeve so as to provide a 2" (51 mm) wide channel extending 3" (76 mm) inward to accommodate the pulleys and cable for lowering and raising the hem chain. The outer sleeve has a notch at the bottom of its outer (left-most in this drawing) side that is 2" (51 mm) wide and at least 8" (0.2 m) tall to expose the lower end of this cable. The location and length of this notch and many other details of the construction of the vertical extension arm are detailed in FIG. 10.

FIG. 8d shows a 10-fold magnified view of a small portion of the membrane package hem chain 160. This chain forms a loop with a circumference of approximately 330 feet (100.6 m), which is the same as the maximum width of the membrane package when all of its pleats are stretched wide open and the outer edges are sealed to one another.

This is far longer than the circumference of the outer ends of the vertical extension arms even at the widest possible extension of the horizontal extension arms (when they are horizontal). In this implementation that outer diameter is at most 56 feet (17.1 m), implying a maximum circumference of just under 176 feet (53.6 m). Having the membrane be so much wider than the circumference of the extension assemblies is desirable for two reasons. First, if the ocean floor is not even, then the membrane must be able to reach from the bottom of one vertical extension arm to bottom of the next which will be at most about 7.3 feet (2.24 m) away horizontally, but may be an unknown distance away vertically. By making the membrane as has been described above, and fitting it with this length of hem chain, it will be possible to stretch the membrane along the ocean floor from the bottom of one vertical extension arm to the next even when the bottom ends of adjacent vertical extension arms are as much as 11.6 feet (3.53 m) displaced from one another vertically. Second, if there is a blowout and a truly huge amount of oil escapes immediately, having the containment region defined by a membrane that can billow outward greatly right near the ocean floor will add to the volume of oil that can be contained in that region, before it has had time to drift upward. (See the section "Some Useful Numbers," below for an estimate of just how much oil could be contained there.)

Notice that all along the hem chain there are carabineers extending upward in this drawing. At the joint between panels there an extra wide link and hanging from that link is a short length of chain extending downward about 7" (0.18 m). The carabineers will be used to link the hem chain to each of the holes in the membrane hem (47 places for each membrane panel). The carabineers are spaced every 3.5" (89 mm) which is the same as the spacing of the holes in the membrane hem. The extra wide link between membrane panels is to allow for the fact that the membrane panels are connected to one another by a half-inch (13 mm) wide joint, as is shown in FIG. 5g. The short chain lengths shown here hanging down will be linked to a ring attached to a motor-driven cable on the outer surface of the inner sleeve of the vertical extension arm (see FIG. 10a). This cable is thus able to lower or raise the membrane at that location with respect to the inner sleeve of the vertical extension arm. Once the bottom-most pipe section has had all of its other parts attached to it, the membrane hem chain will be spread around the bottom end of the outside of the vertical extension arms, then slid up until it is possible to link the loop clamped on the inner vertical extension arm's hem-lowering-or-raising cable on each vertical extension arm to the end link on the corresponding short side chain from the main hem chain loop. After that the hem chain will be taped to the outside of the vertical extension arms until the crew on the service barge is ready to attach the membrane package to this bottom-most pipe section.

Once these clips are attached to the hem chain and the tape holding the hem chain onto the vertical extension arms is removed, and when the bottom-most pipe section is put vertically into the ocean, the short side chains (shown in FIG. 8d as extending downward from the hem chain) will instead extend in the reverse direction, downward from each of the loops on the hem-chain-lowering-and-raising cables to where the heavy hem chain will have fallen, after pulling down the membrane package as far as it can toward the ocean floor. The weight of the membrane package hem may then pull the membrane package down as much farther as it can until the carabineers 150, the membrane chain 160, and the side chains 170 are in an arrangement that looks just like FIG. 8d turned upside down.

If, instead of vertical extension arms, chains are to be used for the purposes of those vertical extension arms, then each of the side chains 170 must be long enough to extend the entire length of the associated horizontal extension arm.

FIG. 8e shows (at 50% of the size in FIG. 8a) how the horizontal extension arm 220h, brace 223, and the vertical extension arm look when the extension assembly is expanded to its maximum extent sideways and the inner sleeve 220v2 of the vertical extension arm is telescoped out of the outer sleeve 220v1 nearly all the way. In this figure you can see that the bottom of the outer sleeve of the vertical extension arm 220v1 ends 21 feet (6.4 m) below the bottom end of the central spline, and the inner sleeve 220v2 is able to extend down another up to 30 feet (9.1 m) below that, still leaving about a two foot (0.6 m) overlap between the inner and outer sleeves. If the central spline ends approximately 30 feet above the drill site, this oil leak containment system can accommodate an ocean floor which, at a distance of approximately 28 feet (8.5 m) away from the drill site varies in depth by nearly thirty feet (9 m) up or down from the depth at the drill site (and a bit more, if necessary, by moving the horizontal extension arm a bit more or less than 90 degrees from its original, closed position which will lift the outer sleeve of the vertical extension arm farther down or up from where it is shown in FIG. 8e—an adjustment that can be done in addition to moving the inner sleeve up or down as needed).

Each individual extension assembly is controlled separately by its associated motor in the bottom-end package that enables angling each arm out at a different angle including angling some of them downward or upward if desired and the motor inside the top of the outer vertical extension arm that controls the telescoping action of the vertical extension arm. Having independent control over each individual extension assembly makes it easy to lift up just a portion of the membrane, and if needed, just one or a few of the vertical extension arms, to permit sliding a blowout protector or other cumbersome device in under the membrane or to permit a remotely piloted vehicle to enter or exit the containment region.

Figure 8F:
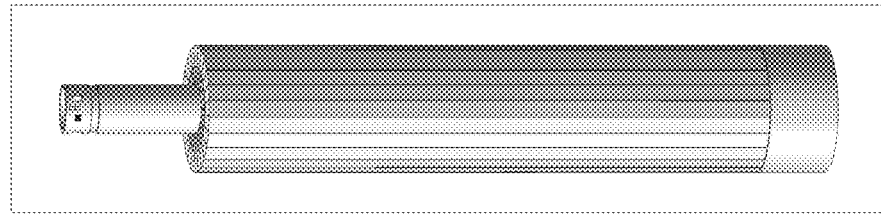

FIG. 8f shows a view of the entire bottom-most pipe section with all of the horizontal and vertical extension arms and the bottom-end package attached to it and drawn in toward the pipe section as much as possible. The only things not shown here that will be in place when this pipe section is ready for shipment are the wrapping machine, the permanent seaming machine and the membrane hem chain.

FIGS. 9a to 9c shows some of the details of the bottom-most pipe section itself, including how one of the horizontal extension arms and its associated brace are attached to it, where the holes for the spring clips from the pipe section above will fit, the electrical connection box, and the channel on the inside of the pipe that carries the cable to the bottom-end package. The inset views in FIG. 9c and all of FIGS. 9a and 9b are 500% magnified relative to the scale used in the rest of FIG. 9c where you see an overview of the entire bottom-most pipe section with only one of the extension arms attached to it. (A view of the "fully dressed" bottom-most pipe section is shown in FIG. 8f.)

The details shown in FIG. 9c include an indication of how a cable and a high-pressure air hose (both indicated here as 227) from the bottom-end chamber can travel along the horizontal extension arm to the vertical extension arm. This region 211 facilitates securely clamping this section in the clamp at the bottom of the iris and transfer box described below.

This pipe section will have an electrical connection box 216 similar to the electrical connection box 256 in the other pipe sections. The cable 217 that runs downward from this box doesn't terminate in a loose stub hanging outside the pipe section near its bottom. Instead, it runs to the equipment located at the bottom-end package 240, and also can connect from there to any equipment in or fastened to any of the extension arms.

Shown here is one possible design for the horizontal extension arm attachment point 221. Any similar design that serves the purpose of retaining that arm while letting it pivot here is included in this invention. This implementation has a brace 223 for each horizontal extension arm. The function of that brace is to push that horizontal extension arm outward or pull it back in toward the central spline, and at the same time push or pull on the lower end of the vertical extension arm (of there is on in this extension assembly). Each of these braces is pivoted on an attachment bracket 224 that includes a captive nut that is able to slide up or down, without rotating, since it is held by its attachment to the horizontal extension arm as well as, perhaps, riding in one of 24 special keyway channels (in addition to the principal keyway 219) that could be included on the outside of this pipe section 210. It is driven up or down by a lead screw 225 driven by an electric motor inside the bottom-end package 240.

There also may be electrical connections via additional cables 227 running from this bottom-end equipment package out along each of the extension arms to lights and/or cameras located somewhere along the length of those members (see bottom inset in FIG. 9c). These connections will have to include power cabling, plus data cables to carry signals to the lights and cameras to command them to turn the lights on, pan or zoom the cameras and take pictures, plus data signals to report back what it has done and to deliver the images its cameras capture. These cameras and their associated lights could be most helpful in guiding the installation of a blowout protector or, after a leak is seen, monitoring its progress, especially after the leak may have filled the seawater around the bottom end of the containment pipe and thereby rendered its lights and camera temporarily useless.

A similarly rich communication and power link will then have to extend all the way up the cables 217 and 257 to the system operator's console located on the service barge, or near the drilling platform. (The control and operating system for the apparatus contemplated by this invention may preferably be located on the service barge that was used to install the apparatus, if that barge is kept at the drilling site for the duration of the apparatus' connection to that drilling platform. This would keep it out of the way of the crew working the drilling platform for its normal functions.)

If a chemical sensor that could measure the level of hydrocarbons dissolved in the surrounding ocean water is included in the bottom end special equipment, it could give a first warning of any leak, thereby prompting the operators of the drilling rig to use the bottom end lights and cameras to check to see where the leak is occurring and to choose appropriate remedial actions. It also could warn the drilling crew, giving them time to step away from the turntable in case some small amount of high pressure gas might manage to get past the iris seal(s) discussed below. Yet other chemical sensors could also be included near the bottom end of the vertical extension arms to help detect any hydrocarbons that might be migrating laterally from a leak at or near the well head.

Alternatively, a continuous sensor or sensors (perhaps one based on fiber optics) could be included within the membrane as it is applied to the central spline. This point is discussed further in the section titled "The Wrapping and Seaming Machines," below.

Figure 10A:
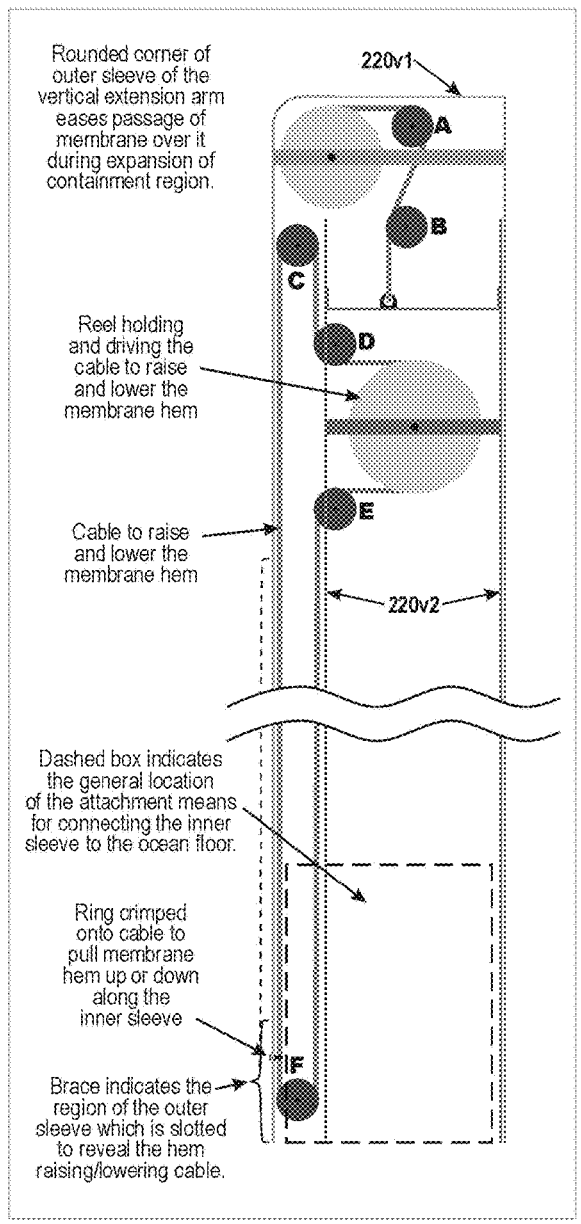
FIGS. 10a, 10b, and 10c show details of the structure and contents of one of the vertical extension arms, using the same scale as FIG. 8c (which is ten times magnified from the scale in FIG. 8a).

FIG. 10 shows some of the details of the vertical extension arm. In the exemplary implementation discussed here the outer sleeve of the vertical extension arm $220v1$, shown in FIG. 10a, shows a vertically oriented central cross-section of the vertical extension arm $220v$. The outer sleeve $220v1$, which is shown here in medium (40%) grey, is 32.5 feet (9.9 m) long and the inner sleeve $220v2$ of the vertical extension arm, shown here in dark (60&) grey, is just under 32 feet (9.7 m) long. The upper-left corner of the outer sleeve in this figure is rounded with about a 2" (51 mm) radius. This is done so that when the membrane needs to be dragged across this corner during the expansion of the membrane around the drill site it will slide freely.

Attached to the outer sleeve near its top is a motor-driven reel with a core diameter of 6" and a length between the flanges of 8". This is shown in a top view (a view looking down) in FIG. 10b with the top of the vertical extension arm's outer sleeve rendered as fully transparent (which it is very unlikely to be in actuality). Again the outer sleeve is shown here in medium (40%) grey and inner sleeve in dark (60&) grey. From this view you can see how the inner sleeve has a deeply indented region on its outer surface (the one farthest from the bottom-most pipe section) to accommodate some special hardware that will be used to raise and lower the membrane hem. This view does not show the other items that are located further down inside the vertical extension arm. They are shown in FIG. 10c.

Figure 10B:
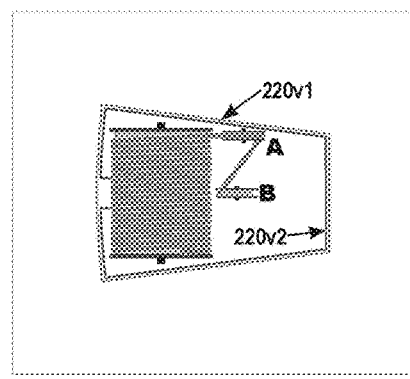
Figure 10C:
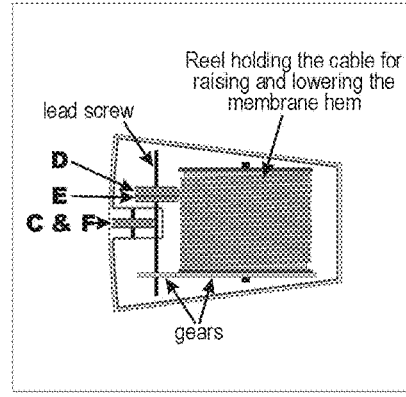

The motor for the reel shown in FIG. 10b is located inside the core of that reel. What appear to be the ends of the reel shaft are actually the ends of a tube that holds the motor and carries power to it. The motor shaft is directly attached to the inside of the reel core so it can rotate the reel around the motor with the motor staying stationary relative to the vertical extension outer sleeve. A bearing surrounding the tube holding the motor can be included to help support the reel at that end, if desired. Likewise, another bearing could be used to support the motor shaft just past where it connects to the inside of the reel to support that end.

As is shown in FIGS. 10a and 10b, the cable comes off of this reel over one pulley (labeled A) that rides on a carriage (not shown here) that is driven side-to-side along the reel by a lead screw that is driven through a pair of gears by the reel's rotation. The gear ratio and lead screen thread pitch are chosen to insure that when the reel rotates one revolution, the guide pulley will have moved sideways by exactly the diameter of the cable, thus insuring that the cable will always be perfectly wound in a single layer on the core of that reel whether it is being pulled off or being rolled back onto that reel. A different type font is used here for these letters A through F and in the Figures to help distinguish them from the various parts of the vertical extension arm.

The cable then passes over another pulley (labeled B) which is centered in the vertical extension arm's inner sleeve (or more accurately above its center of gravity, taking into account its non-symmetric form and the not-necessarily-centered objects attached within this inner sleeve). From there the cable goes down and is attached to a bracket fastened to the inside of the vertical extension arm's inner sleeve. This arrangement of pulleys and the way the cable is secured to the reel at one end insures that the location of the inner sleeve relative to the outer sleeve will always correspond precisely with the angle through which this upper cable reel has rotated. A sensor in or next to that reel can report that angle back to the computer in the bottom end package, thus letting the system operator know at all times just how much of the inner sleeve is protruding below the lower end of the outer sleeve.

The cable shown here is five-sixteenths inch stainless-steel aircraft cable with an over-coating of nylon or PVC giving it an overall diameter of ⅜ths of an inch (9.5 mm). If the cable is made of one of the more corrosion-resistant stainless formulations (e.g., 316) it will stand up to long-term immersion in the ocean without undue corrosion. The plastic overcoat simply adds to that assurance, plus it cushions the cable. This size stainless steel cable is rated for lifting far more weight than it will have to carry in this application.

There are four similar pulleys shown in FIG. 10a somewhat lower down in the inner sleeve of the vertical extension arm. They are attached to the inner sleeve (shown in cross-section in green) with the top (labeled C) and bottom (labeled F) pulleys being located fully inside the indented region of that inner sleeve's outer surface so that the cable that runs between them has its outer surface flush with the outer surface of the rest of this inner sleeve. These top and bottom pulleys are located very near the upper and lower ends of the inner sleeve. Their purpose is to guide a cable that will be used to raise or lower the membrane hem, and this placement allows that hem to be lowered almost to the bottom of the inner sleeve (and with the length of chain from the cable to the hem chain, the membrane hem itself can fall past that point to the ocean floor) or it can be raised up nearly to the top of the inner sleeve, almost thirty feet (9 m) above the ocean floor whenever the inner sleeve is extended down enough that pulley C is no higher than the upper end of a slot provided in the outer wall of the outer sleeve of the vertical extension arm. And this can all be done with the vertical extension arm's inner sleeve remaining firmly attached to the ocean floor.

This slot in the outer wall of the outer sleeve is indicated near the bottom of the outer sleeve in FIG. 10a. It might only extend upward a short distance above the bottom of that sleeve, or it could extend at most a bit more than two-thirds of the way to the top. The only reason it cannot go all the way up is to allow for the air bubble that will occupy the uppermost five or six feet of the outer sleeve's height to make the vertical extension arm neutrally buoyant (assuming the vertical extension arm is made of aluminum) or the top 21 feet (if the arm is made of stainless steel). The brace in FIG. 10a which indicates the extent of that slot is shown with a solid line for a short slot (for stainless steel construction) and using a dashed line for the much longer slot (for aluminum construction).

Vertically aligned with the middle two of the four pulleys (labeled D and E) is another reel, this one attached to the inner sleeve and having a core diameter of 8" and a core length of 6" (since it is located closer to the central spline it cannot be as long as the first reel). This and the upper reel can each hold somewhat more than 30 feet of three-eighths inch diameter cable in single layer.

These middle two pulleys (labeled D and E) are each located where there is an opening in the inner wall of the indented region of the inner sleeve and they are, like the upper pulley for the reel at the top of the outer sleeve, moved side-to-side on a lead screw that is gear-driven by the rotation of the reel onto and off of which the cable travels over these pulleys as the reel turns (these gears and the lead screw are indicated in FIG. 10c, but not the brackets that hold them). When the reel turns one way, the cable comes off of the top of the reel and up over the pulley D, then down the outside of the inner sleeve, and at the same time the same length of cable is being carried around pulley F and then up over pulley E and back onto the reel.

This arrangement insures that the cable will at all times be taut and since the ends of the cable are secured to the core of the reel, the location of the ring that is crimped onto the cable (and that is attached via short length of cable to the membrane hem—shown near the bottom of the inner sleeve in FIG. 10a) will always correspond precisely to the angle through which the reel has rotated. This angle can be sensed by an encoder mounted within or next to the reel, and that information sent back to the computer in the bottom-end package, and from there back to the oil leak containment system operator's console. This allows the system operator to raise or lower the hem of the membrane (which is attached to that ring) as much as may be desired and be assured as to where the membrane hem is located at all times.

In addition to these features, the vertical extension arm will also contain a further collection of parts in the location generally indicated by the dashed box near the bottom of the inner sleeve. The purpose of these other components (not detailed here, as anyone well versed in the relevant arts can easily devise suitable components to the functions described here) is to permit firmly attaching the lower end of the vertical extension arm inner sleeve to the ocean floor. First, there may be lights and cameras to allow the oil leak containment system operator to see (perhaps in 3D) exactly what the ocean floor is like in the immediate vicinity of this vertical extension arm. Next there may be one or two securing devices that can drive a stake or drill into the ocean floor. By using two of these securing devices and having them insert their stake/drill at different angles, the vertical extension arm can be secured more firmly—rather like a carpenter "toe nailing" two boards together.

Each of the devices to do this task will likely consist of some sort of drill motor to turn the stake/drill, plus another, independent, motor to advance or retract the stake/drill, including a provision for "hammering" the drill into a hard surface as it is being turned, and possibly two more motors with appropriate mechanical linkages to allow changing the orientation of the stake/drill around two different axes, thus aiming the drill or stake however may be desired.

If the ocean floor is sandy, it may be sufficient merely to push the stake/drill into the sand. If it is rocky, it may be necessary to drill a hole into the rock, but it may then not be necessary to go into the rock as far as one might wish to go with sand. To accomplish this the stake/drill can have a carbide-tipped drill bit on its end, and it might have an apparatus adapted to telescope its shank to allow it to act like a longer drill/stake than can fit into the constricted space indicated in FIG. 10a.

Weight and Other Considerations

These drawings assume that the horizontal extension arm and brace are made of 0.5" (13 mm) thick extruded 6061 aluminum into an L-shape that is 2" (51 mm) by 4" (102 mm). Further, the vertical extension arms are assumed to have been made from 0.125" (3 mm) thick sheet metal, most likely also 6061 aluminum.

It is vital that these materials be highly resistant to corrosion in seawater. One good choice, apart from its density, could be 2025 duplex stainless steel. Another good choice might be 6061 aluminum (one of the most popular of the many aluminum alloys). This material is about half as strong as the stainless steel, but only one-third as heavy and it has a similar degree of corrosion resistance which can be further heightened by anodizing it after fabrication and before use. (If different parts of the oil leak containment apparatus are made from different metals, they should be kept from coming into direct contact with one another by electrically insulating bushings to keep from causing galvanic corrosion of either metal.)

Even the lightest of these metals is quite heavy. If the horizontal extension arms and their braces are made out of 6061 aluminum, each horizontal extension arm and its brace will together weigh around 187 pounds (85 kg), and the overall 24 assembly weight would be 4,479 pounds (2,036 kg). This doesn't account for the various brackets and bolts, etc., nor for the lead screw and guide rod that are included in each of extension assemblies.

This is their dry weight. (That is, what they will weigh when the bottom-end pipe section is first assembled and until it is placed in the ocean.) Once they are immersed in seawater, the apparent weight of all 24 of the horizontal extension arms and their braces will be reduced by the buoyancy effect to about 1.26 metric tons (2,786 pounds). This load is directly attached to the central spline and must be supported by it. Since most of the pipe sections are going to be nearly neutrally buoyant in seawater, this may end up being the most important part of that load which ultimately gets carried by the crane during installation and by whatever supports the iris and transfer box (generally the support for the marine riser) after installation.

This weight is, perhaps, manageable, but the problem gets far worse when you look at the weight of the vertical extension arms (if they are used). This is because whatever those vertical extension arms weigh, that is a load that must be carried by a very long slender horizontal extension arm, and then get transferred back to the central spline.

In the exemplary implementation described here each of these vertical extension arms will present a load of 479 pounds (218 kg) and immersed it will still be 198 pounds (135 kg). That might be too much for such a long slender bar to support without bending or possibly even crumpling or breaking. The total weight of all 24 vertical extension arms will be about 11,495 pounds (5,225 kg) dry and 7,150 pounds (3,250 kg) when immersed in seawater.

There isn't much that can be done about the dry weight of these parts. The crane must simply be able to carry it as the parts of the oil leak containment apparatus is assembled. But once the bottom-most pipe section is lowered into the water, there is a simple way we can essentially completely remove the apparent weight of the vertical extension arms. We can do this by forming an air bubble inside each one. This is the reason for closing off the top of the outer sleeve and having no open holes or slots in the side of that outer sleeve for at least the upper third of its length, if the arm is built out of aluminum, or the upper two-thirds if it is built using stainless steel. (There will be one hole in the outer sleeve near the top where a high-pressure air hose connects to bring the air for that bubble to the vertical extension arm from the toroidal pressure vessel in the bottom end package, plus a sealed pass-through for the electrical power and two-way power and data cable to power all the motors in the vertical extension arm and to direct their activities plus reporting back on the results. But neither of these holes lets any air leak out of the vertical extension arm's outer sleeve into the surrounding ocean.)

The size (volume) of the needed bubble will not change significantly as the bottom-end pipe section is lowered into the ocean, but the pressure and therefore the mass of the air contained in that volume will change in direct proportion to the depth. At all depths the bubble will extend downward from the top of the outer sleeve approximately five feet (1.52 m). This is a small fraction of that sleeve's total length.

At a depth of 100 meters there is roughly a 10 atmosphere pressure (about 147 psia) from the weight of the water (plus one atmosphere from the air pressure on the surface of the ocean). At a depth of 5 km (the maximum ocean depth that the membrane described for the exemplary implementation could reach) the pressure rises to about 500 atmospheres (7,348 psia).

To put the right amount of air into each vertical extension arm we need at least a sufficiently large (and sufficiently strong) storage container for the air and then some pump(s) and valve(s) to control the flow of that air from or to the storage container. In the exemplary implementation, the storage container will be a pressure vessel located in the bottom end package that can hold enough air for all of the vertical extension arms. There may be one, or there could be 24 individual pumps and electrically-controllable valves connecting that pressure vessel to the vertical extension arms. The other essential components are appropriate sensors on at least one and preferably on each of those arms to detect when more or less air is needed, so that the pump(s) and valve(s) can be appropriately operated. At first the pressure in the pressure vessel will be more than is needed in the vertical extension arms, and so one could merely allow it to flow out through a variable pressure regulator. But at depth, it may well be that the pressure of the air remaining in the pressure vessel will be less than what is needed in the bubbles in the vertical extension arms, and then one would have to pump the air out of the pressure vessel and into the vertical extension arms. And, of course, as the bottom end pipe section is raised, these things will have to be done in reverse.

One appropriate sensor could simply be a strain gauge on the connection between the vertical extension arm and upper (or outer) end of the horizontal extension arm sensing the vertical force exerted on the horizontal extension arm by the vertical extension arm. If that strain is nearly zero the right amount of air is in the vertical extension arm to support itself—if you want the buoyancy of the vertical arm to also help lift the deadweight of the horizontal arm assembly and its share of the bottom-most pipe section including all the things in the bottom-end package, the right amount of air would be detected when the strain gauge indicates the desired amount of positive buoyancy for the vertical arm. It may be prudent to back that sensor up with another sensor that detects the level of the water-air boundary in each vertical extension arm. And, if one of the vertical extension arms should spring a leak, it would be vital to have some way to shut off the air supply to that arm, so that all of the stored air doesn't escape there and render not only this one, but also all the other vertical extension arms un-buoyant.

An important point to notice is that there are going to be no substantial pressure differences between inside and outside of any part of this oil leak containment system other than the pressure vessel inside the bottom end package. This is because each part in these extension assemblies either has ocean water on both sides, or it has air at the same pressure as the ocean water on one side and ocean water on the other side. The pressure vessel is the only exception. It must be able to hold a rather high pressure of air inside it without bursting when the bottom-most pipe section is out of the water or at a small depth, and be able to hold off the enormous ocean water pressure at the deepest it will go without collapsing when most or all of the air inside that vessel has been pumped out to support the several vertical extension arms.

Fortunately arranging this sort of system is readily achievable. If the pressure vessel is made in a toroidal shape (like a donut) with an inside diameter (the hole) of 34.25" and an outer diameter of 90.75" (2.286 m), which is the maximum size that will fit inside the bottom end package (assuming a wall thickness of that bottom end package of 0.125" the same as the wall thickness of the vertical extension arms inner and outer sleeves), and if the outside diameter of a cross-section of the torus is an 28.25" (0.718 m) diameter circle its volume will be 123,071 cubic inches (2.0168 $m^3$) which will displace 4,458 pounds (2,073 kg) of seawater, no matter how much or how little air it contains (assuming a density of seawater of 1028 kg/$m^3$, which is fairly typical at depths above about 1000 feet—although it may vary some depending on the local salinity and temperature).

If its wall thickness is 1" (25 mm) [which, depending on what material is used and how exactly the pressure vessel is made, may be more than enough to give it sufficient strength], then the air volume inside will be 1.74 $m^3$. The weight of the vessel, with such a thick wall, if it is made of solid 6061 aluminum will be 1,648 pounds (749 kg) in air, which is the relevant figure, since its buoyancy in seawater is accounted for separately in the next paragraph.

Comparing the total buoyancy of the pressure vessel (2.073 metric tons) to the total weight of all 24 horizontal extension arms and their braces (1.266 metric tons) plus the weight of the pressure vessel (0.749 metric tons) we see that the buoyancy is just 58 kg more than those combined weights. Thus, if there were no more than 58 kg (about 128 pounds) of air pump, brackets, bolts, lights, cameras, sensors, bottom-end control computer, and other such hardware in the bottom end package or attached to the bottom-most pipe section, the whole bottom-most pipe section would be neutrally buoyant. (This assumes that the air bubbles in the vertical extension arms, if they are used, will have been adjusted to render them exactly neutrally buoyant.)

Since there may be somewhat more weight in all that other hardware, one might like to increase the net buoyancy of the pressure vessel somewhat. One way to do that is to use some other, lighter material than aluminum in the construction of the pressure vessel. Perhaps a carbon fiber-plastic composite material, possibly with a wound fiber construction. This would lower the weight of the vessel. This might also allow making the wall of that vessel somewhat thinner, which would increase the air volume inside, which is independently desirable as it would lower the maximum air pressure that would have to be put in the vessel when it is out of the water, or at a very close to sea level.

The maximum pressure inside the vessel is simply the maximum pressure needed in the air bubbles in the vertical extension assemblies times the ratio of the volume of all of those air bubbles taken together, which turns out to be 3.16 $m^3$ in this design, to the volume of air in the pressure vessel, 1.74 $m^3$.

For the design as discussed so far, with a 1" (25 mm) wall thickness, and for a maximum depth of 5 km, at which the pressure is approximately 500 atmospheres, or about 7,345 psia, the maximum pressure needed in the tank at the outset would be 12,917 psia (89 Mpa). But if the wall thickness were reduced to 0.75" (19 mm) the air volume in the vessel would go up about 4% and therefore the maximum pressure required would go down by the same amount. And the weight of the vessel would go down from 749 kg to only 567 kg if the wall material were the same density as aluminum, adding another 182 kg to the net buoyancy, and thus allowing compensating for that much more hardware.

A reasonable conclusion from all of this is that the bottom-most pipe section and all its appurtenances can easily enough be rendered essentially weightless in seawater, thus relieving the pre-existing support mechanism on the drilling platform that holds up the iris and transfer box from having carry any more load than just that box and the bit of central spline extending from it down to the ocean surface in addition to the marine riser it is already designed to carry.

One additional thought regarding buoyancy of the bottom-end package: If one decided to place within it an airtight chamber to hold, for example, the bottom-end control computer and any other potentially water-sensitive devices, that chamber would also add buoyancy—but then that chamber would need to be strong enough to withstand the ocean pressure at depth. Very likely this chamber would add more in buoyancy than it added in weight, thus making it unnecessary to fully compensate for all of the hardware through the buoyancy of the pressure vessel. Alternatively, if one could make all the necessary data and power connections through the wall of the toroidal pressure vessel without compromising its mechanical integrity, the bottom end control computer could be placed inside that pressure vessel, and thus be guaranteed a dry environment. Or, in yet another scenario, the computer could be enclosed in an air-tight/water-tight chamber that would be allowed to collapse onto the computer board and its components when the outside pressure rose at great depth. So long as the computer's operation would not be compromised by that crushing force, this would obviate any need for that enclosure to be bulky and stiff enough to stand off that high ocean pressure at depth.

Another concern that might need to be considered is that since the vertical extension arms are so heavy, it might be possible for one or more of them to fall away from the bottom-most pipe section while it is in transit or at some other time before the bottom-most pipe section is turned vertical and lowered into the ocean—possibly bending the horizontal extension arms and/or the braces in the process. This could be precluded simply by fastening one or more band(s) around the vertical extension arms when they are in their fully retracted position. In that position each of them is in contact with the vertical extension arms on either side, so by banding them together one creates a single solid with the bottom-most pipe section in the middle. That band (or those bands) would remain in place until the bottom-most pipe section is tilted upright, ready to be lowered into the water.

Another, perhaps better, way to accomplish this would be to add another feature to the bottom end package. Notice that in FIG. 8a the vertical extension arm ends up right on top of the bottom end package. If that package were modified to have 24 little pegs that poked up through its top surface by a few centimeters with those pegs arranged in a ring with a diameter of 60 inches and if the pegs had a suitable slot at their top ends, they could rise up around the inner edge of the vertical extension arm, catching both the inner and outer sleeves and holding them safely in the closed position. When it was time to expand the membrane, these extension arms could be released by lowering those pegs back down into the bottom end package. To this end those pegs could be attached to a ring inside the bottom end package that would be raised or lowered by a motor dedicated to this task.

Similarly, it would be possible to add such a ring at the top of the vertical extension arms, and attach that ring to a bracket on the central spline's bottom-most pipe section just above the upper end supports for the brace lead screws. Since the top of the vertical extension arm's outer sleeve is closed, the pegs on this ring would be on a slightly smaller circle so they would engage a special bracket that would be attached to the inner edge of the outer sleeve near its upper end extending a short distance in toward the central spline. Both of these sets of hardware would be in addition to what is shown in the present figures.

Yet another concern might be that the great dry weight of the bottom-most pipe section would be so large that the pipe section itself might not be able to carry it if the section were in a horizontal orientation and supported at its ends. This could be dealt with by putting a stiffening cylinder inside this pipe section during shipping and on the service barge during the initial phases of installation of this oil leak containment system up until the bottom-most pipe section is re-oriented vertically and lowered into the ocean water. This point is discussed further in the section on installation.

Some Useful Numbers and a Comparison with a Famous Oil Leak

The lowest section of the membrane—the bottom 150 feet (46 m) in the exemplary implementation described here—will be able to expand to a diameter of 105 feet (32 m). This is the maximum diameter the membrane can expand to starting a short distance above where it is fastened to the vertical extension arms near the ocean floor, and extending upward from there to the upper end of this widest section of the membrane 150 feet above the ocean floor—assuming a substantially level ocean floor. This encloses a volume of about 36,800 cubic meters, or roughly 232 thousand barrels of oil. Above that height the membrane can only expand to a diameter of 56 feet (17.1 m), which will hold roughly an additional 1,440 barrels of oil per additional meter of height.

Thus, for a 300 meter ocean depth the oil leak containment system could capture up to roughly 598,000 barrels of oil. At the depth of the Deep Water Horizon event (roughly 5,100 feet or 1,554 m) this oil leak containment system could hold over 2.4 million barrels of oil, or as much as leaked in that disaster in about six weeks, and an amount which is about half of the total that leaked in the entire incident.

Such a huge amount of containment volume enclosed is sufficient to give the drill operators ample time to bring tankers into place and prepare to pump out the oil that was captured before the membrane-surrounded containment region gets completely filled.

(The Deepwater Horizon event in 2010—which holds the record for most oil ever released in an accidental spill, and which is one of the best documented spills—released at most about 62,000 barrels of oil or gas per day, continuing for 87 days before it finally was capped. The total amount of oil released has been estimated at 4.9 million barrels. The measures BP had in place at the time allowed them to capture or burn only about 0.8 million barrels with the rest being dispersed in the Gulf waters. If they had had a containment mechanism of the sort provided by the present invention including the marine riser hydraulic fuse protection described below, the drilling platform wouldn't have burned, and then they would have had over a month during which the containment region was filling with oil and gas to arrange for suitable tankers or FSOs to line up and pump out the contained oil and gas. They would thereby have recovered all of oil and virtually all of the gas that leaked from their well during the time before it finally was capped. Naturally, this not only would have saved them an enormous amount of money that they've had to spend on mitigating the effects on the Gulf of their oil spill and compensating those whose lives were disrupted, it would have allowed them to refine and sell all of that oil and gas to their customers.

Final Steps at the Factory

The foregoing described how to create the membrane package and how to prepare it for shipping. It also described how to make each of the pipe sections that make up the central spline. There are just a few more steps of preparation of the apparatus for the oil leak containment system that must be done at the factory prior to shipping all the parts to the job site.

The Iris and Transfer Box

The first of these remaining steps is creation of the iris and transfer box. This is a unit that sits on top of (and supports) the central spline and is itself supported by the same apparatus on the drilling platform that supports the marine riser string. The purposes of this iris and transfer box, in addition to supporting the central spline, includes transferring any oil, gas, water, mud or other material that may come upward through the central spline to either the mud reclamation system on the drilling platform or to a transfer manifold where a waiting ship can connect hoses to pump that material into that waiting tanker or FSO. This manifold will likely have more than one hose connection to permit multiple ships to simultaneously pump out the captured material.

One more task for this box is supporting several tools used during the installation of this oil leak containment system. Those tools (specifically the membrane wrapping and sealing devices) will have to remain attached to the bottom of this box until the entire system is removed from the drilling platform.

The iris and transfer box has a pipe clamp mechanism located around a hole in the center of the floor of that box with the pipe clamp inside the box. This clamp will be used to hold a pipe section with the clamp at its reduced diameter section near the top end. This is how this box will support the central spline.

In addition, this iris and transfer box has, as its name suggests, an iris located near the top of the interior of the box. Most of the time this iris will be closed tightly around the marine riser string to prevent any upwelling material that might flow up through the central spline around the marine riser from traveling beyond this box upward toward, and potentially past, the drilling platform's turntable. This iris will be held open whenever the drilling team is placing or removing sections of the marine riser, and then will closed around the marine riser string the rest of the time. Ideally, the drilling team will install a "naked" marine riser segment at the top of the string so that the iris can close around it. The term "naked" riser refers to a marine riser without any buoyancy pads nor any rails or other appurtenances that might be used to hold such pads. Essentially, it should be simply a straight cylindrical pipe with flanges on either end. That presents a simple circle as the cross-section around which the iris will close.

Another feature of the iris and transfer box is that is shall have within it a cable 380 from the oil leak containment system's operator console which can be connected to the top-most pipe section of the central spline. This is how power can be supplied to all of the devices attached to the central spline, including those in the bottom end package and those on the extension assemblies surrounding the bottom-most pipe section of the central spline. And, of course, as this cable passes through the control box for the iris and transfer box it can supply power to and receive data back from the devices in the iris and transfer box.

Finally, there should be a way provided so that a technician can plug in a portable control interface which could be used to, for example, close or open the bottom clamp ring in the iris and transfer box once a pipe section that is being pulled up or lowered down gets into just the right position to clamp it at the reduced diameter portion. That interface could also be used to request an action from the oil leak containment system operator (e.g., lift up the pipe section a certain amount or open or close the iris or the lower clamp in the iris and transfer box in the event the technician didn't feel authorized to do that last action on his or her own). The clamp that is at the bottom of the iris and transfer box is hereinafter referred to as the lower clamp to distinguish it from the iris that is located near the top of that box.

Figure 11A:
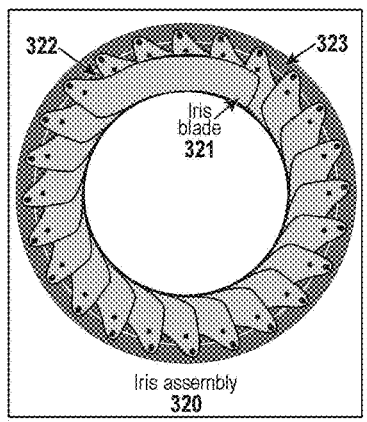
FIGS. 11a through 11e show an overview and many details of one possible construction of an iris and transfer box.
Figure 11B:
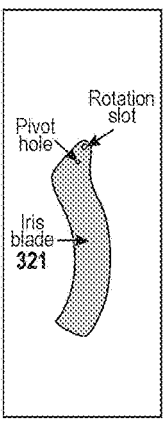
Figure 11C:
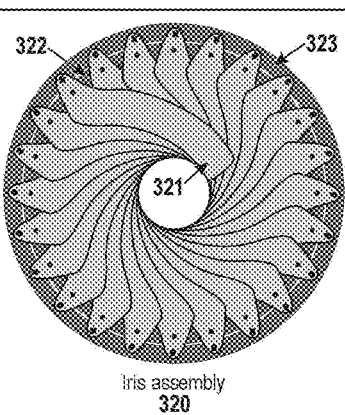
Figure 11D:
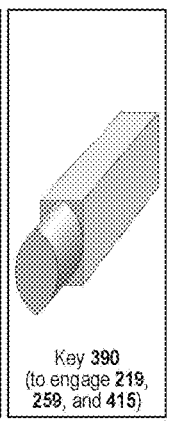
Figure 11E:
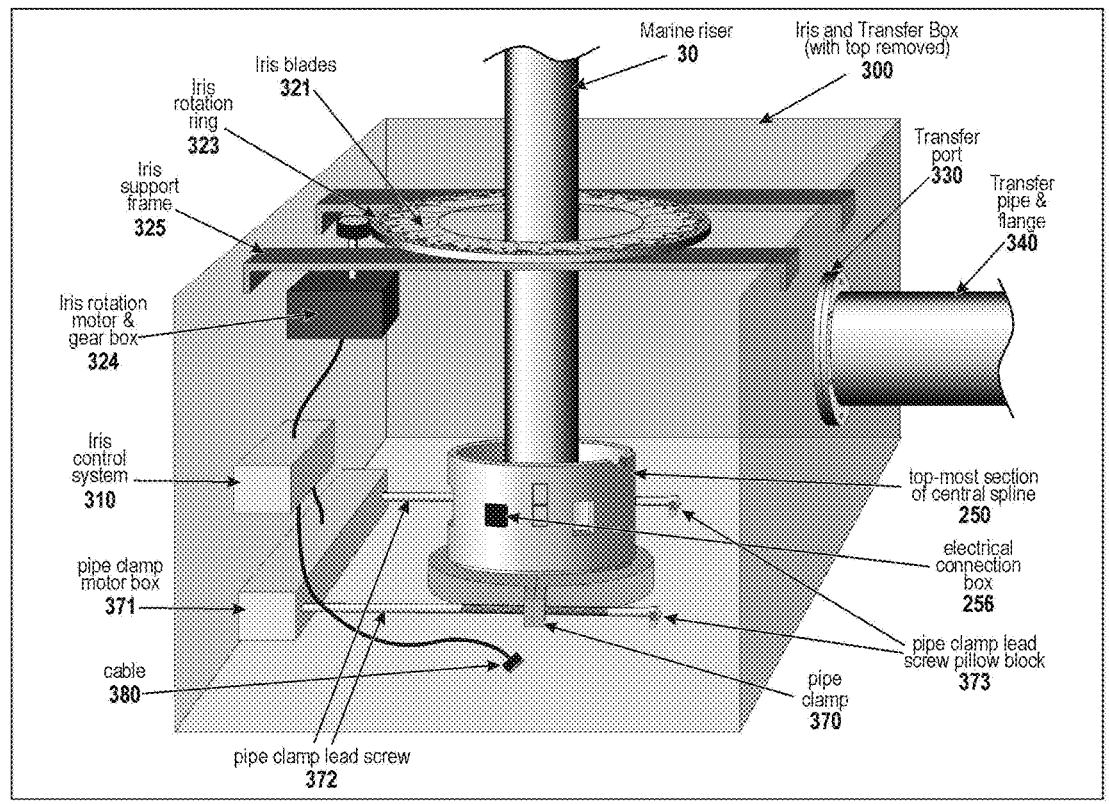

FIG. 11e shows one possible implementation of the iris and transfer box. It could be made in any of a large number of a different ways, with very possibly a very different overall shape and appearance, but the functionality must be essentially that shown here. In this figure, the overall box is roughly six feet (1.8 m) tall and only slightly wider than that. In this image the top of the box and the front wall have been removed and the right side is shown as if it were transparent, all done to enable the viewer to understand what the internal components are and how they relate to one another.

The constituent parts of the iris and transfer box 300 include the iris assembly 320 (with several sub-parts described below), transfer port 330 with its associated piping 340 for removing captured petrochemicals, and a pipe clamp 370. The box 300 might be installed on the underside of the drilling platform immediately below the turntable drive belt (if the drilling platform is maintained at a constant altitude, independent of a variation in the ocean surface height due to tides or wave action—as, for example, is the case for a spar platform or tension-leg platform), or it can be installed on the bottom of whatever apparatus has been provided on the drilling platform to hold up the marine riser independently of any vertical motion of the platform. In either case this box surrounds the top section of the marine riser a short distance below its upper end.

The two purposes this box serves are (1) to define the top of the containment region within which any leaking oil or gas will be captured, and (2) a way to transfer that captured oil or gas to an external storage or processing facility and, if necessary, provide a vent for high pressure gas to permit it to be safely flared off. The iris 320 serves one aspect of the first of these functions by sealing the opening at the top of the box to the marine riser, and the pipe clamp 370 seals the bottom opening of the box against the top-most section of the central spline. The transfer port and its attached piping serve the second function. These seals wouldn't prevent oil or gas from rushing upward inside the marine riser. That function can be provided by the marine riser hydraulic fuses described in a separate section, below.

During the installation of the central spline, that clamp is also used to hold temporarily at least the bottom-most section of the central spline, and it may be used to hold temporarily each of the other sections as well.

The iris 320 is similar to the iris in a camera in that it consists of many blades that move in unison to close down the size of a segmented approximation to a circular opening. The edges of these blades can be made sufficiently flexible (e.g., by adding a layer of rubber-like material on the inner edge where it will bear against the marine riser) so that they will seal adequately to the marine riser, thereby substantially closing off another top opening in the containment region and forcing any gas or oil that is captured in the containment region to exit the box through the transfer port. As mentioned above, preferably, the top section of the marine riser should be just a bare pipe with flanges without any buoyancy pads nor attachment mechanisms for them. This should not present any problems to the drilling team, as this section of the marine riser is necessarily located in whole or in part above the ocean surface, so buoyancy pads aren't particularly useful on this section. And having the exterior of this section of marine riser a simple unadorned pipe makes it possible for the iris to seal to it more effectively.

The iris assembly 320 in this implementation consists of 24 blades 321 mounted on a support ring 322. This ring is surrounded by another ring 323, termed the iris rotation ring, whose purpose is facilitating the simultaneous closing or opening of all of the iris blades. Both rings have 24 short posts attached on a circle around the center of the assembly. The posts on the support ring 322 fit through the pivot holes in the iris blades 321. The posts on the rotation ring 323 fit through the rotation slots in the iris blades. The outside diameter of the rotation ring in this implementation is 60 inches [1.5 m]. The opening in the center is, at its largest, 36 inches [0.9 m].

FIG. 11a shows a top view of the iris assembly with the blades rotated outward to maximize the open space in the center. FIG. 11b shows one of the iris blades 321, indicating where its pivot hole and rotation slot are located. This particular shape of iris blade is a compromise shape that works reasonably well for sealing around any diameter of marine riser (as well as being able to seal off the entire opening if there is no marine riser present). If a particular drilling team always uses marine riser sections of the same diameter, the iris blade shape used for the oil leak containment system apparatus created for them could be optimized to create the best possible seal for that size of pipe.

FIG. 11c shows the iris assembly closed down to just surround a marine riser pipe whose inner diameter is twelve inches and whose outside diameter is 13 inches [0.33 m]. If you compare this figure with FIG. 11a you will see that the rotation ring has rotated about its center by less than four degrees. Since the space between the pivot hole and the rotation slot on the iris blades is only about one-tenth the length of those blades, to get a full rotation of the iris blades from the fully-open to fully-closed position only requires about a four degree rotation of the outer ring.

FIG. 11d shows a perspective view of the key 390 that is mounted on the bottom of the iris and transfer box and that will engage the keyway 219 in the bottom-most pipe section, the keyway 259 in each of the other pipe sections and keyway 415 in the special extraction tool. Naturally, this is not the only possible design of such a key. In this particular implementation, the keyways are all 3" (76 mm) wide and 0.8" (20 mm) deep, so this key is 2.9" (74 mm) wide at its widest, 6" (0.15 m) tall and about 10" (0.25 m) long. The top surface of the key is fastened to the bottom of the iris and transfer box in a position that makes the front surface of the key exactly 16.3" (0.414 m) away from the centerline of the central spline when those pipe sections are passing through or are held within the iris and transfer box. The part of the key that enters the various keyways is shown as having a shape that is narrow (approximately 0.120" [3 mm] at the top) to help bring a pipe section that is up to five degrees out of angular alignment into exact alignment as they pass by the key. Because, as is explained below, the special extraction tool has a keyway that flares out at the top and bottom, it will be captured and brought into alignment as long as it approaches the key with no more than about 14 degrees of misalignment.

Either the key should be able to be rotated around the axis of the central spline or the iris and transfer box should be able to be rotated to just the right angular orientation when it is attached to the support apparatus for the top of the marine riser. The "right" orientation for the key is such that it points directly across the central spline's axis to the second membrane gate on the oil leak containment system's service barge. The reason for this will become clear in the discussion of the process by which the membrane package is installed around the central spline, described in the section titled "Moving the Bottom-Most Pipe Section into place under the MODU" and in the section titled "Installing and Wrapping the Rest of the Central Spline." In FIG. 11e, the orientation of the pipe section 250 that is shown clamped in the lower clamp suggests that the key 390 would be located under the bottom surface of the iris and transfer box on the right side of that pipe section in this view.

FIG. 11e shows a perspective view of the entire iris and transfer box 300 with most of its component parts illustrated and identified. In addition to the internal parts you see here the top end of the upper-most section 250 of the central spline 200 (shown with more details in FIG. 7) clamped in the pipe clamp 370 and the top section of the marine riser 30 which passes through the entire box. In this figure the iris assembly has not yet been closed around the marine riser.

In this figure the required small rotation of the outer ring of the iris assembly to close it around the marine riser is shown as being accomplished by a motor 324 that turns a rubber wheel bearing on the outer edge of that ring. Alternatively, the motor could turn a small spur gear and the outer edge of the ring could have a few gear teeth cut into it for a more positive relationship between the motor rotation and the ring rotation. In either case, a large gear ratio between motor and the shaft turning the wheel or gear would be useful both to supply more torque from the motor through that large gear ratio and by making it necessary for the motor to turn through several rotations to make this fairly subtle rotation of the iris rotation ring 323. Further, this arrangement provides a substantial resistance to any force that might accidentally tend to push the iris open when it should be closed even if the motor 324 is not powered to force the iris closed at that time.

Not shown here is the detailed apparatus by which the iris rotation ring is supported and enabled to turn freely. One could place a set of ball (or roller) bearings between the two rings, and the outer edge of the inner ring 322 might be beveled with its lower edge having a larger diameter than its upper edge, and the inner edge of the outer ring 323 could then be beveled in a matching manner, so the inner ring could bear the load of the outer ring through the intervening bearings.

The pipe clamp is here shown as two sections that are forced together or apart by rotation of a pair of lead screws 372 with their left halves (in this view) having a right-handed thread and their right halves having a left-hand thread. This makes the two sections move apart when the two lead screws are rotated one way, and makes them move together when those lead screws are turned the opposite way. These screws are held at their right ends by pillow blocks 373. At their left end they are supported and rotated by a motor in the pipe clamp motor box 371. Using a large gear ratio drive between that motor and the lead screws will essentially guarantee that once the clamp has closed around the central spline, it will remain there until it is commanded to open up even if power to the motor interrupted.

This is a particularly simple clamp design to describe and draw. Any clamp (including ones with more (and perhaps many more) than two "jaws" that close around the pipe section) is included in this invention so long as it serves these two essential functions: (1) holding the pipe section firmly and transferring its weight to the iris and transfer box, and (2) sealing that connection between the pipe section and the iris and transfer box so that no significant quantity of oil or gas can escape through that joint. One reason that a multi-jaw clamp might be preferable is that those jaws would only have to move away from the axis by a little more than one inch (25 mm) in order to let the pipe section pass freely through it, whereas the clamp design shown here would require the two sections to pull apart by at least six inches to make sure the outermost ends of those clamp sections will not interfere with the passage of the pipe sections. On the other hand, it would take a slightly more complicated linkage to move each jaw radially outward than the mechanism shown in FIG. 11e.

During the installation of the central spline 200 (the string of rigid containment pipe sections 250 plus the one bottom-most pipe section 210) the iris must be held open to let those pipe sections be lowered through the drilling platform and down to where the wrapping machine 130 and the seaming machine 140 can seal the membrane around them. When the central spline is complete, the top end of that pipe string is clamped in the pipe clamp 370. Then the drilling team can proceed to start their work.

Before they drill the new well, they will first install the marine riser 30 with a "naked" marine riser section at the top end, where it will be above the water (where it would not benefit from any buoyancy pads anyway) in the region where it will extend through the iris and transfer box. Once the marine riser is installed the iris 320 will be closed firmly around the marine riser, and it will remain closed until the drilling team needs to remove the marine riser, perhaps because they are about to move the MODU (or drill ship) to a new drill site, or because one of the marine riser hydraulic fuses 500 (described below) blew out during a blowout event.

The transfer port 330 and associated piping 340 in the iris box leads outward from the iris and transfer box to one or more manifolds at a convenient location with multiple ports for attaching hoses to one or more tanker(s) or other FSO(s) for removing the oil and gas within the containment region. This pipeline may also have a branch pipe 350 with an overpressure release valve (or other valve) 360 that extends high above the drilling platform 11 to let any overpressure of gas escape harmlessly. This flare-off pipe should also incorporate a device to ignite that escaping gas automatically so it will burn completely, thus preventing methane contamination of the atmosphere. That piping 340 may also have a side arm that goes to the drill platform's normal mud reclamation system. This will make a convenient way to remove the captured leaked oil or gas provided that mud reclamation system is capable of handling the quantity of captured material sufficiently rapidly. When it cannot handle the flow, and if the amount of escaped oil and/or natural gas threatens to overfill the containment region, the unprocessed material will simply have to be pumped off of the drill platform to one or more waiting FSO(s) or tanker(s).

One last item that is installed within the iris and transfer box is a cable 380 that runs from the iris control system to a location near the pipe clamp 370, adjacent to where the electrical connection box 256 on the topmost pipe section of the central spline will end up. (Naturally, if the option of having two cables down each pipe section is used, there should be two of these cables 380, with one going to the vicinity of each of the electrical boxes 256. Likewise, if a wireless connection is used between pipe sections, a suitable wireless interface will need to be supplied here where it could be placed close enough to the mating interface at the top of the pipe section that is clamped inside the iris and transfer box's lower clamp.) This cable can be anchored to the wall or floor of the iris and transfer box at this location with enough free cable hanging off to make the required connection easily and still leave some slack so the cable connectors are not stressed. As one of the last steps in the installation of the oil leak containment system this cable 380 will be connected to the cable 257 in that box.

The iris control system 310 is also connected to the iris rotation motor box (both to control that action and to receive sensor signals indicating success in that operation) and to the pipe clamp motor box (again to both control its actions and to receive sensor signals about their success), plus it is connected outward through a bulkhead connector (not shown here) to a cable 620 from the overall oil leak containment system apparatus operator's console. All of the electrical connections within the iris and transfer box will need to be sealed against water infiltration, and the bulkhead connector will likewise have to be watertight. (Since the iris and transfer box is never going to be immersed in the deep ocean, these boxes will never be exposed to great pressure differences between their interiors and the surroundings. They should, however, be at least nominally watertight, since undoubtedly at times there will be seawater splashed up against them.)

One important additional aspect to the iris and transfer box—and one that is not illustrated in FIG. 11e—is that it must have an openable, re-sealable port on both the front and the back sides and there must also be external walkways attached to and descending from at least those two sides a suitable distance, and perhaps wrapping around three sides of the box (each side other than where the transfer port is located in an iris box similar to that pictured in that figure). These walkways and ports are essential to enable workers to stand comfortably on those walkways and reach through those ports when they are in their open position, in order to access the interior of the iris and transfer box at several times during the installation of the oil leak containment system. Primarily they will need access when each new pipe section is added to (or removed from) the central spline. They need this access in order to do several steps described below.

Also, they will need to communicate with the crane operator as each new (referred to here as the upper) pipe section is lowered down toward the pipe section (referred to here as the lower pipe section) that is clamped in the lower clamp. The object of this communication is to help the crane operator lower the upper pipe section until its lower end is just a short distance above the top end of the lower pipe section. The technicians must then make sure that upper pipe section is rotated to the correct position to properly mate with the lower pipe section. Once they are satisfied they can tell the crane operator to "drop" the upper pipe section into place. (This "drop" action is not really a letting-go of the pipe section by the crane; instead it is merely a very rapid lowering until it hits and, one hopes, connects securely to the lower pipe section.) If the upper pipe section was correctly oriented and positioned, it will fall and force the three spring clips 254 to open and then slide down to where they can snap into the mating holes 253 in the lower pipe section. As the two pipe sections come together, the key and keyway on their mating surfaces 260 and 261 (see FIGS. 7a and 7e) will help rotate the upper pipe section to insure its precise angular alignment with the lower pipe section. Once this happens, the keyways 259 in both pipe sections will line up, as will the shorter cable slots 258.

Once the spring clips snap the sections together, the next action the technicians must take is a visual check that the two sections are, indeed, properly mated together with no gap between them and with the upper pipe section's spring clips fully engaged with the openings in the lower pipe section. If that isn't the case, they must manually pull out on the spring clips and request that the crane lift up the upper pipe section a short distance. After that is done they can rotate the upper section if necessary, then realign the two pipe sections and request that the crane operator quickly lower ("drop") the upper pipe section once more in an attempt to seat it properly and thus obtain a secure mechanical connection between the two pipe sections.

Once that has been accomplished to the technicians' satisfaction, they will have to open up the one or two electrical connection box(es) 256 near the top of the upper pipe section and unclip the cable(s) 257 from the locking band 255 that surrounds the bottom end of the upper pipe section, lower that loose end and plug that cable (or those cables) into the mating connector(s) inside the associated electrical connection box(es). Once that is done they can request an integrity check by the oil leak containment system operator. Once they are told that was successful, the technicians can fill the electrical box(es) with an incompressible hydrophobic "grease" to fully surround the cable connections therein, thus precluding seawater reaching those connections and possibly corroding them. At that point they will snap the cover(s) on the electrical box(es). Ideally these covers will seal the box so no seawater can enter it, but unless all the air is displaced by the "grease," the very great pressure at depth would very likely be enough to breach the box seals. (This step will be greatly shortened if a wireless interface between pipe sections is implemented. It will still be necessary to do the tests for functionality, but there will be no need to mess with plugging in a cable, packing the connection box, and then testing the connection before sealing that box.)

Now they can lower the locking band 255 from its stored position near the bottom of the upper pipe section down around the spring clips near where they engage the holes near the top of the lower pipe section. This is done by first depressing the switch SW2 that has been keeping the band from falling. Then the two technicians can hold the bottom of the band on both sides and lower it down past the switches SW2, SW3 and onto SW4. After SW1, SW2, and SW3 have popped out (and SW3's actuator has moved into position to keep the locking band from being raised upward) they can confirm this to the oil leak containment system verbally. That operator should, by this time, have seen electrical signals confirming the switch closures and openings, so this verbal and visual check is merely a confirmation of what the system has itself detected.

At this point the technicians can withdraw their hands from the iris and transfer box and, optionally, close and seal the access ports until their help is needed again. (If they are going to stay on the job while a number of pipe sections are successively lowered and will need their help in being rotated correctly, etc., then they may elect to leave these ports open until their job is done for the day. Ideally there should be a sensor on each port to indicate when it is closed and locked in a manner that insures it is fully sealed. This information would have to be noted by the oil leak containment system's operator before the system would be declared ready for use, since any leaks through these ports could defeat the system's purpose, as there must be no way for oil or gas to escape from the iris and transfer box through those portholes during normal operation.)

When removing a pipe section, the workers must first raise the locking band, after which they can open the electrical box and unplug the cable (and hook the cable end up over the top of the now-raised locking band), and finally they can pull out the spring clips to release the upper pipe section's hold on the lower section. At that point they can tell the crane operator to lift that upper pipe section up and out of the iris and transfer box.

The Special Extraction Tool

The next item that must be prepared at the factory is what is termed herein as the "special extraction tool." This is functionally a device that can on one end be picked up by the crane and on the other end can securely attach to a pipe section. This attachment function need not be accomplished in the same way that the several pipe sections mate with one another. Indeed, it may well be preferable to make it attach differently. The goal is to have an attachment method and apparatus that will securely hold the pipe section but which can be quickly and easily unattached from the pipe section without needing a technician's assistance, although it also may desirable at times to have a technician ride this tool as it carries a pipe section to or from the central spline.

FIG. 12 shows several views of an exemplary implementation of this special extraction tool 400. Overall it consists of a specially shaped basket 410 supported by an arched hanger 430 and containing, among other things, three locking arms 460 that can be used to engage the pipe section to be lifted. (The technician, by her presence helps show the size of the tool which is large enough to accommodate even a fairly tall man with a helmet and yet has a low enough side that even rather short people could easily reach over it). A dark grey is used to indicate where you are looking at a cross-section of the pipe section to which this tool is attached, with the insides of the through-holes in that pipe section—where the locking arms secure this tool to the pipe section, and where also the spring clips can secure another pipe section on top of this one—are rendered in a lighter shade of grey.

Figure 12A:
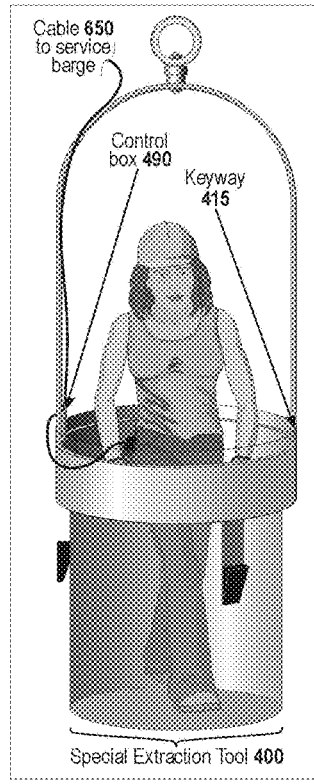
FIGS. 12a, 12b, and 12c show many details of the special extraction tool in the exemplary implementation.
Figure 12B:
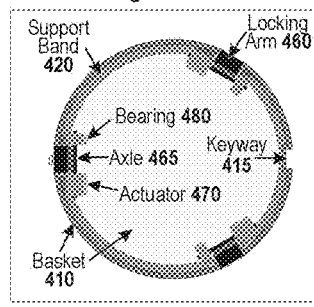

In FIG. 12a you see a perspective view of the entire tool with all of its parts. FIG. 12b shows a top view of the basket as it would appear if the arched hanger were removed. Here you can see where the motors are located to operate the locking arms that can engage the pipe section. This view shows the keyway 415 as being just 3" (76 mm) wide, which is how wide it is for most of its length. But at both the top and bottom, that keyway should be flared out so that its width at the very top of the basket 410 and at the level of the bottom of the support band 420 are about 10" (254 mm). This will insure that when the special extraction tool is either raised up from below or lowered down from above through the bottom opening in the iris and transfer box, it will properly engage the key that is located there so long as the angular orientation of the special extraction tool is within about 14 degrees of the ideal orientation. This greater tolerance will be particularly useful in the initial connection of the bottom-most pipe section 210 to the lowest of the other pipe sections 250.

Figure 12C:
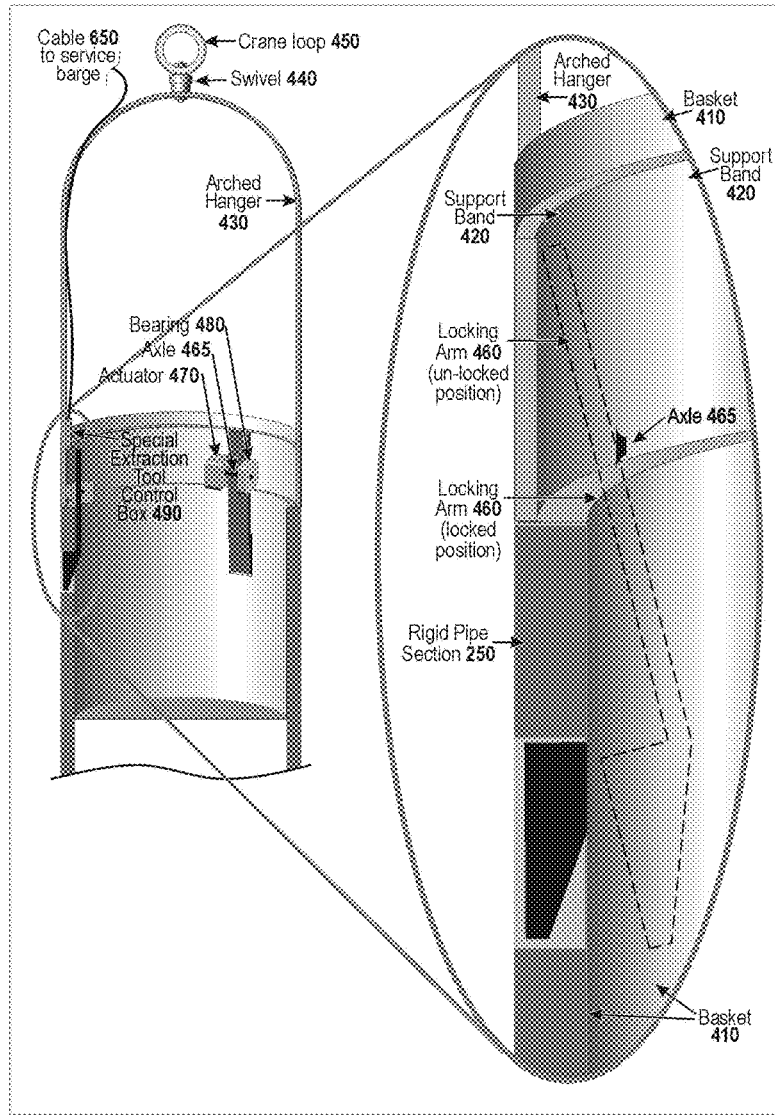

In FIG. 12c you see a cutaway view where the front half has been sliced off to reveal more clearly the interior contents. The inset in FIG. 12c shows a 500% magnified side view of just one of the three locking arms 460, showing how it moves to engage (solid) or release (dashed line) the pipe section. As before, the small oval, the large oval and the lines connecting the two are shown in orange to help distinguish them from the items they surround.

This special extraction tool's basket 410 consists of two section of tubing connected end-to-end by a transition section. In FIGS. 12a and 12b the tubing sections are vertical and the transition section is a flat horizontal annulus whose inner and outer diameters just fit the two tubing section. The lower section of tubing is just slightly less than 30" (0.76 m) in outside diameter—a size chosen so that it will just slip inside the rigid pipe sections—and roughly 30" (0.76 m) high. This lower section has a closed bottom, optionally reinforced, where a technician riding it can stand and ride safely as a pipe section is being transported from the service barge to the drilling platform or the reverse. The upper section of tubing has a 34" (0.762 m) outside diameter to match the OD of the pipe sections, and is roughly 11" (0.28 m) high. That wider section extends upward another 10" (0.25 m).

In FIG. 12a the back half of these tubing sections are rendered as a somewhat reflective solid material and the front half as a semi-transparent material. This is merely to make more evident what is located inside the tubing. Since the combination of these two tubing sections has a bottom and no top, it is hereinafter referred to as the basket 410. In practice, to save weight, it may be desirable to make the basket out of sieve-like material (which would be semi-transparent).

Inside the wider section of this tubing, sitting directly on top of the transition between the narrower and the wider sections of the basket, is a circumferential band of a strong rigid material, here shown as a ⅝" (16 mm) thick ring that is 8" (0.2 m) high. This "support band" 420 is welded (or otherwise securely attached) to an arched hanger 430 that extends upward approximately 50" (1.25 m) and which connects through a swivel 440 on its top to a ring 450 by which a crane may pick up this tool. The arched hanger is shown here as being made of a similar material to the support band 420, but only 4" (0.1 m) wide. The swivel will let the technician riding inside the special extraction tool, or one standing near it, rotate the basket 410 manually as necessary to align its keyway with the keyway in a pipe section that may already be clamped in the iris and transfer box, or with the key in the iris and transfer box if there is no pipe section there. (It may be useful to have a post inside the iris and transfer box extending upward approximately 40" (1 m) right beside the key in the bottom of the iris and transfer box, to serve as a guide for the technician to rotate the special extraction tool's basket and arched hanger to just the right orientation for its keyway to fit around that key.)

In FIG. 12c you see a top view of the basket and its contents in a cutaway just below where the hanger 430 connects to the support band 420 that goes all the way around the tool just inside the outer surface. Here and in FIG. 12b the locking arm is shown as being attached to an axle 465 that is turned by an actuator 470 and supported on its other end by a bearing 480. Both the actuator and the bearing are securely attached to the support band 420.

Also indicated in FIGS. 12a and 12b is a cable 650 from the oil leak containment system's control station on the service barge 600. This cable is attached to the arched hanger 430 and then goes into a small control box 490 attached to the arched hanger where it joins the support band 420. From there another short cable extends outside the basket and is shown here as having its bottom end (which is terminated in a multi-pin connector) draped over the top edge of the basket. The cable 650 serves two purposes.

First, it has control signals and power to operate the locking arm actuators 470. It is very important that the oil leak containment system operator be able to control the engaging or releasing of the pipe section, even if there is a technician riding in the extraction tool. Only that system operator can see indications that show that the pipe section is securely held by the iris and transfer box clamp 370 before releasing the hold on that pipe section by the special extraction tool. Optionally there may be one or more switches on the control box that such a technician could use to tell the oil leak containment system operator when he or she (the technician) thinks it is time to engage or to release the pipe section.

The second purpose of the cable 650 is to carry power and signals to and from the pipe section being carried by the special extraction tool. This will allow testing that pipe section (and any other sections of the central spline that may be attached to that pipe section) for integrity and proper operation. This is why there is a secondary portion of that cable with a suitable multi-pin connector on it extending beyond the control box on the special extraction tool. The technician riding in the tool, or one nearby can attach that connector inside the pipe section's electrical box 216 (see FIG. 9b) or 256 (see FIG. 7a or 7e) once the extraction tool has been securely connected to that pipe section. (If a wireless pipe-to-pipe section communication and power link is implemented, there need only be a suitable wireless unit included in each of the three locking arms, and then this extension of the cable 650 will be unnecessary.)

The locking arms shown here have a portion that engages the pipe section using the same holes 213 or 253 as are used by the locking clips 254 when connecting two pipe sections together. The flat top of the portion of the locking arm is located about one-quarter of an inch (6 mm) lower than the top of those holes when the extraction tool is seated firmly on top of the pipe section. Thus the locking arms can be rotated from their released to their engaged position with very little force. Once they are in the engaged position and the extraction tool starts to lift up, these arms will catch on the top of the holes 251 and then lift the pipe section. At that time, it is unlikely that they could be easily disengaged as the friction forces would be quite large. This is a safety feature, not a limitation.

The actuators 470 preferably would be high-ratio gear motors. That would let the motor portion turn through several revolutions before the axle 465 turned the just under 14 degrees necessary to move the locking arm from its fully engaged to its fully released position. If the motor is a DC motor, when the locking arm reaches the end of its travel, the current drawn by the now-stalled motor will increase, and that signal can be used to shut off the motor. Thereafter, with no power to the actuator, the locking arm will be securely held in place by the friction through the high-ratio gear train. This also is a safety feature.

If desired, it would be possible to add a small battery pack to the special extraction tool and provide circuitry that would let the technician operate the locking arms manually any time the cable 650 from the oil leak containment system operator's console was disconnected.

The Membrane Gates

Two pairs of long rollers mounted in a rack that defines and controls their spacing and orientation will also be needed for use on the service barge as the oil leak containment system is installed. These are very similar to the pairs of guide rods shown in FIG. 5 and FIG. 6 where they were called entrance and exit membrane guides for the cuffing region, or to the rollers described in connection with FIG. 5 that serve to align the adjacent membrane panels in an appropriate manner before they are bonded to one another to create the membrane package. Like the membrane guides on either side of the cuffing region, these membrane package gates (or simply "membrane gates") can, if they are set at right angles to the direction of travel of the membrane package, serve to keep the membrane package traveling in the desired direction at exactly the desired location. Or, like the guide rollers used to align the membrane panels prior to bonding together, this pair of membrane package gates can be tilted parallel to one another but away from right angles to the membrane package's direction of travel—which will cause the membrane package to continue in the same direction but be displaced both sideways and upward (or downward) as may be desired.

One of these membrane package gate roller pairs will be attached to the bolt/reel so the membrane package can be guided as it comes off of that bolt/reel once they both are placed on the oil leak containment system barge. This gate will serve to make sure the membrane package comes off the reel without sagging or leaning to the side. Since the bolt/reel's axis will be vertical, the membrane package will travel horizontally away from that bolt/reel with the panel surface oriented vertically. If that gate is tilted with its top end away from the bolt/reel, the membrane package will angle upward as it passes that gate. If the second gate is tilted parallel to the first gate and is located a suitable distance away from the first gate, the membrane package's path will angle back to the horizontal (albeit potentially displaced sideways and perhaps going in a different direction). Because of the upward angled path between the two gates, the membrane package will also be displaced vertically from the path it was following as it left the bolt/reel. The amount of vertical displacement will depend on the angle of tilt of the gates and the space between them.

While the first membrane package gate will be permanently attached to the bolt/reel, the other gate will be placed first in one location adjacent to the bottom-most pipe section and later on in another location and orientation near the edge of the service barge. This is described in some detail below in the sections detailing the installation process for this oil leak containment system.

The Wrapping and Seaming Machines

The wrapping and seaming machines that wrap the membrane around the central spline and that seam its edges together must also be manufactured and packed for shipping. In addition there must be a hand-held, portable seaming machine included for seaming the cuffed portion of the membrane package.

The Wrapping Machine

FIG. 13 details how the wrapping machine 130 is built. Again, very much like the pleating machine shown in FIG. 4 and the folding machine included in the seaming stations shown in FIG. 5b through 5f, this wrapping machine is, in its essence, simply two specially formed parallel sheets of slippery plastic that guide the membrane package from one shape (flat) to another (rolled into a not-yet sealed tube). So it will have an entrance orifice that is a long, straight opening between the upper and lower sheets which is just a bit wider than the membrane package and an exit orifice that is a pair of concentric circles large enough to surround the central spline with a bit of clearance. In FIG. 13a the membrane hem end is shown in medium (40%) grey as it approaches the entrance orifice in the direction indicated by the superimposed arrow pointing into the wrapping machine, and the exit orifice is indicated by a similar arrow pointing away from that machine in FIG. 13e. The grey trapezoid labeled 131 in FIG. 13a is the wrapping machine itself, flattened out. The lines labeled 133 show the locations of the channels formed in the bottom layer of the wrapping machine to guide some hooks described below.

In our exemplary implementation the top layer 132 of the wrapping machine will be made of rigid plastic material approximately 0.25" (6.35 mm) thick with the outer edges of that material bent down to seal to the sides of the bottom layer. That bottom layer 131 will be made of a similar material that is twice as thick (for a reason to be explained shortly). The two layers will be separated by a gap of roughly 0.5" (12.7 mm). This gap is intentionally considerably larger than the thickness of the membrane package, even in its "cuffed" portion, in order to allow that package to slightly expand vertically and horizontally as it passes through this wrapping machine.

Figure 13A:
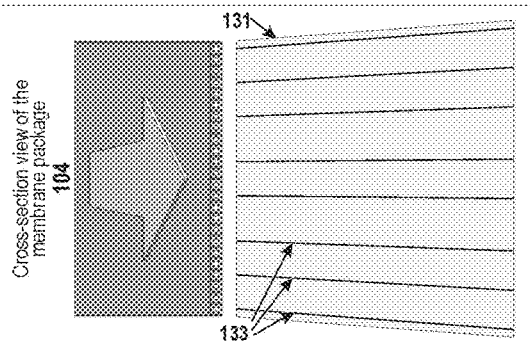
FIG. 13a through FIG. 13h include several detailed views showing how the wrapping machine is created, and how it wraps the membrane package around the central spline prior to having its open edges sealed.

FIG. 13a shows a view looking along the axis of the central spline at the wrapping machine with its layers flattened out (as it was before being formed into its final shape) with the membrane package coming in from the left, approaching the entrance orifice of the wrapping machine's bottom layer. The top layer (before it is formed to its final shape) looks much the same, except that in this view it would extend upward and downward an additional 1.0" (25 mm) to permit those edges to be bent down and attached to the lower layer.

The grey trapezoid is the top view of the bottom layer 131. This left edge is just a little longer than the width of the membrane package as it comes off of the bolt/reel. The right edge is about 16% longer. This expansion is necessary so that the exit side of the wrapping machine will be long enough to wrap all the way around the central spline until its outer edges meet one another. The dark lines labeled 133 in this figure are eight channels that guide hooks that will be used to pull the hem of the membrane package through the wrapping machine at the start of the installation of the membrane around the bottom-most pipe section.

Figure 13B:

FIG. 13b shows the membrane as it would appear if it were to exit from the wrapping machine in this flattened form (as opposed to the final form in which both the top and bottom layers are wrapped around the central spline). Here you see the eight hooks (with strings attached to each one) pulling the membrane package to the right. If you look closely, you'll see that because of the hooks passing through all the hem holes in the eight membrane panels where the hooks are engaged, those panels are not expanded at all during their passage through the wrapping machine. But each of the other membrane panels is expanded vertically (in this view) by the roughly 16% stretching of the overall membrane package as it passes through the wrapping machine.

Figure 13E:
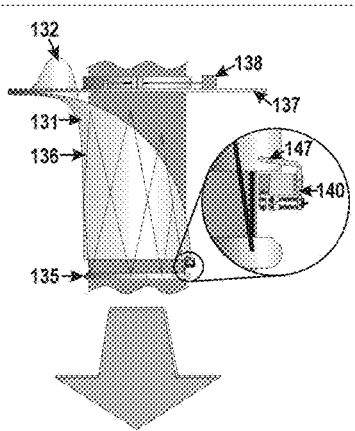
Figure 13C:
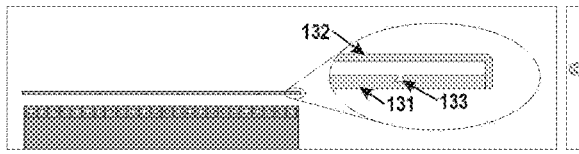

FIG. 13c shows an end view of the wrapping machine's entrance orifice. For reference, the hem end of the membrane package is shown just below this orifice, although in practice the membrane package will approach the entrance orifice on the same level as that orifice and in the plane of the wrapping machine's layers near that orifice.

The 500% magnified inset in this figure shows how the two layers 131 and 132 of the wrapping machine are attached to one another along the outer edges and it shows one of the channels 133 that guides the hooks that will be used to pull the membrane package through the wrapping machine initially.

Figure 13D:
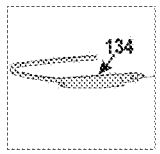

FIG. 13d shows a 1000% magnified perspective view of one of those hooks 134 (twice the magnification of the inset in FIG. 13c). In a vertical cross-section view the body of the hook is triangular so as to fit into the triangular channel in the bottom layer 131. Viewed from above (as in FIG. 13b) the hook body is lozenge shaped to keep it from getting stuck in the channel. At the front end a narrow portion extends out in front of the hook's body. At the rear end a narrow portion with a hole in it permits tying a string to the hook body to pull it through the channel.

The front end of the hook is extended in a narrow band that goes forward for about 2" (51 mm) and up about half an inch (13 mm) in front of the body of the hook rising, so that where it turns back toward the hook body is well above that body. This is necessary as the membrane is to be pulled along above the bottom layer 131 while the hook body is embedded inside the channel 133 in the bottom layer 131. The hook finally comes back about as far as it had gone forward and rises as it goes only about another quarter inch, so that its upper most point will still fit under the top layer 132 of the wrapping machine.

FIG. 13e shows a side view of the final form of the wrapping machine. The top layer 132 of the machine is visible sticking up well above the level of the entrance orifice while the lower layer 131 is shown descending downward and around the central spline. But at all points the two layers are only separated by one-half inch (13 mm). This curious shape is necessary, since the distance to be traveled by the membrane package must be same for each of the membrane panels that comprise that package so that the membrane package will emerge from the exit orifice of the wrapping machine as a circular tube with its hem forming a circle in a plane perpendicular to the central spline. So the panels that are near the centerline of the membrane package must travel first upward and then down so they will go the same distance before they reach the exit orifice of the wrapping machine as the outer panels will as they travel both down and around the central spline to where the outer edges of the upper layer of the wrapping machine 132 finally meet at the far side of the central spline. The circular exit orifice of the wrapping machine surrounds an opening that is just bit larger than the minimum size that could accommodate either pipe section 210 (above its bottom-end package and the extension members) or pipe sections 250.

In this figure you also see a flat plate 137 that is attached to the top of the wrapping machine at its entrance orifice end and for some distance inward from that toward the central spline. This plate must have a rather large hole in it to permit the wrapping machines two layers to bulge upward in its central portion as described in the preceding paragraph as well as a central hole to let it clear the central spline. Fastened to the top of this panel is a clamp mechanism 138 that resembles the lower clamp in the iris and transfer box.

As was noted in the discussion, above, about that clamp, the simple two jaw design shown here is merely an example. Any clamp design can be used so long as it will permit an adequate mechanical connection between the top plate and the pipe section when the jaws are closed, and will permit the pipe section to pass through the jaws freely when they are in their open position. In contrast to the lower clamp in the iris and transfer box, this clamp has only to serve that mechanical function. There is no seal needed here to stop the flow of oil or gas through that joint.

This clamp will have been secured to the bottom-most pipe section at the factory in an orientation such that the keyway 219 will run directly under the place where the two edges of the wrapping machine meet. This orientation is consistent with the other mentions of the orientation of the key 390 on the iris and transfer box and the orientation of the last membrane gate (discussed below).

Just below the bottom end (the exit orifice) of the wrapping machine 130 is a hoop labeled 135. This hoop consists of seven segments that are connected to one another to create a circle. Indicated here also is an arrangement of braces 136 that are connected by hinged joints and that attach to each of these seven segments in a pantograph-like manner. The purpose of these braces is to permit the seven segments to be pulled apart and yet always be chords on a common circle as the circle's diameter is increased.

At the lower-right of FIG. 13e, surrounded by a circle, you see a view of the permanent seaming machine which is described in the next section of this document. The inset shows a 500% magnified view of that portion of this figure and it calls out there the seaming machine 140 (with its rather complex construction) and one possible form of the attachment 147 that connects the seaming machine to the outside of the wrapping machine just above the exit orifice.

Figure 13F:
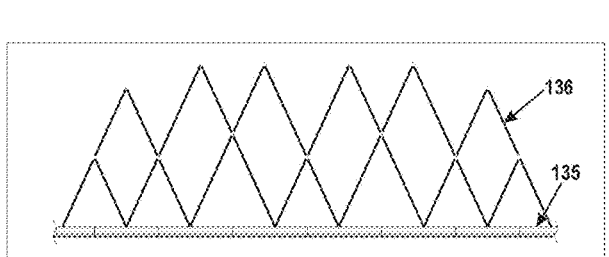

FIG. 13f shows a flattened out version of this pantograph arrangement. The seven segments of the hoop 135 are shown as if they formed a straight cylinder along the bottom of this figure. At each end is an indication that you are only seeing there a portion of one segment; these two pieces, at either end of this figure, are in fact opposite ends of a single segment.

The pantograph arrangement attaches to the center of each segment which is also where, in all but one instance, the strings from the eight hooks attach to those segments (In the exceptional case the two outer strings attach to the segment shown in part at each of the ends of FIG. 13f where the two ends of the pantograph braces attach to that segment. In our exemplary implementation, each section includes a small motor and reel, with the string from the hook being wound onto that reel. Power to these motors is supplied by cables (not shown here) that travel along the braces and thence off to a power supply and control unit somewhere nearby.

This segmented hoop is used only briefly at the start of wrapping the membrane package around the bottom-most pipe section. Its purpose is to pull the membrane package through the wrapping machine and then down around the rest of the bottom-most pipe section. Where the membrane package exits the wrapping machine its outer edges will be roughly an inch (25 mm) apart and the hooks pulling those outer membrane panels will be about 5" (127 mm) apart. These two strings will both be attached to that particular segment which must, therefore, have two separate reels driven by the same motor to reel them in.

When the membrane package is to be transferred from the 24-snap-ring bar to the eight hooks 134 which will initially be hanging out of the entrance orifice of the wrapping machine 130, as each of those hooks is hooked into one of the membrane panel hem holes, the corresponding motor in the hoop segment 135 to which that hook is attached should be powered up slightly. This will pull the string attached to that hook just enough to keep it hooked into the membrane package hem, but not hard enough to pull the membrane package forward. Only when all eight of these hooks have been engaged and their strings tensioned will the worker holding the 24-snap-ring bar snap all of those rings open and then disengage all of those rings from the membrane package and lower that bar out of the way. Once that has been done, the power to the motors in the hoop segments can be raised and the hooks will then be pulled back into the channels 133 in the lower layer 131 of the wrapping machine. This outer edge of the lower layer 131 should be rounded on the side toward the upper layer 132 both at its entrance and exit orifices to enable the membrane package to easily slide over those edges. At the entrance end this guarantees that as the hook slides into the channel 133, the membrane package will easily slide up and into the space between the two layers of the wrapping machine.

A short distance below the wrapping machine when it is in its factory-mounted position on the bottom-most pipe section the diameter of the membrane package must expand abruptly from about 36" (0.91 m) to 91" (2.31 m) in order to clear the outsides of the vertical extension assemblies in their fully-closed up against the central spline positions. By pulling the segments of the hoop 135 apart the workers holding that hoop can make the membrane panel expand enough to fit around that much larger section of the bottom-most pipe section. Here the bevel in the lower layer 131 at the exit orifice will be essential, as the membrane package will, in this expanding, have to bend over that exit orifice edge on its way out to the larger diameter of the hoop as it is readied for pulling the membrane package down over the extension arms. (And the rounded upper corner of each extension arms, shown in FIG. 10a will likewise be vital to help the membrane package flow around those corners without catching on anything.)

FIG. 13f shows the hoop (unwrapped) in its minimal (fully closed) size; FIG. 13h shows it expanded to about 160% of its minimal size. Here you can see how the pantograph arrangement of the braces 136 keeps the segments spaced appropriately. (The spacing of the segments is intentionally not uniform. The eight chosen membrane panels where the hooks are installed are likewise not uniformly distributed among the 24 total panels.) In practice these braces as shown here are easily long enough to permit expanding the hoop to more than the necessary roughly 250% of its initial size.

Figure 13G:
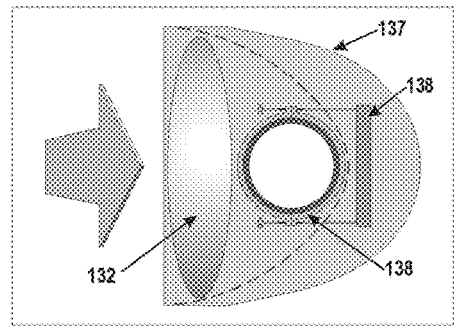
Figure 13H:
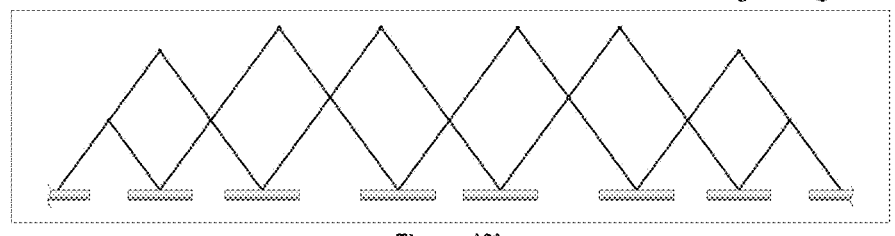

FIG. 13g shows a top view of the wrapping machine 130 (looking down along the central spline with the wrapping machine in its final form). The arrow shows where the membrane enters the wrapping machine. In the center you see in dark-grey the central spline pipe section 210 or 250. (The clamp arms actually close around a reduced diameter portion of that pipe section, so in this view—with the clamp in its closed position—the innermost portions of those clamp arms are not visible.)

The bottom layer 131 of the wrapping machine is not visible from this point of view. The top layer 132 is only visible where the wrapping machine (both layers) bulges up through the top plate 137. The dashed line shows how the wrapping machine's outer edges wrap around the central spline.

The metal top plate 137 is shown here as being rounded on the right side following a 91" diameter circle, and then widening out on the left side to where it is as wide for last few inches as the widest part of the wrapping machine 130. The advantage of this shape is that this metal plate 137 would then take any load as the bottom-most pipe section is loaded into the intermodal shipping container, thus preventing any bending of the wrapping machine during that step.

The clamp mechanism shown here consists of two clamp arms which are driven together or apart by the rotation of the screws extending from the control box at the right to the pillow blocks at the left, very much as was the case for the lower clamp in the iris and transfer box 370 in FIG. 12.

In this view you can see that the maximum cross-section dimensions of the bottom-most pipe section 210 with the wrapping machine 130 installed near the pipe section's upper end will be 91" (2.31 m) from left to right and 98.5" (2.50 m) from top to bottom. (This reference to top, bottom, left, and right refers both to what you see in FIG. 13g and what you'd see if you looked in the end of the intermodal shipping container once this "fully dressed" bottom-most pipe section is loaded into that container.) The extension arms and the bottom end package are also 91" in diameter. This bottom most pipe section with the wrapping machine installed will barely fit in a standard 45 foot (13.7 m) intermodal shipping container. The permanent seaming machine 140 only extends out a few inches to the side opposite the entrance orifice of the wrapping machine, but even that few inches may be too much. So most likely the seaming machine will not be installed on the wrapping machine at the factory. Instead, it will be installed once the bottom-most pipe section is installed on the service barge either just before or just after pulling the membrane package through the wrapping machine and down along the length of the bottom-most pipe section (covering the extension assemblies, but going not quite all the way to the bottom-end package).

Where the membrane package exits the wrapping machine the outer edges are spaced about one inch (25 mm) apart. Eventually, they will have to be pulled together a bit more in order to be engaged by the permanent seaming machine so they can be sealed to one another to created the closed tube that comprises the outer containment region. But at first, when the hoop 135 is used to pull the hem out of the bottom of the wrapping machine's exit orifice (and, because of those hooks, eight of the 24 membrane panel package cannot expand), the fact that the two edges of the membrane panel are spaced about an inch apart may actually be an advantage, as the entire permanent seaming machine 140 is just one inch (25 mm) thick in the direction tangential to the side of the central spline, so even if the permanent seaming machine is mounted on the wrapping machine when the membrane package is first pulled through the wrapping machine the membrane package's edges can freely pass on either side of the seaming machine until it is time to pull those edges together and begin seaming them.

Another possible use for this initial spacing of the two outer edges of the membrane package is as a place to insert one or more continuous sensing devices which could run the full length of the central spline. After the membrane package exits the wrapping machine and before it passes into the seaming machine, any such continuous sensing device (perhaps based on fiber optics technology) could be inserted between the open edges and thereby lodge itself against the side of the central spline inside the membrane package. This could first be done by attaching the sensor to the not-yet-seamed bottom portion of the membrane package while it is being pulled down over the vertical extension assemblies, or that portion of the sensor could be laid down manually on the central pipe section before the membrane package is pulled along this pipe section. Most conveniently that sensor could end just above the vertical extension assemblies, unless it were to be attached to the interior of the membrane package in which case it could extend down to the first fold at the bottom end of the cuffed portion.

Alternatively, such a sensor could be installed as a part of the membrane package at the factory. In that case, the sensor would be installed automatically as a part of installing the membrane package. (The sensor should, in any case, stop just shy of the first fold in the cuffed portion, as it would then avoid being sharply bent at that fold, and it would at that point be as far down the bottom-most pipe section once the membrane package is installed, as it reasonably could be.)

Having such a sensor, or sensors, installed along the central spline could enable the oil leak containment system operator to measure the water temperature, salinity, pressure, and hydrocarbon concentration at every depth from the ocean surface to the ocean floor.

If such a sensor is to be installed in parallel with (as opposed to as a part of) the membrane package, a reel holding the sensor fiber would have to be mounted either on the oil leak containment system's service barge adjacent to the membrane package spool so they could both be unreeled in parallel, or perhaps that reel could be attached to the back side of the top of the wrapping machine above the permanent seaming machine. (This latter option would only be attractive for relatively shallow wells, as otherwise that reel might well be too large and heavy to be easily supported on the wrapping machine.)

The details of how to terminate the upper end of this sensor may dictate just how it will be installed. This is especially true if the sensor could be damaged by being clamped where the membrane is closed off to define the top of the outer containment region. If that were the case, the sensor should be terminated just below that point with a terminal signal capture device that could interface to a wire cable (or via a wireless link) back to the oil leak containment system operator's console in a manner that wouldn't be affected by that clamping action at the upper end of the membrane.

The Permanent Seaming Machine

The seaming machine 140 consists of many individual parts. Conceptually there are two sections to this machine. One section (the upper section in FIG. 14d) part grabs the edges of the membrane package, aligns them, and then brings them into near contact with one another. As the membrane package exits this part it enters the second part (the lower part in FIG. 14d) where the two thickened edge pieces are squeezed together and bonded to one another.

(The upper part may also play a supporting role in that bonding—for at least some types of bonding, including in particular where an adhesive or solvent is to be used. In that case this section will be used to supply the solvent or adhesive materials to the facing surfaces of the thickened edges of the membrane package while they are passing through that first section.)

The construction of the seaming machine 140 in our exemplary implementation is shown in FIG. 14. There are five views shown here, many with a number of subtle details. They will be discussed in turn, below.

It is important to realize that the membrane package as it arrives at the seaming machine, has been wrapped around the central spline by the wrapping machine. The outside edges of the membrane package are at this point very nearly overlapping. If you look at FIG. 5g you can see that these two edges will end up with the thickened edge pieces facing one another. The purpose of the seaming machine is to pull these two thickened edge pieces close together and then press them firmly together and bond them, thus forming the seam that makes the membrane package into a tube.

There is, clearly, an inside to that tube and an outside. To do its job the seaming machine 140 must be held securely in place just below the bottom end of the wrapping machine 130 at the point directly opposite the entrance orifice of that machine. This is done by the use of a mechanical attachment (a bracket, or the like) connecting some part of the seaming machine that extends outside of that tube to a place near the exit from the bottom part of the wrapping machine. That point of attachment to the seaming machine must, of course, be outside of the tube into which the membrane package is being formed. However, it is also clear that this machine must also reach at least a short distance inside of the membrane package tube to do its job, as it must be able to press outward on the seam as well as inward during the seaming operation.

Figure 14A:
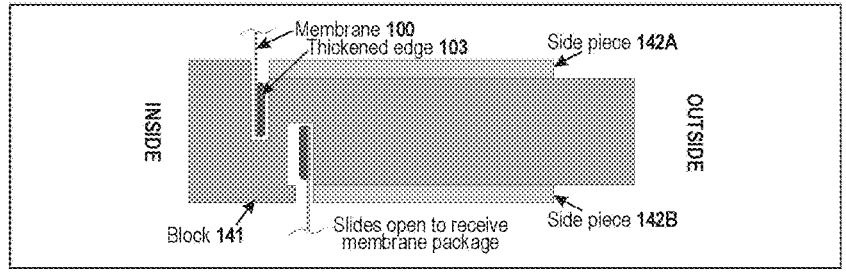
FIG. 14a through FIG. 14e include several detail views showing how the seaming machine is created and several ways in which, after it grabs the membrane package edges and brings them together, it can join them to form an oil- and gas-tight seam.

FIG. 14a shows a top view of the seaming machine (what you'd see looking down on the seaming machine from above, that is, from the direction that the membrane package enters the top of the seaming machine after coming down out of the bottom of the wrapping machine). Notice that there is a central block 141, (rendered here in 40% [medium] grey) that runs from end to end, and two side pieces (rendered here in 20% [light] grey). These side pieces, called 142A and 142B, are attached to the central part in such a fashion that they may only slide sideways a limited distance. They can only slide as far to the right as is shown here. They may be locked in either this "open" position or in the "closed" position shown in FIG. 14b where they are slid as far as they can go to the left. The locking mechanism (not shown in this figure) might be merely a pin fastened permanently to each of the side pieces that can be pushed through that side piece into a suitably located hole in the central block 141 to secure the piece in one of its extreme positions and pulled out to allow it to move to the other position.

In this figure you also see the two edges of the membrane package (in cross-section) with the membrane itself shown in 40% (medium) grey and the thickened edge pieces in 70% (darker) grey. It is clear that with the side panels in their "open" position the membrane package edges can be slipped into the seaming machine from the two sides, and that once they are in, by moving those slides to their "closed" position and locking them in that position, the thickened membrane package edges are trapped and will not be able subsequently to slip out of the sides of the seaming machine. The left and right ends of the seaming machine in these figures are labeled to show which end ends up inside the final membrane package tube and which ends up outside.

In the following description the side of the seaming machine where the membrane package that will end up having its thickened edge on the inside of the tube seam is referred to as the A side of the sealing machine (top in this figure), and the other side as the B side. The two side pieces are thus referred to as pieces 142A on the A side and 142B on the B side.

Figure 14B:
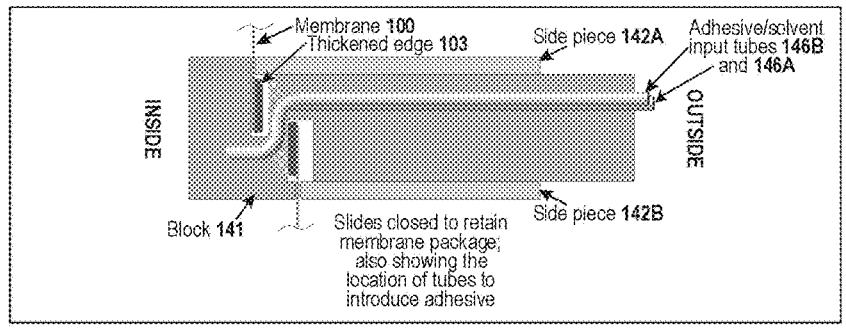

FIG. 14b shows that same top view but after the side pieces have been slide to the left as far as they can go. Also visible in FIG. 14b are two tubes 146A and 146B that run along the top of the block 141, in from the right-hand end of 141 and terminate near its left-hand end. These are tubes to carry adhesive or a solvent from an external supply. Each of them turns downward at its left end (as viewed here) and enters the block 141 leading into channels where the solvent or adhesive can, be directed onto the membrane panel edge it is intended to moisten or dissolve.

The tube labeled 146A is the lower of the two tubes (closer to the body 141) and the fluid it carries simply dives down into the block and then proceeds forward, with the channel carrying it changing shape, but not its cross-sectional area, as it comes up to the cavity in which the A-edge of the membrane package is traveling. That edge's thickened edge faces right in this figure, so it presents the face that is to be moistened and then later on bonded toward the tube carrying the fluid to it.

The tube labeled 146B travels above 146A and goes around two extra bends to get between the two membrane package edges before it turns down and connects to its channel in block 141. This is because the fluid it carries must moisten the thickened edge on the B-edge of the membrane package from the left.

If you look very closely, you'll see two regions under the left-hand ends of those tubes which are rendered here with a sort-of cross-hatching in FIG. 14b. These portions would not be visible from outside of the end of the block; instead they show where, inside that block, the final part of the two channels inside the block widen as they approach the cavities where the membrane package edges are traveling. Notice that the B-side adhesive's channel turns back from where it entered the block and then spreads out as it arrives at the channel carrying the B-side membrane package edge from the left, whereas the similar channel for the A-side approaches the membrane package edge it is to moisten from the right. The widening of these channels as they near their ends makes it possible for the seaming machine to moisten the entire width of each of the thickened edges as they pass down through the seaming machine.

Figure 14C:
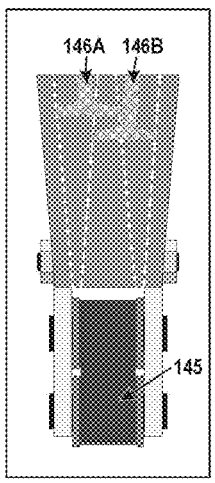

FIG. 14c shows an end view of the seaming machine looking at the end that extends into the inside of the membrane package tube (thus, as if looking out from the central spline). Here you can see that the central block 141 is tapered from top to bottom. At the top it is one inch (25.4 mm) thick; at the bottom it is only 0.75" (19 mm) thick. The side pieces are each 0.25" (6.3 mm) thick over their entire extent, except for a specially shaped portion that extends inward to secure them to the central block and permit them to move only inward and outward the desired amount, as will be shown in FIG. 14e.

Shown here in FIG. 14c by a pair of parallel white dashed lines (with very small dashes) is the width (in this view) of the cavity in the central block on the A side through which the thickened edge of the membrane package slides. The width of the space between those dashed lines is the same as the length of the notch in FIG. 14a where the A side of the membrane's thickened edge travels. Notice that this cavity slants to the right as the membrane travels downward. Similarly, another pair of white dashed lines (with longer dashes) shows the lateral extent of the corresponding cavity on the B side of block 141. It slants to the left as it descends. This arrangement insures that the membrane edges will be brought face to face as the membrane is pulled down through the seaming machine.

Immediately below the block 141 you see two wheels labeled 143 with a belt 145 running around them, and with their axles supported by a pair of vertical supports that are bolted to the central block 141. This is one half of the second functional section of the seaming machine.

Figure 14D:
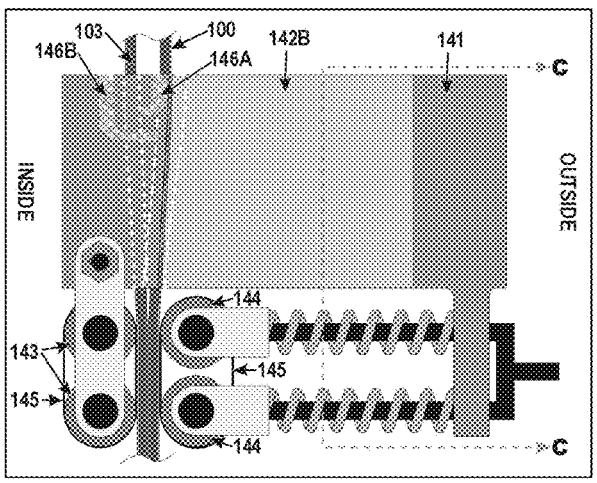

Finally, you see two cross-hatched portions (similar to those in FIG. 14*b*) near the top of the central block 141 in FIG. 14*c* (and also near the upper-left corner of FIG. 14*d*). These represent something you would not actually be able to see just by looking at the outside of the seaming machine from either of those two vantage points. Instead, they show how the buried channels that carry adhesive or a solvent from an external supply to the mating surfaces of the two thickened membrane package edges would look if the block 141 were transparent. (The tubes that attach to the top of the block are not shown in this figure.) Notice that as these channels are spreading wider near their ends they also become thinner in the vertical dimension, so that their area stays approximately constant throughout.

FIG. 14*d* shows a side view of the seaming machine. The only "cheats" in this figure are the shorter- and longer-dashed white lines indicating the paths of the internal cavities through which the membrane edges travel as they travel from top to bottom, plus the two very light grey regions 146A and 146B near the top of the machine. As in FIG. 14*c* these cross-hatched regions are not something one could actually see from outside the machine unless the block 141 were transparent. Instead, they show a view from this perspective of where the buried channels go to convey adhesive or solvent to the mating surfaces of the thickened edges of the membrane package, and they reveal how those channels narrow in the vertical direction just as they are widening in the horizontal direction.

The narrow 40% (medium) grey lines that curve from the top to the bottom of this figure are the two edges of the membrane 100, and the adjacent 70% (dark) grey regions are the thickened edges of the membrane. (Both edges are visible above and below the block; only the B membrane edge (and not the thickened edge of that membrane) is visible where it goes through the block, since the membrane B edge extends into the block from this side through the opening between the B-side side panel 142B in its closed position and the block 141, while the A-side membrane and its thickened edge are hidden by the block.

The bulk of the block are 141 is rendered here in 40% (medium) grey. The lighter region (here 20% grey) is the side piece 142B, shown here in its "closed" position. Just as in FIG. 14*c*, the two pairs of white dashed lines indicate the positions of the (invisible) interior channels that carry the two sides of the membrane as they travel downward through the block. Notice that these two cavities meet a short distance above the bottom of the block 141. Anywhere below this point the two thickened edges might touch one another, although they may not touch just yet. Whether they touch here or not, they will do so very soon as they continue to travel downward after they enter the second section of the seaming machine 140.

Below the block 141 you see two pairs of wheels. The left-hand set (called the fixed wheels and given the part number 143) are bolted to block 141 and they are what you saw in FIG. 14*c*. In this implementation, these wheels are 0.5" (12.7 mm) outside diameter and 0.5" (12.7 mm) thick along their axes, with a region 0.380" (9.65 mm) wide in the view in FIG. 14*c* where the outside diameter is just slightly reduced. There is a belt 145 that runs around this pair of wheels that fits into this reduced OD portion and is stretched tightly.

The right-hand set of wheels are similarly surrounded by a belt 145. This set of belts, wheels, and springs is collectively referred to as the spring-loaded set of wheels and they are given the part number 144. Near the right end of block 141 in this view you see a portion where it has a downward extension that surrounds the shafts from the supports for wheels 144 and holds the right-hand end of the springs that provide the pressure to press these wheels against the two sandwiched membrane package edges against one another and against the fixed wheels 143. This will suffice to form the seam that makes the membrane package into a tube if the package edges are to be cold-welded using solvent softening followed by pressure, or to be glued together using a two-component adhesive that will set up quickly once the two surfaces that have been wetted with those two components are pressed against one another. If, instead, the seam is to be made by heat or ultrasonic welding then the tubes and channels for the adhesive or solvent would be unnecessary and could be omitted, and the wheels might also be modified to provide the necessary heat or ultrasonic energy. Similarly, if two mating Velcro™-like hook and loop fastener surfaces are used for the thickened edges 103 of the membrane package, or two mating parts of a zipper, then also there would be no need for the solvent or adhesive insertion tubes and channels.

In any case, but especially if a solvent or adhesive seaming strategy is used, one of the fixed wheels 143 should have a shaft-angle encoder on it. This would make it possible to know exactly how rapidly the membrane package is moving through the seaming machine. That would, in turn, allow adjusting the flow of solvent or adhesive so as to provide only the desired amount to flow onto the mating surfaces of the thickened edges of the membrane package. Further, this information could be of substantial use to the oil leak containment system operator, which is why in our exemplary implementation such an encoder and the associated electronics is included—although it is not shown in this figure.

If the solvent or one or both components of the adhesive were to have a very low viscosity and a low volatility, it might be useful to terminate the channel that conveys it to the cavity where the membrane package edge passes in a block of a material that is wet by that solvent or adhesive component and that has many very small pores passing through it. In this situation the fluid would be pulled into and through the block by the wetting action (surface tension). It also would flow out over the far side of that block. As the membrane package edge passes this point it will rub against that block and get a consistent amount of the fluid deposited on it or absorbed into it, depending on its properties. And if there is no membrane package edge in that cavity, the fluid would not simply flow out and be wasted—or, worse, get into some place it should never be. In order to insure that the membrane package edge would, in fact, wipe across this block it might be necessary to include a leaf spring on the opposite surface of the cavity from the block to push the membrane package's thickened edge firmly against the block. That detail is not shown in this figure, but a suitable design should be obvious.

The right hand end of the support rods for the spring-loaded pressure wheels 144 are shown as being connected together and to a rod-like handle by which the wheels can be pulled back to the right in this figure. If also there is a locking mechanism that will hold it in that pulled-back position (again, a simple pin through the block 141 into those support rods could do the trick), then they can be kept out of the way while the membrane package is first being threaded into the seaming machine. Then, after the side panels 142A and 142B have been moved to their closed position, the spring-loaded wheels 144 could be released to compress the seam.

In FIG. 14 you see two sets of wheels connected by belts, rather than a single pair of opposing wheels. This arrangement of two wheel pairs and belts between them will enable keeping a substantial pressure on the seam for some period of time while the membrane package is descending through the seaming machine. If the membrane speed is too high and the cure time for the adhesive or cold-weld operation is too long, this might not suffice. Clearly, in that case, one could add as many more wheel pairs as desired to overcome that problem. Conversely, for zipper or Velcro™-like closures, one pair of wheels might suffice.

Figure 14E:
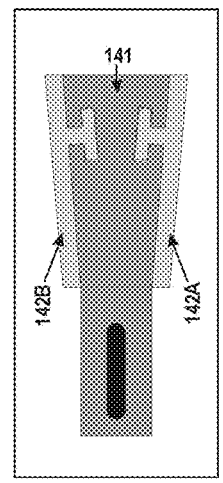

The light-grey dashed line marked C-C with arrow heads pointing toward the right side of FIG. 14*d* indicates where a cross-section slice would be taken and from whence it would be viewed to show what is seen in FIG. 14*e*. Here you see a cross-section of the block 141 and the two side pieces 142A and 142B, as viewed from the right side of the machine. Notice that each of these side pieces has a wing-like portion extending inward into the block that fits snugly into a mating slot in that block. This design serves to lock the side pieces so they can only move forward and back in the manner and to the extent shown in FIGS. 14*a* and 14*b*. These wing-like portions traveling in the mating channels in the block are similar to the hook pieces 134 that travel in the triangular cavities 133 in the lower layer 131 of the wrapping machine, shown in FIG. 13.

If desired, it would be possible to have these cavities for the side piece wings extend all the way to the outside end of block 141. This would make it very easy to install the side pieces, after which a spring could be dropped in behind each side piece, and then a C-shaped clamp could have its legs inserted into those cavities to press the springs against the wings of the side pieces, with this C-shaped clamp being screwed onto the outside end of the block 141. This clamp could, in fact, be a part of the support whose other end would fasten to the bottom part of the wrapping machine to support this permanent seaming machine. (In FIG. 13*e* a different support design is indicated. If that were used, a separate C-shaped clamp such as that just mentioned here would attach to the end of block 141 independently of the bracket or other support apparatus holding the block to the wrapping machine.)

The foregoing shows one way one could build this seaming machine, describes how it could be supported and used. What about when the oil leak containment system's job is done, or if perhaps less membrane is needed when it is moved from one drill site to another? In that case it might be desirable to pull the membrane tube upward, opening it back into a membrane package as it goes. This could be accomplished simply be pulling it up through this seaming machine, provided there is one additional item added to its construction. Where the A-side and B-side cavities meet there is a sharp edge (shown in FIG. 14*d* where the two pairs of white dashed lines meet). If a metal bar is inserted in this location it could serve to open either a zipper or a Velcro™-like closure. If that bar had a sharp edge, and especially if it had sharp teeth or a very abrasive edge, and even better, if it was able to be oscillated back and forth as the membrane tube was lifted up, it could easily open any welded or glued seam.

As is discussed in more detail below, once the membrane package is installed on the bottom-most pipe section, and after the bottom-most pipe section has been placed in the ocean below the drilling platform it will be raised up and clamped in the iris and transfer box. At that point the wrapping machine and its attached seaming machine will be disconnected from that bottom-most pipe section and instead attached to the iris and transfer box. (Or, if the iris and transfer box is located too far above the ocean's surface, another pipe section 250 will be connected to the bottom-most pipe section 210 and that pipe section 250 will be clamped in the iris and transfer box's lower clamp. If this is done, then the wrapping machine and permanent seaming machine will have to be disconnected from the bottom-most pipe section and in the process wrapping and seaming the membrane package around this pipe section 250. Then the wrapping machine can be connected to the iris and transfer box.)

Thereafter, as the next section of pipe above this section is attached to it, the string of pipes (which will eventually become the central spline 200, growing in length pipe section by pipe section) will be slowly lowered. As it is lowered, more membrane 100 will be pulled off of the storage reel, through the wrapping machine 130 and the seaming machine 140 in turn and in this way the central spline will end up surrounded by a seamed membrane tube enclosing all of its pipe sections as they descend.

Later on, once the oil leak containment system apparatus has served its purpose and when it is to be removed, the seaming machine 140 and wrapping machine 130 may be used to help put the membrane back on the reel in nearly its original form. If the membrane has been expanded by escaping oil or gas, then it may so wrinkled that it will be infeasible to route it through those devices, and some other method of gathering it into a manageable shape will have to be employed. While the resulting used membrane might not be in suitable shape for immediate reuse on another drill site, the membrane material itself could be recycled to save both money and material. Still, no matter how damaged or wrinkled the membrane may be, the seaming machine 140 will likely be the best device to be used to open the seam as the membrane is pulled off the rising rigid containment pipe string (the central spline 200).

The Portable Seaming Machine

In addition to this permanently mounted seaming machine 140, there will need to be an additional portable (hand-held) seaming machine. This is exactly like the permanent machine except that instead of being mounted below the wrapping machine 130, it is mounted on a special handle that can be carried to wherever it is needed. And it is used in an orientation relative to the membrane package that is exactly upside down from that of the permanent seaming machine.

This device is used to seam the portion of the membrane package that extends from just below the permanent seaming machine in its initial location on the bottom-most pipe section down all the way to the membrane package hem. During the initial positioning of the membrane package around the bottom-most pipe section it is drawn down through the wrapping machine and past the seaming machine to nearly the bottom of that bottom-most pipe section. The cuffed portion of the membrane package will, at that point, surround a portion of the vertical extension assemblies. After pulling the membrane package to that point the edges of the membrane package can be threaded through both the permanent and the portable seaming machines.

The first step will be to pull the edges of the membrane package together and then thread them through the portable seaming machine at a location just a small distance below the wrapping machine. This portable seaming machine is then used to seam downward a ways toward the bottom end of the membrane package. Once it has gone a little ways that action could be stopped briefly, while the permanent seaming machine is detached from the wrapping machine and moved down to where the portable seaming machine started. At that point the edges can be threaded into the permanent seaming machine which will be aimed up along the membrane package, opposite to how the portable seaming machine is aimed. The permanent seaming machine can be used to seam its way up until it can be connected to the wrapping machine once more. This method will allow making the seam continuous along the membrane package with no gap between what is done by the two different seaming machines.

Then the portable seaming machine can resume moving down along the membrane package, seaming it as it goes. Once it enters the cuffed portion it will be traveling within the cuffs around the innermost layer of membrane package. When it reaches the bottom of that cuff it must navigate around the bend and return up with the inside end of this portable seaming machine directed away from the pipe section. Once it get to the top of the cuff (the end closest to the wrapping machine), the portable seaming machine must again navigate around the bend and back down into the next cuff out from the pipe section. And this process will continue until it finally travels down the very outside of the entire cuffed portion and on down to the bottom hem of the membrane package.

To accomplish this, given that the cuffs are about ten feet (3 m) deep, it will be necessary to have the portable seaming machine mounted on a rather long handle with a mechanism adapted to letting the operator holding the machine by its handle turn the seaming machine's direction from pointing in toward the pipe section to pointing straight ahead (toward the bottom of the bottom-most pipe section), then away from the pipe section and back again, as necessary. This requires providing a way to rotate the portable seaming machine relative to its handle through a 180 degree range. There are many simple mechanical arrangements that might be used to do this, as should be obvious to one practiced in these arts.

Once all of this seaming has been done below the wrapping machine, the portable seaming machine can be set aside for use on another installation.

The Oil Leak Containment System Service Barge

In our exemplary implementation, all of the pieces of the oil leak containment system are prepared at the factory, then they are shipped in intermodal shipping containers to a port where there is a purpose-built service barge that becomes one more important part of the overall oil leak containment system. In this approach, the many pieces that will make up the installation are all assembled on this barge for shipment to the job site. Some of the most critical assembly steps to combine different pieces of the system into a form ready for installation will be done on this barge, at the port, at the job site, or on the way from the port to the job site.

At the port, these containers could either simply be loaded onto the service barge, or they might be unloaded there with their contents being assembled on the barge. One advantage to doing the unpacking and arranging of all these parts prior to leaving port is that then there would be no need to store those shipping containers on the barge. Further, it would permit the crew on the barge to do much of the pre-assembly work while the barge in one its way to the job site. This is the strategy embodied in the exemplary implementation described and shown here.

Figure 15A:
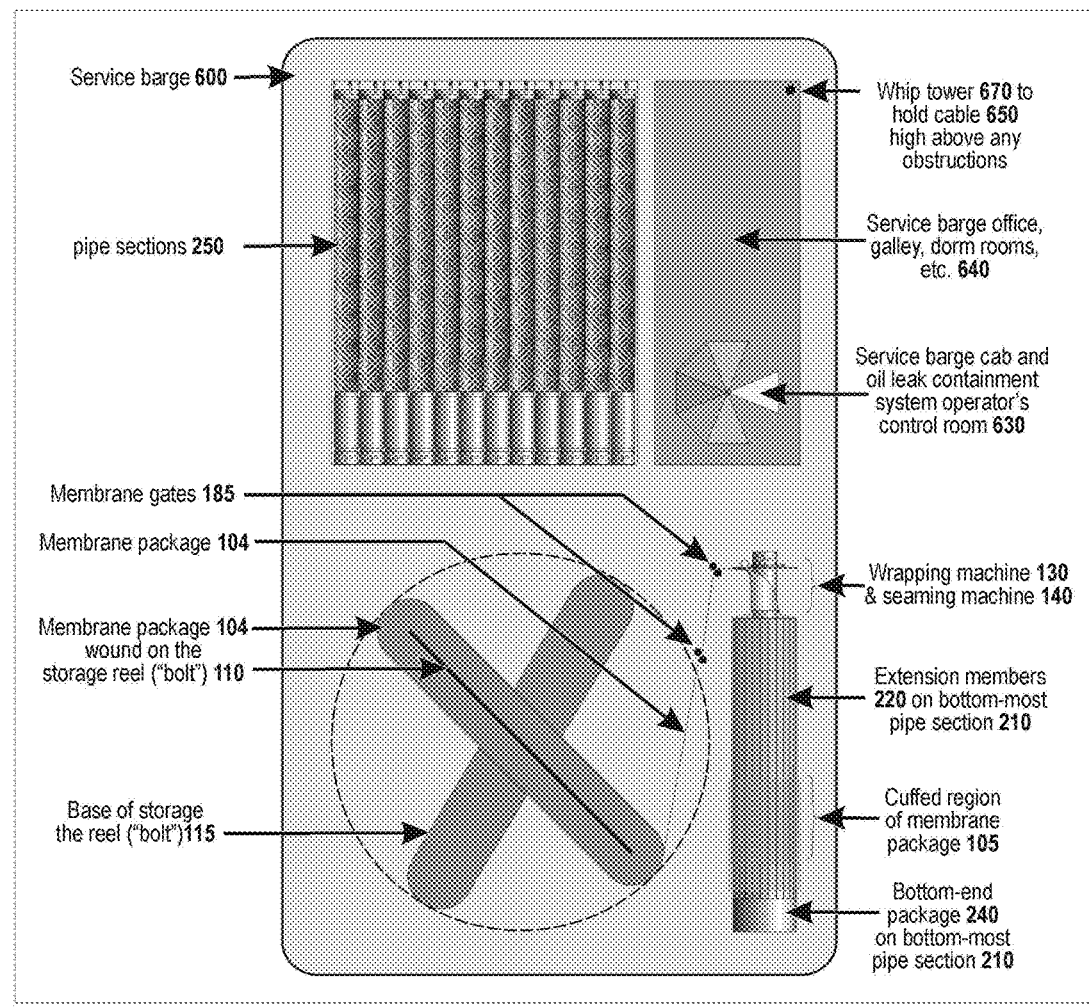
FIG. 15a shows an aerial view of one exemplary implementation of an oil leak containment system service barge that could be used both during installation of the system and, optionally, throughout the life of this installation.
Figure 15B:
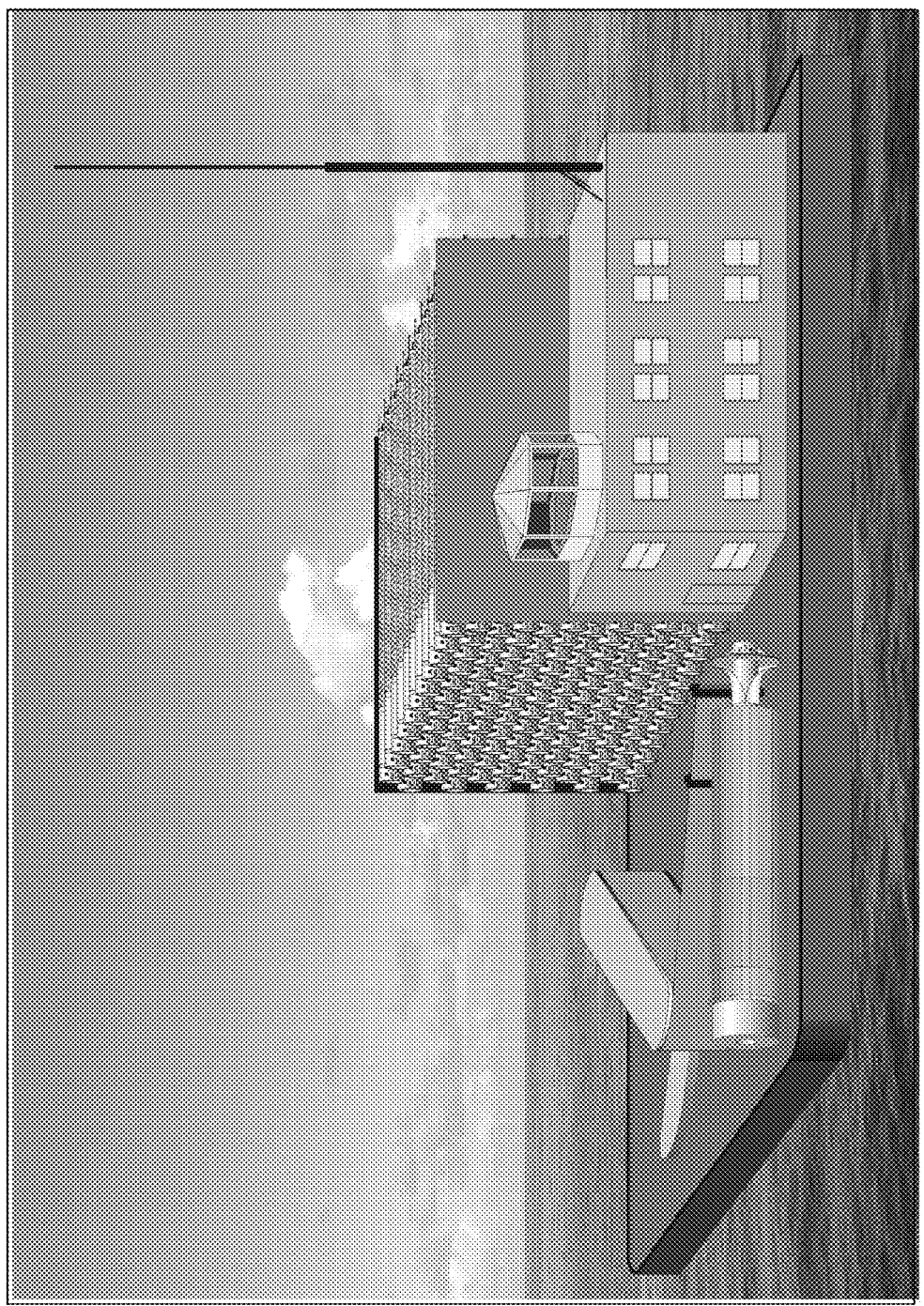
FIG. 15b shows a perspective view of that barge, with only the key elements on it being rendered.

FIG. 15a and FIG. 15b shows two views of this service barge. The first is an aerial view of the barge showing what functions are placed where. The second is a perspective view from the MODU of the special oil leak containment system service barge, showing only the most critical components of the system. In FIG. 15b a semi-realistic shading scheme has been used. The background is an image of the ocean and sky. The deck of the service barge is shown in a dark grey to provide contrast for the things shown on top of it. The sides of that barge are also shown in dark grey. The small building on the right, shown in light-grey, houses a dormitory, mess hall, offices, and other such things. It is topped by an octagonal control room from which the oil leak containment system's operator can manage the various tasks to be performed during the installation of the oil leak containment system as well as other operations that will be needed during the life of the system. The pipe section storage is shown at the rear. The membrane is shown in 40% grey, as was done is many of the other figures, with the bolt/reel's end plates and its base plate shown in a lighter grey. In both FIG. 15a and FIG. 15b the membrane, where it passes over the bottom-most pipe section, is shown as being transparent, to make more clear its extent and where it is cuffed. The membrane gates are shown in black.

One optional feature not shown in either of these figures, but which might well be deemed important by the users of the oil leak containment system, is a weatherproof cover that could keep at least the portion of the service barge where the membrane package and the bottom-most pipe section (and all the pieces that go with these parts) are located. This cover would protect these critical parts during transit, and might make it more practical to do the necessary assembly work while the barge is in transit to the job site.

The Oil Leak Containment System Control Station

The final critical component of the overall oil leak containment system that hasn't yet been mentioned is a control station for the oil leak containment system where a system operator can see information from the many sensors that are included in this system and issue appropriate commands to control the many active components (e.g., motors, lights, cameras, pumps, valves, to name just a few).

In order to let the system operator receive this information and issue these control commands, there must be two very long cables to connect the control station to the central spline: one cable 380 will go directly from that control station under the drilling platform to the iris and transfer box, and the other cable 650 will go up to the top of a very tall "whip" antenna and then come back down and be attached to the special extraction tool. The whip antenna must be tall enough and the cable long enough to reach up and over the drilling platform as the crane lifts pipe sections (to which this cable will be attached) from the service barge and then lowers them through the turntable into the iris and transfer box.

Since the service barge may travel under bridges on its way into or out of ports, the whip antenna should either be able to telescope down to a very short minimum height, or it should be hinged in a manner that allows it to simply be lowered across the length of the barge. Naturally, it should have sufficient supports to hold it upright during the installation of the oil leak containment system.

FIGS. 15a and 15b show how, in our exemplary implementation, all these parts are loaded onto the oil leak containment system's service barge. FIG. 15a shows a top view of the service barge 600. In this implementation that barge is 110 feet (33.5 m) long and 65 feet (19.8 m) wide. In this figure you can see a grey bar-like shape 115 near the bottom left that is the base for the bolt/reel that is permanently attached to that bolt/reel when it is prepared for shipment to the job site. The similar medium-grey shape 104 indicates the location of the bolt/reel at some instant in its rotation. The black line 110 is the core of that bolt/reel. Not shown here are the top and bottom end flanges of that reel.

The bottom-most pipe section 210 must be removed from its shipping container and placed on a special, purpose-built rack that will support it parallel to the edge of the service barge next to the MODU and near the bolt/reel containing the membrane package. This rack (not shown in FIG. 15) should support this pipe section only from its ends so as to leave all of the length exposed so the membrane package can be pulled over it and then attached to carabineers connected to the hem chain that is pre-installed around the bottom end of the vertical extension assemblies. It should hold the pipe section high enough that there at least a 30" (0.76 m) space below the lowest part of the vertical extension assemblies to the service barge deck, plus there should be scaffold-like shelves on either side of the pipe section to let workers have easy access to all sides of it.

If the pipe section 210 is not strong enough to endure having its weight supported only from the ends without excessive strain, it can have a stiffening member installed within it at the factory. This stiffening member could extend out of the bottom end and there be used for supporting the pipe section. At the upper end this stiffening member should stop about 30" (0.76 m) below the top end of the pipe section, to allow room for inserting the special extraction tool. And that tool should be modified appropriately to allow attaching it to this stiffening member once it is installed. (For example, one might add a U-shaped bracket inside the basket 410 running down the sides and across the bottom, and then, through holes in the bottom portion of this bracket, it could be bolted to the end of the stiffening member. The upper end of the U-shaped bracket could similarly be bolted to the support ring that surrounds the upper part of the basket.)

If the mechanical stresses in the pipe section would still be too much because of the absence of the stiffening member over that top portion, the special extraction tool could be installed immediately as this pipe section 210 is removed from its shipping container. (Or, if the shipping container had a removable end panel, the tool could be installed before the pipe section was removed thus avoiding any time when the pipe section was horizontal and without a stiffening member extending all the way along its length, as the special extraction tool, with its U-bracket to connect to the main stiffening member would serve that stiffening function over its 30" (0.75 m) length inside the pipe section.)

The container that holds the membrane package (the bolt/reel) may be handled a bit differently than the others, in that if its top and side walls can be removed from its base, it can sit on its base on the service barge. Alternatively, it could be lifted out of the shipping container if that container's top could be removed, and then it could be placed with its attached base on the service barge's deck.

Preparing the Apparatus at the Job Site

Since the membrane package's bolt/reel contains a swivel in its base the membrane package can be unreeled from it as it sits there once the service barge is at the job site. This implies that the membrane package will come off the reel as a vertically-oriented strip. That will be the correct orientation for the initial connection of the membrane package to the bottom-most pipe section, which will be initially lying on its side in the custom rack made for it which will positioned on the service barge's deck near the edge of the barge toward the MODU.

The red line coming off the end of the bolt/reel is the membrane package 104. The way it comes off shows that the material has been wound onto that bolt/reel in a manner that requires the reel to rotate counter-clockwise (viewed from above) as the material is pulled off of it. The dashed circle indicates the region through which the bolt/reel rotates—obviously a region on the service barge's deck that must not be used for any other purpose.

Connecting the Membrane Package to the Bottom-Most Pipe Section

The membrane package 104 then goes through the two membrane gates 185 before going into the wrapping machine 130 that was installed onto the bottom-most pipe section 210 at the factory. Although this plan view of the barge doesn't show that the membrane gates 185 are tilted, in fact they should be tilted (both in the same direction and by the same amount) with their top ends leaning away from the bolt/reel, and the second membrane gate should also be lifted the same distance above the deck as the pipe section 210. The reason for doing this is let the membrane package, which is initially traveling horizontally just about 6.5" (0.165 m) above the deck, to angle upward between the two gates, and then angle back to horizontal (with the membrane package itself being oriented vertically just as it was when it came off of the bolt/reel) at just the right height to go into the entrance port of the wrapping machine 130. The angle through which these membrane gates need to be tipped will be determined by their spacing and the amount by which the membrane package is to rise as it passes through those two gates.

In order to keep the membrane package from drooping, it will be essential to make sure there is always some tension on the membrane package. That can be done by having the motor in the bolt/reel base torque the reel backwards gently against the pulling of the membrane package off of the reel. Not too much tension, but just enough to keep the package from having any slack that might cause it to droop.

When the membrane package was wound onto the bolt/reel, it had a special tool with 24 snap-ring hooks connected through all of the 24 membrane panel hem holes and all connected to a stiff rod that is just under 8 feet long, and this tool was placed in a corner of the shipping container that carried the bolt/reel. This tool will be useful now as a handle to pull the hem end of the membrane package off of the bolt/reel and through the membrane gates 185. (Naturally, these gates must be able to be opened enough to pass this pipe plus membrane package through, and then closed once more to keep the membrane package from wrinkling whenever the tension on it is released).

Once the membrane package is brought to the entrance port of the wrapping machine a different method will be used to pull it further. As was described above (in the section on the wrapping machine), at the wrapping machine's entrance there will be eight special hooks 134 hanging out of the entrance orifice that are connected back through special channels in the bottom layer of the wrapping machine to a hoop 135 surrounding the exit orifice of that wrapping machine. Each of these hooks will be hooked through the hem hole of a particular one of the membrane panel packages (the $1^{st}$, $4^{th}$, $7^{th}$, $11^{th}$, $14^{th}$, $18^{th}$, $21^{st}$, and $24^{th}$). These hooks will then be pulled through the wrapping machine, carrying the membrane package with them.

After the membrane package is pulled all the way through the wrapping machine (by the motors in the hoop 135 reeling in the strings connected to the eight hooks that engage eight of the membrane panel packages), the hoop can be used to pull more of the membrane package through the wrapping machine. Very soon, though, the hoop must be expanded enough to clear the vertical extension assemblies that surround most of the length of the bottom-most pipe section. Once that hoop is sufficiently expanded, it can be used to pull the membrane package down over the entire length of the vertical extension assemblies.

At that point the hooks 134 attached to the hoop 135 can be disengaged from the membrane panel package, and the hoop with its hooks can be stored for return to the factory where it can be used on another wrapping machine for a different oil leak containment system.

Now the workers can attach the membrane package to the hem chain that was installed on the bottom-most pipe section at the factory. As was described above, this chain has 24 sections, each with 47 carabineers attached to links in that section, and with short side chains attached between each of the sections going to links that are attached near the bottom ends of the cables that run down the outside of each of the 24 vertical extension assemblies.

To do this, the workers will have to carefully expand all of the membrane panel packages that make up the overall membrane package just enough to get access to all of the 24×47 membrane hem holes. They will then be able to clip one carabineer into each of these 1,128 holes. As soon as they have done that they must remove the tape that was put there at the factory to hold that hem chain in place.

FIG. 16 shows a perspective view of the service barge showing most of the key items it contains. In the right rear is a large stack (138 in this figure) of pipe sections 250, ready for installation to create a very long central spline (up to 6,162 feet [1,878m] or $\frac{7}{6}^{th}$ of a mile). In front of it on the right is a two-story building containing offices, kitchen facilities, a dormitory, etc. On top of that building is an octagonal room for the oil leak containment system console where the system operator will be able to see most of the MODU and the portion of the oil leak containment system that is above water and underneath the MODU. Looking in another direction the operator can see the bolt/reel and the bottom-most pipe section 210 during its preparation and then see the pipe section 210 as it is placed in the water and then moved under the MODU. The operator will also be able to monitor the membrane package as it is pulled off of the bolt/reel during the complete installation of the central spline.

Once the membrane package has been connected to all of the carabineers fastened to the hem chain and through that to the vertical extension assemblies, there is only two more tasks to do before this bottom-most pipe section 210 is ready to be placed in the ocean.

The first of these tasks is the seaming of the membrane package from just below the wrapping machine to the hem. This is done using the portable seaming machine in the manner described in the section on the portable seaming machine, above.

The last of these tasks is the placing of a temporary buoyancy collar around that pipe section. This collar will fit between the top plate that is attached to the wrapping machine and that is, at the factory, clamped onto the reduced diameter portion of the bottom-most pipe section and the top of the 24 vertical extension assemblies that are, at this point still tightly pulled up against the pipe section. So, in the exemplary implementation described here, that collar will have an outer diameter of 91" (2.31 m), an inner diameter of about 37" (0.94 m), and a length of 70" (1.78 m). These dimensions imply a volume of 6.22 m³. This implies a buoyancy when it is fully immersed in sea water of about 6,400 kg.

As it turns out, this is more than sufficient to hold up the bottom-most pipe section when it is first lowered into the seawater, provided the vertical extension assemblies have an appropriate amount of air trapped in them so their load is supported by those air bubbles. This can be assured by the process described next for moving the bottom-most pipe section from the service barge into the ocean next to it.

If this amount of buoyancy were deemed insufficient, a simple modification of the design would be feasible. In this modified design, and remembering that the bottom-most pipe section is supported with a 30" (0.76 m) clearance between it and the barge deck, the outer diameter could be expanded up to 150" (3.81 m). This would necessitate making the top surface of the collar stiff enough to transfer load from the top plate attached to the wrapping machine and bottom-most pipe section to the outer parts of the collar. If that is done, the total collar buoyancy could be raised up to something more than 31,000 kg.

This floatation collar could be an inflatable, or (preferably) it could be made from closed-pore foam. The former choice would allow for a very small package before it is installed. The latter would insure that it would impossible for the collar to lose its buoyancy through a leak that might spring in an inflatable collar. Whichever way it is made, it should be formed as either a C-shape or two semi-cylindrical shapes that can be placed around the bottom-most pipe section after the membrane package is fully installed. Then the collar should have one or more strap(s) cinched around it to keep it in place.

Moving the Bottom-Most Pipe Section into Place Under the MODU

Now that the pipe section is ready to be placed in the water, the special extraction tool must be brought over and connected into the upper end of this pipe section—if that hasn't been done at some earlier time. This is done by having the crane operator on the MODU (or a separate crane on the service barge) reach over to where the special extraction tool is kept on the service barge, pick it up, and then carry it over to where the bottom-most pipe section sits on its support rack. Workers can then tip the special extraction tool and insert it into the top end of the pipe section. Once it is in the proper orientation and inserted fully, the three locking arms can be actuated to lock it in place.

If there is a stiffening member inside the pipe section, that member must next be attached to the bottom of the special extraction tool. Also, when the special extraction tool is brought over to the bottom-most pipe section it will bring with it a cable 650 to the oil leak containment system's operator's console. Once this is connected to the pipe section 210 the system operator will have control over all the functionality embedded in that pipe section and the various devices attached to it. (If the presence of the special extraction tool was deemed necessary or desirable throughout the work on the pipe section 210 as long as it was horizontal—for example, to give added stiffness to the pipe section 210—these steps could be done before any of the installation of the membrane package.)

A good next step is for the system operator to check that all of the functional parts are, in fact, responsive to commands and all of the sensors are reporting what they should. Indeed, if these tests show up any problems, all work must be suspended until these problems are diagnosed and any faulty parts or fixed. It would be disastrous to put this key component of the oil leak containment system into the water unless all of its working parts were ready to work and could report their functions correctly.

The rack that holds this bottom-most pipe section and the second membrane gate (the last one that the membrane package goes through on its way from the bolt/reel to this pipe section) must include a feature that will now permit it to slide both that membrane gate and the pipe section outward far enough that the pipe section is cantilevered well out beyond the edge of the service barge, while the membrane gate is held somewhere near the edge of the service barge. And that membrane gate must be attached temporarily to the top plate attached to the wrapping machine. This attachment should force the membrane gate to remain parallel to the top plate, yet permit the membrane gate to move above or below the plane of the top plate. And the support for the membrane gate must at this time hold it near to the edge of the service barge, permit it to rotate around a horizontal axis (to keep itself at right angles to the bottom-most pipe section as that pipe section turns from its present horizontal orientation to the vertical orientation it must have before it can become the beginning section of the oil leak containment system's central spline). Finally, the support for this membrane gate must enable it, once it has turned to a horizontal position, to rotate around a vertical axis passing through the center of that gate. This rotation may be needed as the bottom-most pipe section is moved away from the service barge and eventually to a location directly below the drilling platform's turntable, as in order to keep the membrane package from sagging on either side, this membrane gate must remain parallel to the entrance orifice of the wrapping machine at all times.

Once the pipe section and membrane gate are in position, the rack's support for the bottom end of the pipe section can be removed. At that point the pipe section will spontaneously turn 90 degrees, swinging its very heavy bottom end down into the water. In the process it will trap some air in the vertical extension assemblies. And, most likely, the top end will rise up off of its support, leaving the bottom-most pipe section floating in the ocean, held up by its buoyancy collar.

It will also still be held by the special extraction tool which is, in turn, being held by the crane. So there is no way the pipe section could sink or wander off too far at this time.

As the pipe section turns by 90 degrees, the membrane gate that guides the membrane package into the wrapping machine must also be rotated 90 degrees in the same direction around the same axis so as not to let the membrane package twist where it travels between that membrane gate and the wrapping machine. Making sure this happens is the job of the temporary mechanical linkage between this membrane gate and the top plate of the wrapping machine. This will put that membrane gate parallel to the service barge's deck in a location very near the edge of the barge toward the MODU. It will, at this time, be secured in that location where it will remain for rest of the oil leak containment system's installation. Once that has been done, the temporary connection between the membrane gate and the wrapping machine should be removed. Only after that is done can the bottom-most pipe section be moved away from the service barge. There will now, of course, be a quarter-turn twist in the membrane package between the two membrane gates, but that is exactly as it should be. All of the rest of the rack that was supporting the pipe section and the membrane gate can now be disassembled and removed.

Ideally, the service barge will have been tied up beside the MODU in a location such that a line at right angles to the side of the service barge through the middle of this last membrane gate will run directly underneath the center of the drilling platform's turntable. If that cannot be arranged, then the membrane gate must turn so such a line drawn a right angles to the gate will pass through the center point under the turntable, as that is where the bottom-most pipe section must be placed. If the service barge was in that ideal location, then the iris and transfer box can be oriented to its key is on the far side of the iris and transfer box from the service barge. Otherwise the iris and transfer box must be turned so its key is opposite the center of this membrane gate.

Because the cable 650 from the system operator's console to the special extraction tool has been connected to the pipe section 210 as soon as the special extraction tool was connected to that pipe section, the system operator can, at this time, see just how much air was trapped in each of the vertical extension assemblies, and by operating the valves and pumps on the pipe section and its extension arms appropriately, air can be moved into or out of each of the vertical extension assemblies (moving that air either from or to the bottom end pressure vessel) until they are all essentially neutrally buoyant, or perhaps slightly more buoyant than that to help support the horizontal extension assemblies (which are, at this time, still held up closely along the side of the pipe section 210 parallel to the vertical extension assemblies). Once this has been done, the only load that the buoyancy collar must support is the weight of the pipe section itself and the bottom end package (less the buoyancy of that bottom end's pressure vessel). This suggests that the pipe section will float in the water with much, or perhaps even most, of the buoyancy collar sticking out above the ocean surface.

This is now the time to remove any bands that might be holding the vertical extension assemblies up against the pipe section. (Remember, there might have been a need for some such band(s) while the pipe section was horizontal, given the large weight in air of all of those extension assemblies and the limited strength of the horizontal extension assemblies that connected the vertical extension assemblies to the bottom-most pipe section.) If this retaining function was done using a ring of pegs coming up out of the bottom end section and perhaps also another ring of pegs hooked into loops attached to the top of these extension assemblies, then releasing those restraints could be deferred until just before those extension assemblies are to be deployed after the bottom-most pipe section reaches its final location just above the intended well site. That releasing of the extension assemblies will be done by the system operator sending an appropriate signal. If, however, the vertical extension assemblies were bound by a manually installed band which would need to be removed manually, this should be done as soon as the pipe section has been turned to a vertical orientation. Any such band should have included a latch that, in its closed position cinches the band around the vertical extension assemblies tightly, but once that latch is released, the band should be free to fall away from the extension assemblies. The latch should be operable by a long handle that will extend from the band downward well past the end of the vertical extension assemblies. Only a very flexible band should be used, as it must next be pulled out from under the membrane package and out away from the bottom-most pipe section, in the process passing between two of the side chains that fasten the hem chain to each of the vertical extension assemblies. A diver could go down to the bottom of the pipe section, find the latch handle, release the latch, and then pull the latch and the band material down and out until they are all completely free from the bottom-most pipe section. At that point the diver could simply carry this equipment back up to the service barge.

Before the pipe section 210 can be moved under the MODU, the special extraction tool (and, if there was a stiffening member inserted inside the pipe section, that stiffening member which would be, at this point, be attached to the bottom of the special extraction tool) needs to be removed from the pipe section. Workers in a skiff along side the service barge can control the motion of the pipe section after that special extraction tool (and the stiffening member, if any) is removed. These workers will carefully move the bottom-most pipe section away from the service barge to a location directly below the turntable on the drilling platform of the MODU, pulling however much additional membrane package is needed off of the bolt/reel as they do so.

While that is being done, the crane operator will lift the special extraction tool up and over the service barge, then set it down. The stiffening member (if any) can then be removed. After that, the crane can carry the special extraction tool up and over the MODU and finally lower it down through the drilling platform's turntable, through the iris and transfer box, and then down nearly to the ocean surface.

Installing the Iris and Transfer Box

While some workers are putting the final touches on wrapping the membrane package around the bottom-most pipe section, seaming it, and connecting it to the hem chain, others can be installing the iris and transfer box and its connected cable 380 from the oil leak containment system operator's console. This may best be done by loading the iris and transfer box with its attached cable on top of a scissor-lift jack in a another skiff. This skiff can then go under the MODU to a point directly below the turntable. There the iris and transfer box (and one or more workers) can be lifted up by the jack until they can attach the iris and transfer box to the apparatus that is already a part of the drilling rig and that will be later used to hold up the top of the marine riser string. Then the workers can return to the skiff. Another task they might also have to do is place one or more additional horizontal membrane rollers. These would be placed under the MODU in places where otherwise a straight run of membrane package from the membrane gate on the edge of the service barge to the bottom of the iris and transfer box would run into some part of the understructure of the MODU.

Finally, before they return to the service barge, they might have to help with the process for wrapping membrane package around the second pipe section in the central spline. This is only necessary in the "second case" process described in the next section.

Installing and Wrapping the Rest of the Central Spline (Also Called the "Sleeve")

There are two cases to consider for the next step in constructing the central spline that is the core of this oil leak containment system.

The "First Case"

In the first case, the next step will be to attach the special extraction tool to the bottom-most pipe section 210 and then use that to lift that pipe section up out of the water enough that workers on the walkways around the iris and transfer box can connect the wrapping machine (and its attached permanent seaming machine) to the underside of the iris and transfer box. Having done that, these workers can release the clamp on the top plate 137 so that the bottom-most pipe section 210 is free to move independently of the wrapping machine. At that point the crane will be raised just a bit more until the bottom-most pipe section can be clamped in the lower clamp of the iris and transfer box. (This will push down a portion of the already seamed membrane package just below the wrapping machine, causing it to bulge outward a short distance. But soon enough this wrinkle will be removed as the bottom-most pipe section starts to descend again after it has been connected to the next pipe up in the central spline.)

Any time the special extraction tool is connected to a pipe section (whether the bottom-most pipe section 210 or one of the other pipe sections 250) the cable 650 that is attached to the special extraction tool must be plugged into the pipe section that the special extraction tool was just connected to and (except when this is the bottom-most 210 pipe section) a special test box must be plugged into cable 257 coming out of the bottom of that pipe section. Then the oil leak containment system's operator must perform an integrity check to be sure the connections are good and the continuity of the cables in that pipe section are good. Then that test box must be removed before the crane lifts the special extraction tool and its attached pipe section over the MODU and down through the turntable. (This connection of cable 650 to the pipe section is only for test purposes, so it will not involve filling the electrical connection box with grease nor sealing that box.)

If the distance from the bottom of the iris and transfer box to the ocean surface is less than the length of the bottom-most pipe section, only a portion of that pipe section will have be lifted out of the water. But if it is larger, the crane must be able to lift the full out-of-the-water weight of that pipe section with all of its appendages, since there will be no buoyancy to help lift that weight once it clears the ocean surface.

The "Second Case"

If the crane cannot safely lift the bottom-most pipe section up enough, there is a second procedure that can be used. This procedure starts with a change to what is done after the special extraction tool is removed from the bottom-most pipe section and, with perhaps an attached stiffener, it is carried back to the service barge. Once any attached stiffener is removed from the special extraction tool, it must be attached to a pipe section 250 before it is carried over to the drilling platform and lowered through the turntable and then through the iris and transfer box.

Then, instead of lifting the bottom-most pipe section itself up and clamping it into the iris and transfer box, the special extraction tool and its connected, a suitable-length pipe section 250 can be lowered down until it can be attached to the bottom-most pipe section while that bottom-most pipe section is floating in the ocean. This attachment will have to be done with the assistance of the workers in the skiff beside the floating bottom-most pipe section. Since the bottom-most pipe section will, at this point, be floating with its top end perhaps a few feet above the ocean level, these workers may simply have to climb up on top of the top plate 137 attached to the wrapping machine to orient the pipe section 250 correctly, and then verify that it has been clipped to the pipe section 210 correctly. Also, they'll have to connect the cable(s) linking those two pipe sections. After they do that, the system operator can perform a check on the integrity of that connection and verify that it is still possible to sense and control everything down below that point. Then these workers can lower the locking ring to secure the connection between the two pipe sections. At that point they can return to the skiff.

If the distance from iris and transfer box to ocean surface is large enough, it may be possible to use one of the regular (40 or 45 foot long) pipe sections 250. But if that distance is not quite long enough for that, yet the crane would be overstressed lifting the pipe section 210 that high, then a shorter version of the pipe section 250 must be used, short enough to fit below the iris and transfer box while it is being connected to the pipe section 210, and then lifted just a little bit until it can be secured in the lower clamp of the iris and transfer box.

Either way, once the special extraction tool—or the bottom end of a pipe section 250 that is being carried by the special extraction tool—is attached to the bottom-most pipe section 210, the crane can lift the bottom-end pipe section a short distance upward, in the process, relieving the pressure on the buoyancy collar. Then the workers in the adjacent skiff can unfasten the bands that secured the collar around the bottom-most pipe section and remove the collar itself.

In this "second case" what has been assembled is a fully wrapped bottom-most pipe section and a naked pipe section 250. The next step is to lift up the naked pipe section (with its attached wrapped bottom-most pipe section) up until it can be clamped in the iris and transfer box. Notice that at this point the wrapping machine (with its attached permanent seaming machine) is still clamped around the bottom-most pipe section 210. So, now the wrapping machine must be raised up to the top of the naked pipe section, in the process wrapping it and seaming the membrane package around it.

This might be done by having workers on the scissor-lift jack that was used to raise up the iris and transfer box reach over and unclamp the wrapping machine from the bottom-most pipe section, and then lift it up until they can attach it to the bottom of the iris and transfer box. As they lift it, the wrapping machine will, of course, pull more membrane package off of the bolt/reel and through the two membrane gates (and, if they have been installed, over the membrane rollers these workers had previously installed). And the wrapping and seaming machines will automatically do their jobs as they are lifted upward.

Alternatively, it might be possible to have a special-purpose crawler built and have it installed on the bottom-most pipe section directly above the wrapping machine. This crawler would have three powered rollers surrounding the pipe section and have the crawler attached to the top plate of the wrapping machine. Then, once the wrapping machine's clamp is released, this crawler could lift up the wrapping machine to where it was just under the iris and transfer box. At that point the workers on the walkways surrounding that box could attach the wrapping machine (with the crawler still on top of it) to the bottom of the iris and transfer box. The crawler could then either be removed or it could remain there. Either way, the wrapping and seaming machines would do their jobs as the pipe section and all the subsequent pipe sections that will make up the central spline are lowered through them.

Each time a pipe section is clamped in the iris and transfer box, the special extraction tool can be released from that pipe section. Then the crane can lift that tool up out of the iris and transfer box and up through the turntable, and over to the service barge where it will be attached to the another pipe section 250.

Any time a new pipe section has been clamped in the iris and transfer box's lower clamp and the connection to the special extraction tool has been removed, it would be possible to connect temporarily the cable 380 that runs from the system control console to the iris and transfer box to the top of the pipe section that is held in the lower clamp. Again, the system operator could then verify that everything below that point is operable and all the connections are sound. This is an optional step, but it may be very useful to do it at least for the first such section, to verify that the cable 380 is sound.

Subsequent Sections of the Central Spline

After the first one or two bottom-most sections of the central spline have been installed and checked out, the rest of the pipe sections that will make up the central spline will be connected, one after another, in the same manner. The special extraction tool picks up a section, it is checked out with the temporary test box connection, while it is still on the service barge. (If it fails this test, that pipe section will be set aside and another one picked up.)

Once that special extraction tool and pipe section are ready for use, the crane will lift them up and over the MODU, down through the turntable, and down into the iris and transfer box. The workers standing on the walkways around that box will reach through the open ports and rotate the new pipe section until it is aligned with the ones below it. Then they will signal the crane operator "drop" the new pipe section onto the one clamped in the iris and transfer box. They will make up the connections, the system operator will check everything, then the workers will seal the connection and secure it with the locking band. At that point the special extraction tool can be removed and the cycle will repeat until the lower end of the central spline is the desired distance above the target drilling site. (The system operator can observe the distance remaining to the ocean floor at each time a new pipe section is checked. This could be done visually, using the cameras in the bottom-end package or an ultrasonic ranger in that bottom end package could give a more precise readout.)

Closing Off the Upper End of the Outer Containment Region

It is important that the top of the outer containment region (defined by the membrane) not ever be above the ocean surface, with due allowance for tidal and weather-related changes in that water level. This is to insure that there would never be a possibility that the containment region might fill with so much heavy oil above the water level that it would push sideways enough to possibly break the membrane.

When the system operator perceives that the last central spline pipe section that will always be under water is clamped in the iris and transfer box, the upper containment region must be closed off. This is done by wrapping a band around that pipe at the level of its lower reduced diameter regions and tightening that band until it seals the membrane package to the pipe in a leak-free manner. After that has been done the membrane can be cut directly above this band and the membrane package material above that point can be pulled up back through the wrapping machine and over to the service barge where it can be rewound on the bolt/reel.

Thereafter, as more pipe sections are added to reach from where that top-most pipe section 250 that is wrapped ends up into the iris and transfer box where the central spline will end and be clamped to seal it off and to hold it up, each of those added pipe sections must be of a special version of the pipe sections 250. Specifically, they must not have any holes in the side of the pipe section. This will force any oil or gas that may come up in the bottom end of that pipe to continue on upward until it spill out in the iris and transfer box—and from there can be extracted through the transfer port to a either the drilling platform's own mud processing facility or to a waiting transfer ship.

Securing the Central Spline and Expanding the Membrane Around the Drill Site

The bottom end of the central spline will typically be about twenty to forty feet (6 to 12 meters) above the ocean floor. Once the system operator and the drilling rig's crew are certain that the central spline is, indeed, located directly above the location where they want to drill, it is time to deploy the horizontal (and, if they are included, the vertical) extension assemblies. If they vertical extension assemblies are locked in their "home" positions, the pegs that restrain them must first be moved to release the extension assemblies. Then the motors that move the horizontal extension assemblies can be driven until all of those horizontal extension arms are horizontal. The only exception is if the vertical extension assemblies are used and if even just the outermost one of those vertical extension tubes is too long to fit between some of the horizontal extension arm when they are fully extended and the ocean floor (something which would only occur if the ocean floor is very uneven around the drill site). Then some of the horizontal extension members may have to be stopped before they reach their greatest extension at 90 degrees from their initial position. And if the ocean floor is sufficiently steeply tilted, it may be necessary to drive some of the horizontal extension arms beyond straight out, in order to let the vertical extension assembly, once it is fully telescoped out to its maximum length, reach the ocean floor on that side of the drill site.

Once the extension assemblies have been deployed, the vertical extension assemblies, if they are included, will be planted firmly on and, most likely, securely attached to the ocean floor. The only exception is if the drilling crew is not sure they like where the central spline bottom is located. In that case they might ask the oil leak containment system's operator to "walk" the central spline to a more suitable location. This is done by attaching just some of the vertical extension members to the floor, most likely a couple of those members that are more-or-less in the direction that the drilling crew wants the central spline to walk. Then while those vertical extension members are secured to the ocean floor, the system operator can move those horizontal members up some amount. As that happens, the vertical extension members (assuming they are the telescoping type) can extend enough to keep connected to the ocean floor, and the central spline will be pulled in the desired direction. Then the system operator can lower other vertical extension members and secure them to the ocean floor in this new location. Pulling up the vertical extension members originally attached to the ocean floor will permit the system operator to repeat the process for another step forward along the desired direction.

Once the central spline is where it is wanted, the system operator can put down all of the vertical extension assemblies, or only a subset if there is any thought of subsequently raising a portion of the membrane to permit the ingress or egress from the well head of a remotely piloted vehicle, perhaps to install a conventional blow-out preventer, or to do some other task.

Once the horizontal and vertical extension assemblies have been positioned as desired, the system operator can use the membrane lifting and lowering cables on the individual vertical extension assemblies to pull the membrane down to the ocean floor in each location, or if desired, keep some of them up out of the way of whatever other tasks might need to be done before serious drilling commences.

When the drilling crew puts down the marine riser, if it ends up not quite centered in the central spline, and if the drilling crew requests it, the oil leak containments system's operator can use a strategy much like the "walking" described above to adjust the location of the bottom end of the central spline just enough to center it around the marine riser.

Final Comments on the Installation of the Oil Leak Containment System

Once all these tasks have been done, the installation of this oil leak containment system is complete. Thereafter the system operator can adjust various things as desired, and the system can be used to monitor the progress of the drilling operation, including detecting any leaks that may arise in the vicinity of the drill site, perhaps caused by rock fracturing in that process, or by a leak from the well casing some way below the ocean surface.

At this time, the turntable, crane or other pipe-lowering apparatus, and all other parts of the drilling platform equipment can be returned to their normal functions.

The containment apparatus must be installed before any of the actual drill pipe or marine riser is lowered into the water. Because this installation precedes any of the normal uses of the crane and any other apparatus that normally is used to lower sections of drill pipe, this crane and those other apparatuses can be used during the containment mechanism installation to lower the rigid containment pipe sections. The containment pipe must, of necessity, have an inner diameter somewhat larger than the marine riser sections and larger than the largest drill bit to be used on this well. It might also be sized to enable lowering of any valves or other devices that may need to be installed on top of the completed well. Alternatively, those other devices could be installed as was mentioned above, under a temporarily raised portion of the lower edge of the containment membrane.

Naturally, if the containment pipe is quite long, it may flex somewhat in the ocean currents. This may tend to move its bottom end away from the desired drilling site. In addition to the ability described above to "walk" the bottom end of the central spline, it might be useful to let the drilling crew install their marine riser and use flexing it to push the central spline (which would, of course, have to be disconnected from the ocean floor at that time) to wherever they want it.

The containment mechanism just described provides a permanently installed platform that could contain other potentially useful devices for operation in the vicinity of the well-head on the ocean floor. Since, unlike the drill pipe string, the rigid containment pipe sections are not rotated during or after installation, providing a wired connection to the lights, cameras, motors, and any additional electronic or other devices will be quite simple, provided their use is anticipated and suitable connections are included in the pipe sections and their interconnects at the time of their manufacture.

Marine Riser Hydraulic Fuse

The purpose of the oil leak containment system contemplated by this invention is to provide a method and apparatus adapted to capturing and extracting for use any and all oil or gas that may leak from an underwater well during drilling (and keeping that oil and/or gas from contaminating the surrounding environment) both during the drilling, and optionally, during the later production phase. There are at least a couple of paths by which such leaks may occur.

The most common leaks to be contained by this system are any that may occur in the near vicinity of the drill site, perhaps as a result of the shocks delivered by the drilling apparatus. Also any leaks from the well head, or any leaks from the marine riser will be captured by the containment system so far described.

The marine riser's purpose is to convey the "drilling mud" back up from the drill and also to carry away the rock chips created in the drilling process. The drilling mud is forced down the drill pipe string and out through holes in the drill bit to lubricate the drill and speed the cutting of the well hole through the rock beneath the ocean floor.

Drilling mud is toxic and expensive. So both to save money and to protect the environment, the marine riser is placed around the drill string during the drilling operation. And anything that comes up that riser is captured at the drilling platform to be cleaned and then recycled.

This process was described in some detail above in connection with the description of FIG. 2. One point made there is that the mud reclamation system is only intended for use with the normal flow rates for mud during drilling. It also could be used for cleaning the oil produced from a working well, since the normal flow rates for wells often are comparable to the flow rate of mud during drilling.

What this mud reclamation system is not intended to handle is the volume and pressure of oil and gas that escape during a blowout event. Often during such an event the pressure builds up so quickly and so forcefully that it comes up out of the casing so hard it sails past the entry to the mud reclamation system and sprays all over the neighborhood. Or it may literally explode the piping or other parts of the mud reclamation system. Either way, the oil that then escapes will very likely end up going over the edge of the platform and back into the ocean.

In a way, this is like what happens to electrical equipment connected to a power line when it is hit by a sudden power surge (which may be caused by a nearby lightning strike or by wires getting crossed which are connected to a much higher voltage than is normally used by this equipment). Unprotected, the electrical equipment may be severely damaged. Normally this damage is prevented by a fast acting fuse or circuit breaker.

What the oil drilling industry needs, but does not now have, is a similar "fuse" (or "circuit breaker") device that could act in time to prevent an imminent blowout disaster fully automatically. The now infamous "blowout preventer" located at the well head on the ocean floor in the Deepwater Horizon incident was supposed to be able to be commanded to crush the drill casing just under the surface and thereby stop the oil and gas from continuing to surge upward. Clearly, it didn't work as planned. And even if it had, there had already been a substantial amount of oil and gas that had traveled up the marine riser to the platform before the blowout preventer was activated. This incident is far from the only one where something like that has happened. Those other incidents are simply less well-known because they involved a smaller amount of leaked oil and less loss of life or damage to the drilling platform and the surrounding environment.

So the third component of the oil leak containment system apparatus contemplated under the present invention is the provision of just such a fuse (herein called either a Marine Riser Hydraulic Fuse or simply a marine riser fuse). One that will work automatically as soon as a high pressure of oil or gas occurs within the marine riser, and that could be manually activated if the drilling team perceives that it would help them in an event not quite dramatic enough to trigger the fuse on its own.

The marine riser is a string of pipe sections that are bolted together and lowered down from the drilling platform all the way to, and then a short distance into, the ocean floor (generally sinking down a short distance into a shallow hole previously drilled there by the crew that subsequently lowers the riser). Each of the sections has two jobs to perform: Holding the string together; and delivering out of its top anything that comes up into it from below.

This is insured by building each marine riser section from a strong pipe running between two metal flanges. Buoyancy pads may also be attached around the pipe to make the overall section have near neutral buoyancy.

A marine riser hydraulic fuse section would need to continue to serve the first purpose of holding the string together, and perform the second function up until an overpressure event occurs. Then it must "fail" in a controlled manner so as to bleed off the overpressure very quickly, preferably in a way that also allows recovery of the blowout material (which will be a mixture of drilling mud, water, rock chips, oil, and gas).

Normally it would be an environmental disaster for any such section to vent what passes through it out into the surrounding ocean. But once the membrane-enclosed containment region of the present invention is in place, along with the associated transfer method and apparatus adapted to removing any oil or gas from that containment region, there is no reason why the marine riser hydraulic fuse section shouldn't allow any overpressure it experiences to cause it to blow wide open its side wall, thus dumping the high pressure gas and/or oil into the hugely larger containment region surrounding it.

This is analogous to the purpose and function of a pop-top beverage can. During most of its life it is meant to contain the beverage without leaking. But when the user applies a certain specified stress to it by pulling on the tab, the can must tear along a prepared line of weakness to open it up so the beverage may be easily poured out of it.

This is accomplished in the pop-top can case by designing the can to have a carefully specified and assured failure mode (popping the top). The marine riser hydraulic fuse section contemplated under this invention uses a similar idea.

FIG. 16 shows one design for such a marine riser hydraulic fuse section. Here the flanges at the two ends are connected by strong and stiff rods (or hollow cylinders, or something similar) that securely connects the two flanges in a way that forces them to remain parallel and at a fixed spacing at all times. This assures that this section will serve the first purpose of a marine riser section, keeping the marine riser string intact even after it "blows."

Running from one flange to the other is a tube, functionally similar to the tube of a normal marine riser section, but most likely with a much thinner wall in at least some of its length and around some of its circumference, and which has a specially engineered failure mode built-in. As long as the pressure within the tube is within normal bounds it will remain intact and thus serve the marine riser's second purpose of delivering whatever flows in through one flange back out through the other flange.

But once the pressure rises to a dangerous level, the sidewall of the tube between the flanges will rip open and spill the contents out into the surrounding containment region. This fuse section may be quite short (in contrast to the normal marine riser section that are about 30 to 50 feet [9 to 15 m] long. As such, its weight will likely be small enough that it need not have any buoyancy pads attached to it. If, however, one were to choose to attach such pads, they must only be attached in a manner and/or location such that they will not interfere with the ability of the fuse to open up and spill out the overpressure material.

In addition to blowing out the side of the marine riser hydraulic fuse, the ripping open of the tube's sidewall can also trigger an iris to close around the drill string, thus diverting anything flowing up the riser off to the side out of the blown-out area. This action will protect the drill rig and team from having a huge amount of gas and/or oil come squirting out of the top of the marine riser with, perhaps, enough force to break the mud reclamation system equipment and perhaps release a dangerous amount of gas that could get ignited and burn the rig. The implementation shown in FIG. 16 and described below includes this feature. (These details are also shown in FIG. 17b for a similar device, there called a riser fuse, to be used in an on-shore drilling operation.)

FIG. 16a shows a top view of such a marine riser fuse 500 with its iris in the closed position. If there were a drill string inside the marine riser when the fuse "blew," the iris would only be able to close around the drill string, but if nothing is inside it must be able to close off the entire opening essentially completely.

This and the following six views, (FIG. 16b) through (FIG. 16g), in this figure show one way such a marine riser section could be built. These figures illustrate an appropriate marine riser fuse for a string of marine riser sections that have a 12" (0.30 m) inside diameter and a 13" (0.33 m) outside diameter with flanges with an 18" (0.46 m) outer diameter and eight bolt holes located on a 16.5" (0.42 m) diameter circle. The length of the breakable pipe 511 in this example is 24" (0.61 m).

In this implementation the iris consists of twelve leaves 515, each of which is an essentially rectangular piece of springy material. The outer end is securely fastened to the flange surrounding the top of this fuse section. The inner end just reaches the centerline of the fuse section. In this drawing you see that the top flange 512 has eight holes equally spaced around it. These are where this section is bolted to the marine riser section above it (and a similar flange with similar holes on the bottom of this fuse section is bolted the marine riser section below it).

There are, in this implementation, three stiff rods (or tubes) 520 connecting the top and bottom flanges of this section. And there also are two notches opposite one another in the top and bottom flanges to permit the free passage of any high pressure lines or conduits that carry pneumatic or electrical signals down the marine riser string, e.g., to operate a blowout protector (BOP) at the ocean floor.

In FIG. 16b one sees a vertical cross section of this marine riser fuse section along the line marked by the grey dashed line A-A in FIG. 16a. Here there are two special flanges 513 (at the top) and 514 at the bottom. These flanges differ from the ones in the marine riser sections above and below this fuse section, in that those flanges have a 12" (0.30 m) inside diameter but these flanges have a 13" (0.33 m) inside diameter. Further, the top flange 513 has a recessed and slopped section with a rounded edge where its top surface approaches the inside hole. Both of these flanges also have a small inset on their inner diameter where the thin-wall pipe 511 with the engineered weakness is welded to these two flanges.

That recessed slopping region is where the iris leaves 515 are secured (by welding, screw fasteners, an adhesive bond, or the like) to the flange. The rounded edge makes it feasible to bend these iris leaves down along the inside of the pipe without creasing them.

Since at their outer ends these iris leaves are almost touching one another, as they extend inward they will overlap their neighbors. Necessarily, one of these leaves will be the top-most leaf. In this drawing, that top-most leaf is at the left. Each leaf overlaps the one next to it in a clockwise direction. The only exception is the last of the twelve leaves (the one next to the top-most leaf in the counter-clockwise direction) which ends up being the bottom-most leaf.

In FIG. 16b the top-most leaf is shown at the left and the seventh leaf is shown on the right, with its inner end just noticeably lower than that of the top-most leaf. The reason that the flanges inner diameters (and the inner diameter of the breakable pipe connecting those flanges) is 13" rather than 12" is to leave room for the iris leaves to be folded down against the inside of this pipe section and still leave more than a 12" diameter region free inside those leaves to permit anything that could be passed down the rest of the marine riser string to pass freely through this section.

FIG. 16c shows one way the iris leaves could be folded down and held there during the manufacturing process. A large ball is shoved down, pushing through the closed iris until the leaves are pressed firmly against the side of the pipe. This ball and the stick attached to it are referred to here as the Iris Opening Tool 525.

A short distance below the inner, now lower end of the top-most iris leaf is a small hole in the side of the pipe 511. At this time two additional pieces of the marine riser fuse are attached to the pipe using a rivet 517. On the inside of the pipe is a small clip 516 that overlaps and thus locks the top-most iris leaf in this down position, and thereby holding down all of the other iris leaves down as well. On the outside of the pipe is an angled piece of metal 518 that is secured against pipe by that same rivet. Rendered here in 60% (dark) grey is a cross-section of a riveting tool that can be used first to lift the rivet 517 and the clip 516 up inside the pipe section until it is in position and the rivet has been pushed through the hole in the pipe. And at the same time, the angled piece 518 is placed over the rivet. The other end of the riveting tool 526 is used to hold all these pieces together. Once these pieces are in the desired positions, the riveting tool can be squeezed together to deform the rivet, thus securing these pieces in this arrangement permanently.

The clip 516 is rather like the pull tab on a pop-top can. The lower end of that clip ends in a point, so the force of the iris leaves trying to straighten out will pull inward on the upper end of this clip and thus force its pointed lower end to press against the inside of the pipe section at a very specific point.

FIG. 16d reveals what the purpose for the angled piece 518 on the outside of the tube. This angled piece has a slot in it through which the hooked end of a solenoid's actuator rod has been placed. This actuator and its rod are designated 519 in this figure.

When the pipe wall is broken, the wall will fly out, the upper part of that wall with the rivet through it, will bend outward, in the process releasing the leaves of the iris to spring up and close off the pipe. As this happens, the angled piece will fold upward. This will not interfere with the actuator rod from the solenoid because the slot in the angled piece will let it simply slide past the actuator rod.

The foregoing describes what will happen if there is a sufficient overpressure inside the pipe. The pipe wall will already be stressed most where the pointed end of clip 516 bears on it, which is at the weakest point in the wall already (as will be explained next). So that is where the wall will break first. If, for any reason, this fuse needs to be tripped by something other than the pressure inside the pipe, an electrical signal to the solenoid can cause it to pull up on that outer angled piece 518, thus adding to the stress from the iris leaves, and thereby forcing the pipe sidewall to break again that its weakest point.

FIG. 16e shows the pipe 511's wall "unrolled." Very possibly the pipe will be a seamless pipe to avoid any possibility that it will have a weakness along its seam that might cause it to break there, but in this figure the pipe wall has been shown as if it were opened and unwrapped along a line opposite the point where the rivet is located to let you see the entire outside of the pipe in one flat figure. Thus, you see the rivet 517 and the clip 516 as they would appear from the inside in this figure. The weakest spot on this pipe wall is indicated as location A. Once the wall breaks there the wall will rip open along the lines of weakness engineered into the wall (perhaps created by machining or laser-cutting away material to thin the wall along these paths). It will rip upward along lines B and C around both sides of the clip and angled piece that are riveted to the pipe wall and then out around the top end of the pipe section. At the same time it also will rip downward along line D and then out around the bottom end along lines E and F.

The lines B, C, E and F don't go all the way to the sides in FIG. 16e. This is intentional. If the pipe section blows wide open, even on just one side, it will open a path for the upwelling blowout material that is substantially larger in area than the marine riser through which that material is coming up. And it would be best not to have the pipe wall portions that are blowing out strike the stiffening rods (or tubes) 520 on either side and at the back of the marine riser section (by "back" meaning the side opposite the rivet).

It might also be helpful to add a thick, somewhat soft blocks extending outward a few inches from the outside of the thin wall pipe on either side of the central "weak" line where it will rip open. These blocks could then push the membrane wrapped around the central spline outward and make sure that the membrane isn't cut by the sharp edges of the blown-open marine riser fuse. Alternatively, a box might be attached to the side of each marine riser fuse (similar to what is shown in FIG. 17*b*) and the membrane covering simply stretched over that box when the marine riser fuse is installed into the central spline pipe string. Then the sharp-edges of the blown-out fuse would be safely held away from the membrane by the box.

Because this approach clearly implies that the "backside" of the pipe wall will never need to break, it also wouldn't have to be particularly thin on that backside. So an alternate way to provide the stiffness needed to carry the mechanical load from the bottom flange up to the top flange could be to make the backside of the pipe quite thick and strong, and only use the thin, breakable material on the front side. This might mean that the stiffening rods wouldn't be needed at all. Yet another way to do the same thing would be the use the thin wall-pipe but surround it on the back side with a semi-cylindrical piece of thick-wall pipe material, instead of the stiffening rods or tubes.

An optional next step, shown in FIG. 16*f*, is to add another pair of flanges 512 at both the top and bottom of the fuse section. These flanges are identical to the flanges of the marine riser sections to which this section will be fastened at both ends. Doing this makes the entrance and exit orifices of this marine riser section identical to the corresponding orifices on the adjacent marine riser sections and thus helps guide anything poking down the riser (e.g., a section of drill pipe or a cutter) from banging into any of the vulnerable parts of marine riser fuse, such as the clip holding down the iris leaves.

FIG. 16*g* shows a cutaway perspective view of the finished marine riser fuse section in its factory-fresh state. This view, like the previous cross-section views, has been cutaway along the line marked A-A in FIG. 16*a*.

FIG. 16*h* shows two perspective (not cutaway) views of the completed marine riser fuse section. Here the point of view is rotated 90 degrees from the preceding views, so that the solenoid and top-most iris leaf which were at the left in the preceding views are now seen front and center.

The left-hand image shows the marine riser as it would appear up before it is triggered, either by internal pressure or by an external signal. The right-hand image shows how it might look after it had blown open. (Here you also see revealed by the opening of the fuse wall a 5″ [0.13 m] diameter drill string that might have been installed down through the center of this marine riser fuse section.)

The way the fuse's iris is designed, it can close all the way if the fuse section is empty, or it can close around a drill pipe when that is present. Any nearly circular object that is inserted, so long as it is even close to centered in the riser, can be closed around quite tightly, thus keeping virtually everything that might be flowing up the marine riser string from getting past this point.

There are three ways this fuse may be tripped. An overpressure inside will automatically blow this fuse. This fact can be detected by a suitable sensor (not shown in these figures) that could be included in the fuse design, and that could then trigger one or more other fuses above this one in the marine riser string to blow to ensure that any blowout material that might have made it past this fuse before or as it was blowing out would be caught by that (or those) other fuse(s). The third way it could be blown is by a signal from the drilling team in response to any emergency situation that, in their judgment, required quick action to stop the mud and other things that were coming up the marine riser string. Until one of these things happens, this clip will continue to hold these leaves down against the side of the marine riser, thus preserving its full opening for mud to flow up during normal operation.

Since the iris leaves are held with their ends pointing down toward the ocean floor initially, once they start to close in toward the drill string, any up-rushing oil, gas, mud, water, and rock chips will push on these leaves making them move toward the drill string even faster than they normally would, and that up-rushing force will tend to keep them pressed against the drill pipe even harder than their spring action would normally do.

In order to be able to trigger the fuse to break upon receiving a command from the drilling team a method and apparatus must be included on the marine riser that can trigger its engineered failure when it receives an appropriate signal from the drilling team even though the internal pressure isn't enough to blow the fuse, and some "smarts" will have to be installed and connected back to the top of the drilling platform to let the drilling team send that signal to this particular fuse. In this implementation that is the role of the solenoid and its actuator rod hooking the angled piece riveted to the side of the pipe section, plus a suitable amount of digital circuitry connected to a cable running the length of the marine riser (both of which are not shown here).

When the drilling team installs this marine riser hydraulic fuse section it will also have to attach it to a control cable then reel out that cable as additional marine riser segments are added. (This cable would be in addition to any other cable or high-pressure hydraulic line they may install to trigger a seafloor blowout protector [BOP].) By having some modest computing power included in the computing apparatus included for commanding the forced operation of the fuse (as opposed to it being triggered by an overpressure event), it will be possible to use only one cable to support independent commands to (and independent signals up from) many fuse sections arrayed along the marine riser string. Each fuse section would respond to a different code signal on that control cable, so that one cable could order any one or all of the marine riser hydraulic fuses to "blow" at once, and each fuse section could independently report when it blows out, plus any other data that sensors within or attached to it might generate—signals that could be used to trip other fuses or simply to keep the oil leak containment system's operator better informed about the state of things down the marine riser string.

One might think it would be better to have a marine riser circuit breaker. That would be a section that would act as I have just described, but which could easily be "reset" after the blowout event was over. That might be possible. But the marine riser sections can reasonably easily be replaced, just as they normally are installed and removed as needed, and since blowout events are reasonably rare, and surely any resettable circuit breaker section would likely cost a good deal more than a simple fuse section and require careful inspection, if not actual repair, after each blowout event before it could safely be reused, thus it makes more sense simply to use marine riser hydraulic fuse sections. (A blown section could be sent back to the factory for partial credit and there it could be remanufactured.)

Preferably the drilling platform operators would install several fuse sections in the riser, with some located near the ocean floor and others further up the riser. Then, if one section blows out but cannot by itself divert enough of the up-rushing stream of oil and gas (or if the lowest fuse section fails to blow out as intended), the others higher up will be able to blow out as needed.

This point is further developed in the next section, as in both off-shore and on-shore applications the use of more than a single fuse is to be recommended.

Use of this Invention for Onshore Drilling

All of the foregoing description has been about how to apply the present invention to an off-shore oil drilling rig, whether a MODU or a drill ship. But that isn't the only possible use for this invention.

Oil spills and blowouts in on-shore drilling also happen from time to time, and those events can create a serious problem. Fortunately, the principles of the present invention can be applied in a way that neatly solves that problem.

If the marine riser hydraulic fuse concept is applied a short distance below the top end of the pipe guiding the drilling mud back from the drill hole to the mud reclamation system, and if that section is also surrounded by—or connected to—an expandable containment region, the result is essentially the same as has been described above for an off-shore drilling operation.

In this case the fuse section can be surrounded by a very small primary containment region leading off toward a much larger secondary containment region—up to several hundreds of thousands of barrels of oil capacity, perhaps constructed in a manner somewhat similar to a "gasometer" (telescoping gas holder) in its design. This would permit handling a blowout in much the same way as does the off-shore application of the present invention. The iris and transfer box concept could be incorporated in the small containment region around the fuse section and the vent pipe and manifold for delivery of the captured hydrocarbons could also be realized for this alternate application, albeit probably in a slightly different mechanical form.

Thus all three of the principal aspects described for this invention (the containment region, the transfer method and apparatus, and the blowout prevention fuse) can be realized and applied equally to an on-shore oil or gas drilling operation.

Figure 17A:
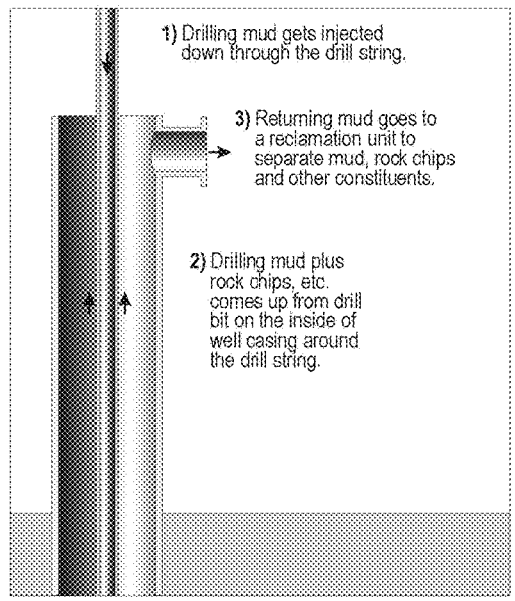
FIGS. 17a, 17b, and 17c show some details of how a very similar riser fuse could be used for on-shore drilling protection.
Figure 17B:
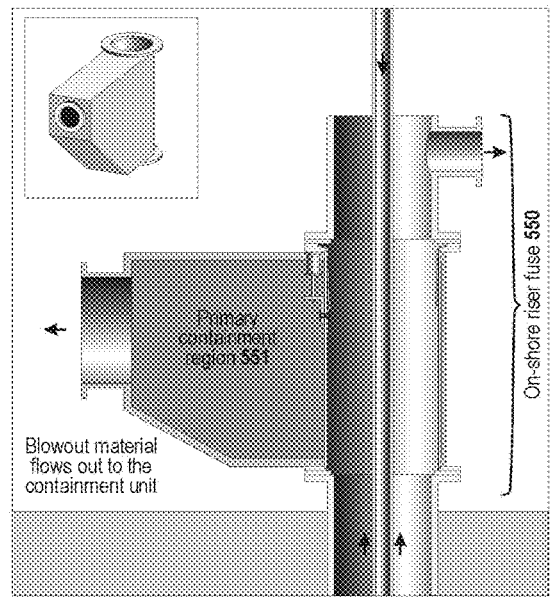

FIG. 17a shows a cutaway view of how a normal drill rig pumps drilling mud down the drill string (hollow steel pipe sections screwed to one another) and then through the drill bit where the mud lubricates and cools the drill bit, and then how the returning drilling mud with rock chips and perhaps other contaminants comes back up inside of the drill casing and at the top of the casing is directed to a mud reclamation unit that separates the mud from the other components of that flow so the mud can be reused. (And, if there is a significant amount of oil or gas mixed in with the mud that may also be separated out and kept for use or later sale.) This is only a schematic diagram, and it doesn't show the details of how the casing and its riser extension are actually made, nor actually how that tube is capped and the up-flowing mud and other material is directed to the mud processing equipment.

In FIG. 17b shows such a riser fuse 550 inserted into this riser extension somewhere above ground but below the top where the mud gets redirected. This riser fuse differs from the marine riser fuse just described in only two ways. First, surrounding the pipe is a primary containment region 551, which in this implementation is simply a box that wraps around the breakable pipe section at the right of this figure (the "backside" of the breakable pipe section) and then extends to the left enough to allow the pipe section when it blows to completely unwrap its front half without being limited by this containment box, and then the box narrows somewhat and ends in a flange where a hose or pipe can be attached to carry the re-directed blowout material to a larger and expandable secondary containment region. These two regions are analogous to the inner and outer containment region described above for the sub-sea application of this oil leak containment system.

Preferably, the hose or pipe that connects the primary and secondary containment regions will be at least as large in diameter as the marine riser and it should have as few and as gentle curves along its length as possible. These two features are to insure that the flow resistance per foot of travel encountered by the blowout material in passing through this pipe or hose is no more than it encountered in flowing up through the marine riser.

Figure 17C:
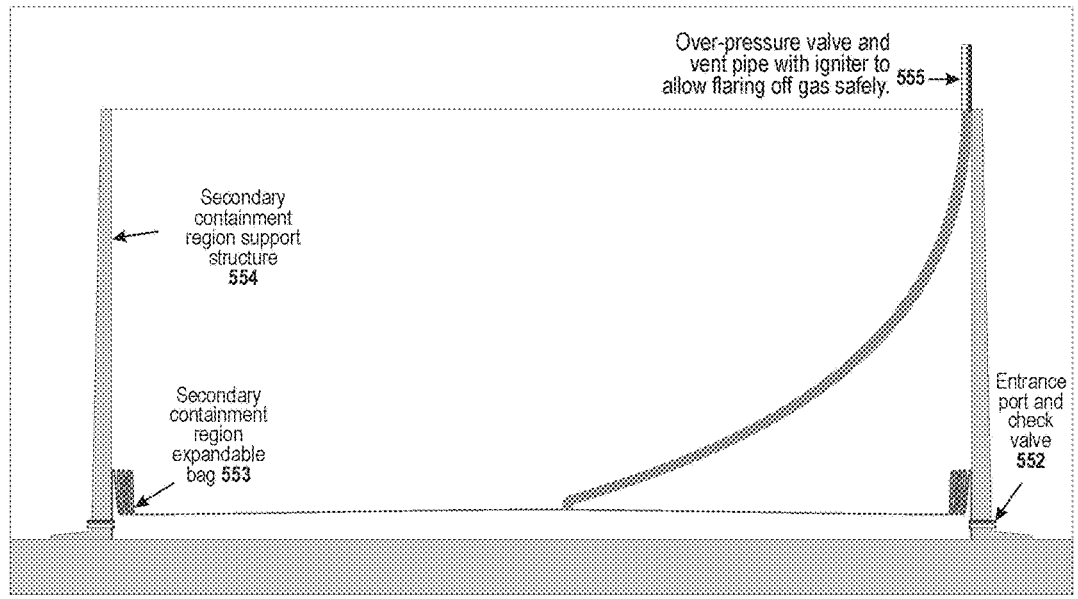

FIG. 17c shows a cross-section view of one possible form for the secondary containment region (553). First the pipe or hose from the primary containment region is attached to a port 552 on the side of the frame 554 that supports this expandable secondary containment region. This port has, on its inside, a spring-loaded flap that serves as a check valve. There may be plurality of such input ports to let one large secondary containment region serve several primary containment regions each of which is on a riser fuse on perhaps several independent wells all located near the secondary containment region.

The secondary containment region itself is defined by a large pleated tube made of a membrane material that is similar to that used for the membrane that encloses the central spline in the off-shore application of this oil leak containment system. This tube is closed at the top and it may be closed at the bottom underneath the entrance and exit ports—or the floor of the structure containing the tube may serve as its bottom, to form a closed bag. This bag is shown here in cross-section as the narrow dark grey line. The line goes up and down at each side to indicate that the membrane tube is cuffed there to allow this tube to unfold, thus expanding upward as necessary. This line not only goes up and down many times at each side, it also connects across the top thus indicating that this is a closed membrane bag. In this implementation of the secondary containment region the cuffs in the membrane tube are ten feet (3 m) deep. With nine layers of cuffs the tube can expand up to 90 feet (27 m) above its starting level. The horizontal spacing of these cuffs is exaggerated in this figure to make them evident on this scale.

The membrane bag's cuffs begin above the level of the inlet ports (and also the outlet ports described below), and the membrane bag's top is also shown as being raised up at least that high everywhere inside the secondary containment region. This can be insured by installing a screen layer (not shown here) inside the bag on supports that hold that screen up about 10 feet (3 m) above the floor so it can, in turn, hold up all of the membrane bag at least this high. Doing this is important to insure that when blowout material (which, one must remember, may contain many small sharp rock fragments) first blows into this secondary containment region it will be able to expand and slow down before it hits any of the membrane bag material. Otherwise that bag might well be cut by the impact force of the sharp stone bits carried along in the mud, oil, water and gas that constitute the rest of the blowout material. Once the secondary containment region is filled with blowout material, that material will slow and stop any additional incoming blowout material, and all of that material will gently lift the top of the membrane bag, unfolding the cuffs as necessary.

The hose (rendered here in a medium grey) connected to the top center of this expandable secondary containment region connects to a vent pipe 555 with an integrated pressure relief valve and igniter, so that any extreme overpressure of gas can be flared off safely. Ideally, though, before that happens the captured material would be pumped out of this chamber and taken elsewhere to be processed to separate the oil, the gas, the drilling mud, the rock chips, and anything else that may be in this material, so that each component can be utilized or discarded appropriately.

The grey pieces shown on both sides of the containment region are just two of many side supports that will support the sides of the membrane tube as it fills with blowout material. Alternatively, they might represent side supports of a tank with rigid walls (and, optionally, an open top) to serve that purpose. Either way, the membrane tube and its cap will contain the blowout material without exposing it to the outside air, and when that material is pumped out of this containment device, the membrane will collapse down to the screen a short distance above the floor once more.

In addition to the input ports 552, some number of additional output ports (not shown here) will be necessary. These are where a pump (or pumps) may be attached to extract the material contained inside the secondary containment region and pump it into tanker trucks or railroad cars for transport to a treatment plant elsewhere, or to an on-site mud reclamation and oil and gas separating unit if one is there that is capable of handling the necessary large volume of material in a timely manner. In addition to the output port(s) located near the bottom of the secondary containment region, it may be desirable to have one extra output port attached either to the top of the membrane bag or as a side arm on the hose from the bag 553 to the vent pipe 555. This port could be used to pump out, compress and store any natural gas that had spontaneously separated itself from the rest of the blowout material, rather than letting its pressure build up until it is vented and flared off.

This containment unit is shown as being 200 feet (60 m) in diameter and expandable up to 100 feet (30 m) high. A containment unit of this size could hold almost half a million barrels of oil, which would suffice for holding all of the output of a small blowout event (where the well is not producing the highest possible flow volume and it is able to be capped in a fairly short time), and it would certainly give the drilling operator a substantial time (more than a week for a blowout flow rate equal to that in the Deepwater Horizon incident) to bring in multiple trucks or otherwise off-load the material to other storage containers before this containment unit becomes completely filled.

If there is an extended run of riser pipe above the ground, more than one riser fuse might be incorporated into that pipe. There are several reasons why doing this might be useful.

First, there will likely be some small chance that a given riser fuse will not blow when it should, or that if it blows it might not sufficiently completely close off the upward path for the blowout surge. In that case, even though some or perhaps most of the surge would be redirected to the containment unit, some significant amount might escape upward and contaminate the drill rig and its immediate vicinity. Also, since it will take some amount of time for the fuse to complete its actions, during that time the leading edge of the surge will likely be able to pass it before it closes off the upward path. Again, some of the surge would then escape and contaminate the rig and its surroundings. By using more than one riser fuse and separating them by a short distance and by also interconnecting them so when the first one blows it automatically triggers the others in that riser to blow as well, one can greatly increase the odds that all of the surge will be captured. If the odds of complete failure of a single riser were to be 3%, for example (meaning that 97% of the fuses would operate as intended in any situation for which they were supposed to blow), then putting two of them in series would raise the probability of success from 97% to 99.9%. (And, naturally, if one used three or more the odds of success would rise even further.) In this way it would be possible to ensure to a virtual certainty that no blowout material would escape these fuses and thus all of that blowout material would be redirected to the containment unit for temporary storage and ultimate reprocessing for use. And having redundant fuses permits designing the fuses to be sure not to blow unless there were an actual blowout event in progress—which is to say, reducing the likelihood of a false positive to nearly zero.

Double-Wall Membrane Option

Some may question whether any containment region defined by a thin membrane is sufficiently secure for the present purpose. There are at least three good answers to this question.

First, it should be noted that the membrane material is specified as being both impermeable to oil and gas, and that it shall have a "rip-stop" character, meaning that if it is punctured, that hole will not easily be enlarged. The suggested method of making such a material is to start with a strong fabric woven in a rip-stop pattern (such as is typically used in the creation of fabric for a parachute) of a strong fiber such as nylon or Kevlar and then bond to it a plastic film that is impermeable to oil and gas. The fabric provides the security of keeping any puncture from starting a tear, and the plastic film closes off even the tiny pores any woven fabric will have. Alternatively, a non-woven fabric similar to Tyvek™ could be used. It might, by itself, have sufficient resistance to tearing and be sufficiently impermeable to oil and gas.

Second, one should note that the oil and gas inside the proposed containment region will be at a very low pressure relative to its surroundings. Because of that, the amount that will leak out of any small holes that may exist in the membrane will be utterly insignificant. Oil and/or gas may leak from the ocean floor, or rise out of the drill hole, at a very high pressure, but the size of those leaks and the drill hole are many times smaller than the containment volume. Specifically, if the leak comes up out of the drill hole, which is likely to be only four to at most twelve inches [0.1 m to 0.3 m] in diameter, it will then flow into a containment region whose diameter can expand to at least 17 meters. This is a factor of roughly 100 in diameter and therefore a factor of about 10,000 in area, leading the expanded oil or gas to have a pressure some four powers of ten smaller than when it emerged from the ocean floor. And as it spreads out sideways the oil and gas also will be free to expand even more upward—and indeed it will be pushed upward by the pressure of the heavier seawater all around it. The only way the pressure inside the containment region could rise significantly above that in the surrounding ocean would be if the containment region were to become completely filled with oil and gas. For even a leak of the epic proportions of the Deepwater Horizon disaster, this would take well more than a month, during which the operators of the drilling platform should easily have brought tankers or FSOs into place to pump out the oil as fast as it comes in or faster.

The third answer is that if one still wished to have a stronger, more secure containment region, it would be possible to modify the oil leak containment system apparatus so far described in a simple manner to provide a double-wall containment region. (This is roughly the equivalent of a medical professional double-gloving, which in their context reduces the chances of the medical professional getting infected by the patient undergoing treatment.) Doing this will require changes to only a couple of the parts of the apparatus plus one change to the process used during installation of the apparatus.

The overall system for double-wall protection would have two membrane package storage bolt/reels, each loaded with the same amount of membrane package. Each of them would feed a separate wrapping machine and seaming machine, with the two wrapping and seaming machines positioned one above the other around the pipe sections of the central spline currently being wrapped.

Since on the bottom-most pipe section the vertical and horizontal extension assemblies and one wrapping machine pretty well fill up that pipe section, the second wrapping machine and its seaming machine would have to be installed on another pipe section (of the 250 sort) which would be attached to the bottom-most pipe section on the service barge.

Initially, therefore, the lower wrapping machine (which will wrap the outer membrane package) is clamped on the bottom-most pipe section 210 as usual. Then the second (upper) wrapping machine will be clamped onto the next pipe section up. (It needn't be clamped very far up that pipe; there must be at least as much space between the two wrapping machines as the length of the lower wrapping machine, but not much more than that. Since this clamping is only to hold the wrapping machine in position against the rather modest forces exerted by the membrane panel flowing through it, it need not clamp on a reduced diameter portion of the pipe.) This upper wrapping machine and its seaming machine will create the inner membrane tube.

The lower of the two wrapping machines would need to be made with a somewhat larger inside diameter and the strings from the hooks inside the upper wrapping machine would be extended down through in the interior hole in the lower wrapping machine and through the hoop 135 that is connected to the hooks in that lower wrapping machine, and then those strings from the hooks in the upper wrapping machine would be connected to a second hoop 135 that would be located below the hoop 135 for the lower wrapping machine.

By having the two wrapping machines have different diameters the two membrane tubes will be slightly spaced apart from one another and therefore the two layers will act as two independent layers of protection.

The first step is installing the inner membrane onto the bottom-most pipe section. This process begins with pulling that membrane package through the upper wrapping machine, down through the central hole of the lower wrapping machine, then down over the vertical extension arms as described above. This membrane package would be seamed in much the same manner as was described above. The only exception is that when the permanent seaming machine is removed from the upper wrapping machine and used to seam upward from where the portable seaming machine began its work, the lower wrapping machine will need to be unclamped and slid upward until it touches the bottom of the upper wrapping machine. Then the permanent seaming machine for the upper wrapping machine can seam up past where the upper end of the lower wrapping machine had been when that machine was in its initial location. Once that has been done, that permanent seaming machine can be removed from the membrane package, the lower wrapping machine moved back down to its normal location and clamped there and then the upper permanent seaming machine can be hooked back on the inner membrane package right where it had been taken off, and then it can be used to seam up to the bottom of the upper wrapping machine and that seaming machine can be reattached to that upper wrapping machine.

In the meantime the part of the inner membrane package that covers the vertical extension assemblies is seamed with the portable seaming machine after it has been fastened to the hem chain as described above. Now, once all these things have been done, the outer membrane package can begin to be wrapped around the bottom-most pipe section in exactly the same way as was described above for the single layer membrane package. When it comes time to fasten the carabineers on the hem chain to the hem holes, the hem holes in this outer membrane package will be clipped into the same carabineers as the inner membrane package hem holes. This is where the two layers are joined.

Now the two wrapping machines will be securely fastened to one another to make a single, double-high wrapping machine. It is this that will wrap and seam both layers of membrane package at once as the central spline continues to be built, one pipe section at a time.

When choosing which pipe section 250 will be the last one with holes, the system operator must allow for another whole (possibly shorter than normal) hole-free pipe section above it and still be underneath the lowest level of the ocean, as that added pipe section will be where the upper end of the outermost outer containment region will be made. When the last ordinary pipe section (with holes) is fully wrapped and its top end is clamped in the iris and transfer box, the inner membrane will be tied off with a clamp on the lower reduced diameter section of that pipe section, just as was done in the single membrane process described above. And the inner membrane can be cut off just above the band that seals the top end of the inner layer's outer containment region, after which the rest of the not-yet-sealed inner layer membrane package can be pulled back onto the bolt/reel on the service barge. Note that at this time the lower wrapping machine is still in place lower down that same pipe section with its membrane package still coming from its bolt/reel on the service barge.

Next a special hole-free pipe section (perhaps rather shorter than usual) is attached to the pipe section that is clamped in the iris and transfer box. Once this pipe section is securely connected (and tested), the lower clamp can be loosened and the central spline lowered yet again. Now the lower wrapping machine will wrap this newest pipe section up until it is in position to be clamped in the iris and transfer box's lower clamp. Then this outer membrane can be clamped in the lower reduced diameter region of this newest pipe section, thus creating the top end of the outer layer's outer containment region. And, again, the membrane package for this outer layer can now be cut off just above that clamp, and the excess membrane package pulled back onto the service barge.

Now, just as before, more pipe sections are added, all without any holes in them, to reach from where the top of the outer layer's containment region ends up underneath the lowest level that ocean water is ever expected to be up to the iris and transfer box. At that point the central spline for this double-wrapped version of the oil leak containment system is complete.

All of this would require a somewhat larger service barge to accommodate the two bolt/reels and a modified rack to hold the double-length bottom-most pipe section assembly, but otherwise is should be easy enough to accommodate.

Oil Leak Containment System Apparatus Operations

Once the apparatus is fully installed, and after the drill crew has at least started the drilling of a well down through this invention's subject apparatus's central spline, there may be a variety of ways in which our apparatus can be used to enhance the work of the drill crew. Mention has already been made of the possible use of the bottom-end cameras located in the bottom end package on the central spline and/or on the various extension arms (horizontal and/or vertical) to help the crew locate the initial drilling at the optimum location—with an ability to modify their original plans based on what they can now see of the bottom topography, including any unfortunately placed boulders, or obvious cracks in the sea floor. Further, if a blowout preventer is to be installed, the oil leak containment system's operator could raise just a portion of the membrane and, if necessary, one or more of the vertical extension arms, to enable access to the well site from the side. Likewise a remote operated vehicle might be inserted there either to do some action or merely to make observations beyond those that could be made with just the lights, cameras, and sensors included in this invention's subject apparatus.

To facilitate these tasks and those involved in the installation and initial testing of the apparatus, a well-designed user interface on the control system will be vital. This invention includes a software component to provide just such a control interface.

While the invention is described in terms of a specific embodiment, other embodiments could readily be adapted by one skilled in the art. Accordingly, the scope of the invention is limited only by the following claims.

The foregoing Detailed Description of exemplary embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations within the scope of the invention will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

The invention claimed is:

1. An apparatus for containing oil and/or natural gas leaking from an underwater drilling site at the ocean floor, said apparatus comprising a central spline, said spline comprising interconnected hollow pipe sections, the lowest of which ends a predetermined distance above the drill site, and the topmost of which is held securely at or under a drilling platform, said spline having folded and wrapped about an exterior surface a membrane, said lowest pipe section having a plurality of extension members able to be deployed radially outward therefrom, said extension members having attached to their distal ends the membrane which thus forms a sock about said spline and which extends broadly around the drill site and down to the ocean floor when the extension members are deployed defining an expandable outer containment region therewithin.

2. The apparatus as in claim 1 wherein said lowest pipe section includes a user-controlled electrical motor drive to deploy each of the extension members in or out.

3. The apparatus as in claim 1 wherein said hollow pipe sections have a pattern of holes therein allowing sea water, oil, or gas to flow freely between the inside and the outside of the pipe sections.

4. The apparatus as in claim 1 wherein said spline has a distal end located above and in close proximity to the drill site and a proximal end that connects to an oil and gas transfer apparatus.

5. The apparatus as in claim 1 wherein said hollow pipe sections are configured for quick attachment to or disconnection from the adjacent pipe sections.

6. The apparatus as in claim 1 wherein each of said hollow pipe sections has an inner diameter greater than the outer diameter of any marine riser or other devices to be lowered to the ocean floor during or after drilling the well.

7. The apparatus as in claim 1 wherein said hollow pipe sections comprise a cylindrical plastic or composite wall with near neutral buoyancy in sea water.

8. The apparatus as in claim 1 wherein said lowest pipe section comprises said extension members and a deployment mechanism operative to extend them outward.

9. The apparatus as in claim 1 wherein said extension members comprising one or more interlinked and/or telescoping segments that are deployable outward and downward to a distance greater than the length of any single segment of said extension member.

10. The apparatus as in claim 1 comprising a fuse operative responsive to oil or gas overpressure or to a command from a drilling team member of oil and/or gas issuing from a drill site to divert the path of said oil and/or gas into said expandable containment region.

11. The apparatus as in claim 10 wherein said fuse is located at or near the bottom of a marine riser at an underwater drill site.

12. The apparatus as in claim 10 wherein said fuse comprises an iris astride the axis of the marine riser and responsive to a control signal or oil and/or gas overpressure to close in a manner to obstruct effluent from rising up along the riser axis, said fuse comprising a weakened wall riser section responsive to diverted effluent to rupture in a manner to direct the diverted effluent into said outer expandable containment region.

13. A method of providing a containment area about an underwater drill site comprising the steps of lowering a succession of pipe sections from a drilling platform to an underwater drill site; interconnecting each of said succession of pipe sections to the next successive one of said succession of pipe sections in a manner to define a central spline; wrapping a membrane about each of said successive pipe sections as it is lowered; providing a first of said succession of pipe sections with a plurality of horizontal and vertical extension members and user-controlled motors operative to extend and/or retract said horizontal and vertical extension members in a manner to define an outer containment area between said central spline and said membrane.

14. The method as in claim 13 comprising providing a weight along the membrane deployed by said vertical extension member in a manner to conform to ground surface topography at said drill site.

15. The method as in claim 13 comprising attaching the distal ends of said vertical extension members to ground.

16. The method as in claim 13 comprising closing the membrane about the topmost one of said pipe sections and attaching said last pipe section to a gas transfer box of said drilling platform.

17. A method of preventing environmental contamination from effluent which may escape from or near an underwater well site, said method comprising positioning at a selected underwater drill site a column of interconnected pipe sections forming a central spline extending from a drill platform above said drill site to a bottom pipe section positioned close to the ocean floor providing a space therewithin for a marine riser which would extend from the drill platform to the ocean floor, providing an expandable membrane wrapped about said spline from a top pipe section at said platform to said bottom pipe section, providing membrane extension members connected to said bottom pipe section, operating said extension members to unwrap said membrane at said bottom pipe section forming a containment region about said drill site in a manner to position the still unwrapped portions of said membrane for expansion responsive to the presence of said effluent at a time and to the extent that such effluent is present.

18. The method, as in claim 17, comprising the step of connecting to said top pipe section an effluent extraction member for moving any effluent within said membrane to an effluent storage or processing facility.

\* \* \* \* \*